(12) United States Patent
Martineau et al.

(10) Patent No.: US 9,898,202 B2
(45) Date of Patent: Feb. 20, 2018

(54) ENHANCED MULTI-STREAMING THOUGH STATISTICAL ANALYSIS

(71) Applicant: Samsung Electronics Co., Ltd., Suwon-si, Gyeonggi-do (KR)

(72) Inventors: Jason Martineau, San Jose, CA (US); William David Schwaderer, Saratoga, CA (US); Changho Choi, San Jose, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 2 days.

(21) Appl. No.: 15/146,708

(22) Filed: May 4, 2016

(65) Prior Publication Data

US 2017/0235486 A1 Aug. 17, 2017

Related U.S. Application Data

(63) Continuation-in-part of application No. 15/046,439, filed on Feb. 17, 2016.

(60) Provisional application No. 62/261,303, filed on Nov. 30, 2015, provisional application No. 62/302,162, filed on Mar. 1, 2016.

(51) Int. Cl.
*G06F 3/06* (2006.01)

(52) U.S. Cl.
CPC .............. *G06F 3/061* (2013.01); *G06F 3/064* (2013.01); *G06F 3/0659* (2013.01); *G06F 3/0665* (2013.01); *G06F 3/0679* (2013.01)

(58) Field of Classification Search
CPC ........ G06F 3/061; G06F 3/064; G06F 3/0659; G06F 3/0679; G06F 3/0665

USPC .................................................. 711/103, 170
See application file for complete search history.

(56) References Cited

U.S. PATENT DOCUMENTS

| | | | |
|---|---|---|---|
| 6,138,221 | A | 10/2000 | Korst et al. |
| 7,254,668 | B1 | 8/2007 | Chang et al. |
| 7,590,664 | B2 | 9/2009 | Kamohara et al. |

(Continued)

FOREIGN PATENT DOCUMENTS

WO 2013012901 A1 1/2013

OTHER PUBLICATIONS

Kang, Jeong-Uk et al., "The Multi-streamed Solid-State Drive," 6th USENIX Workshop on Hot Topics in Storage and File Systems (HotStorage 14), (URL:https://www.usenix.org/node/183609), May 7, 2014, 5 pages.

(Continued)

*Primary Examiner* — Pierre-Michel Bataille
(74) *Attorney, Agent, or Firm* — Renaissance IP Law Group LLP

(57) ABSTRACT

A system and method for using a Solid State Drive (SSD) (505) are described. Reception circuitry (510) may receive write requests (1610, 1615, 1620, 1625) and invalidate requests (1630, 1635, 1640) from a first stream (305, 320, 335, 350). The write requests (1610, 1615, 1620, 1625) may request that data be written to storage (520) on the SSD (505); invalidate requests (1630, 1635, 1640) may invalidate data written to the storage (520). A statistics calculation logic (1705) may calculate statistics (1410, 1415, 1510) for the stream based on the write requests (1610, 1615, 1620, 1625) and the invalidate requests (1630, 1635, 1640). A performance logic (1710) may use the calculated statistics (1410, 1415, 1510) to improve the performance of the SSD (505).

18 Claims, 32 Drawing Sheets

(56) References Cited

U.S. PATENT DOCUMENTS

| | | | |
|---|---|---|---|
| 7,660,264 B1 | 2/2010 | Eiriksson et al. | |
| 7,852,854 B2 | 12/2010 | Monta et al. | |
| 8,122,220 B1 | 2/2012 | Montierth et al. | |
| 8,144,515 B2 | 3/2012 | Moshayedi | |
| 8,321,579 B2 | 11/2012 | Aggarwal et al. | |
| 8,738,882 B2 | 5/2014 | Post et al. | |
| 9,003,066 B2* | 4/2015 | Taki | G06F 13/161 710/1 |
| 9,042,181 B2 | 5/2015 | Flynn et al. | |
| 9,158,540 B1 | 10/2015 | Tzelnic et al. | |
| 9,213,633 B2 | 12/2015 | Canepa et al. | |
| 2002/0029313 A1 | 3/2002 | Funakoshi | |
| 2004/0139042 A1 | 7/2004 | Schirmer et al. | |
| 2005/0171965 A1 | 8/2005 | Fujimoto et al. | |
| 2005/0172082 A1* | 8/2005 | Liu | G06F 12/0862 711/144 |
| 2008/0126109 A1 | 5/2008 | Cragun et al. | |
| 2008/0235304 A1 | 9/2008 | Fujii et al. | |
| 2009/0119352 A1 | 5/2009 | Branda et al. | |
| 2010/0070448 A1 | 3/2010 | Omoigui | |
| 2010/0161687 A1 | 6/2010 | Altrichter et al. | |
| 2010/0235569 A1 | 9/2010 | Nishimoto et al. | |
| 2011/0019482 A1 | 1/2011 | Buskirk et al. | |
| 2011/0072189 A1 | 3/2011 | Post et al. | |
| 2011/0096828 A1 | 4/2011 | Chen et al. | |
| 2012/0072798 A1 | 3/2012 | Unesaki et al. | |
| 2013/0159626 A1 | 6/2013 | Katz et al. | |
| 2013/0166818 A1 | 6/2013 | Sela | |
| 2013/0166824 A1* | 6/2013 | Shim | G06F 12/0246 711/103 |
| 2013/0179624 A1 | 7/2013 | Lambert et al. | |
| 2013/0290601 A1 | 10/2013 | Sablok et al. | |
| 2014/0032817 A1* | 1/2014 | Bux | G06F 12/0246 711/103 |
| 2014/0122774 A1 | 5/2014 | Xian et al. | |
| 2014/0269090 A1* | 9/2014 | Flynn | G11C 16/14 365/185.19 |
| 2014/0281260 A1* | 9/2014 | Peterson | G06F 3/0616 711/135 |
| 2014/0281302 A1 | 9/2014 | Horn | |
| 2015/0293713 A1 | 10/2015 | Seo et al. | |
| 2016/0092352 A1 | 3/2016 | Camp et al. | |
| 2016/0162203 A1 | 6/2016 | Grimsrud | |
| 2016/0266792 A1 | 9/2016 | Amaki et al. | |
| 2016/0283125 A1 | 9/2016 | Hashimoto et al. | |
| 2016/0313943 A1 | 10/2016 | Hashimoto et al. | |
| 2017/0017411 A1 | 1/2017 | Choi et al. | |
| 2017/0075591 A1* | 3/2017 | Espeseth | G06F 3/0613 |
| 2017/0131948 A1* | 5/2017 | Hoang | G06F 3/0653 |

OTHER PUBLICATIONS

Ryu, Moonkyung et al., "FlashStream: A Multi-tiered Storage Architecture for Adaptive HTTP Streaming," ACM, Oct. 21-25, 2013, 10 pages.

* cited by examiner

ENHANCED MULTI-STREAMING THOUGH STATISTICAL ANALYSIS

RELATED APPLICATION DATA

This application is a continuation-in-part of U.S. patent application Ser. No. 15/046,439, filed Feb. 17, 2016, which claims the benefit of U.S. Provisional Patent Application Ser. No. 62/261,303, filed Nov. 30, 2015, both of which are incorporated by reference herein for all purposes.

This application claims the benefit of U.S. Provisional Patent Application Ser. No. 62/302,162, filed Mar. 1, 2016, which is incorporated by reference herein for all purposes.

FIELD

This inventive concept relates to Solid State Drives (SSD), and more particularly to improving multi-streaming on an SSD.

BACKGROUND

"Multi-streaming" is the general name for a recent trend in Solid State Drive (SSD) development to save data using multiple data streams. In conventional applications of this technology, each stream is dedicated to a block, and each stream is assigned data based on one or more supposedly similar attributes (most commonly, an expected life span for that data). By attempting to place data with similar characteristics together in a stream (and ultimately a storage block), it is hoped that the grouped data will behave predictably, ultimately simplifying the SSD's garbage collection (GC) and reducing its associated write amplification factor (WAF). More specifically, if a block is being fed data by a stream whose data has a known life expectancy, the system may better predict when all of the data in that block will expire (and at what rate), making the task of locating victim blocks for garbage collection and transferring their valid data easier.

Unfortunately, there are problems with this basic approach. First, in many cases, the lifespan of data within a stream may only be approximated. This means that in many cases, data behaving differently from the approximation will violate the timing assumptions of a multi-streaming system, and garbage collection/write amplification factor performance will suffer. Second, the properties of data streams may change with time. Thus, the original timing assumptions made with regard to multi-stream control will be violated, again resulting in poor garbage collection/write amplification factor performance. Finally, for reasons outside of the control of the multi-stream system (e.g., a full disk), sometimes garbage collection must be performed on a multi-streamed block before all data has expired. In this case, despite a traditional multi-streaming system's best efforts, valid data from a victim block must still be re-written elsewhere (called "programming").

A need remains for a way to improve the performance of an SSD.

DETAILED DESCRIPTION

Figure 1:
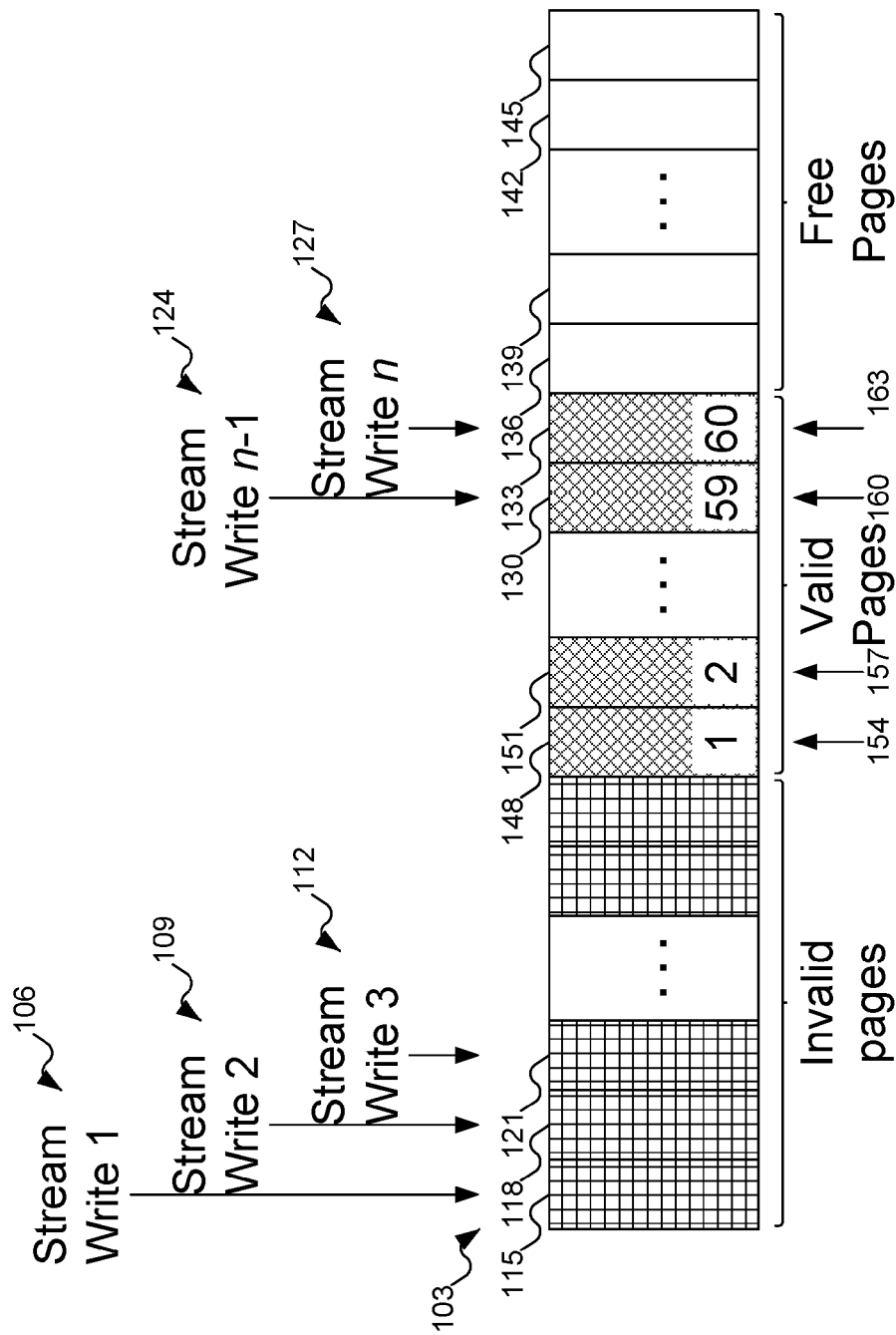
FIG. 1 shows a block receiving data associated with a stream with an associated Time-To-Live (TTL).

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

As described above, Solid State Drives (SSDs) write data to pages, which are in turn organized into blocks. When data is to be updated, the page storing the old data is copied into RAM, modified, then written to a free page on the SSD. The original page is then marked as invalid and the new page as valid.

As time passes, the number of invalid pages increases. Eventually, the SSD will have no more free pages unless the invalid pages are recovered by performing garbage collection. Garbage collection involves taking a target block (or super-block), copying all valid pages in that block into a new block, then erasing the original target block. This valid-data copying requires time and energy. In addition, because Flash memory may only sustain a limited number of writes, garbage collection negatively impacts the SSD lifespan.

Because Flash garbage collection significantly affects storage device performance, responsiveness, and lifespan, a variety of methods exist to help optimize garbage collection efficiency. One of them is referred to as Multi-stream, a technique that allows computing systems to attempt to classify data write activity.

Multi-streaming provides a method for an SSD to coalesce data write operations into streams. A data write operation is associated with one of a plurality of streams based on the expectation that all data associated with the stream has a similar Time-To-Live (TTL). This allows the storage device to place the data together in Flash media with the hope that the data collectively becomes invalid within a narrow and predictable timeframe. When successful, this placement strategy significantly reduces the operational intensiveness of garbage collection, since no valid data from the garbage-collected block needs to be saved elsewhere.

A basic assumption of a multi-streaming system is that all data in the stream behaves approximately the same way (most notably, that data in a stream has approximately the same life span). For some types of data, this is a fairly accurate assumption. But for other data streams, this assumption is much less accurate. Instead of modeling a stream using a single Time-To-Live (TTL), a better model may use a distribution of Times-To-Live along with a nominal TTL.

Figure 15:
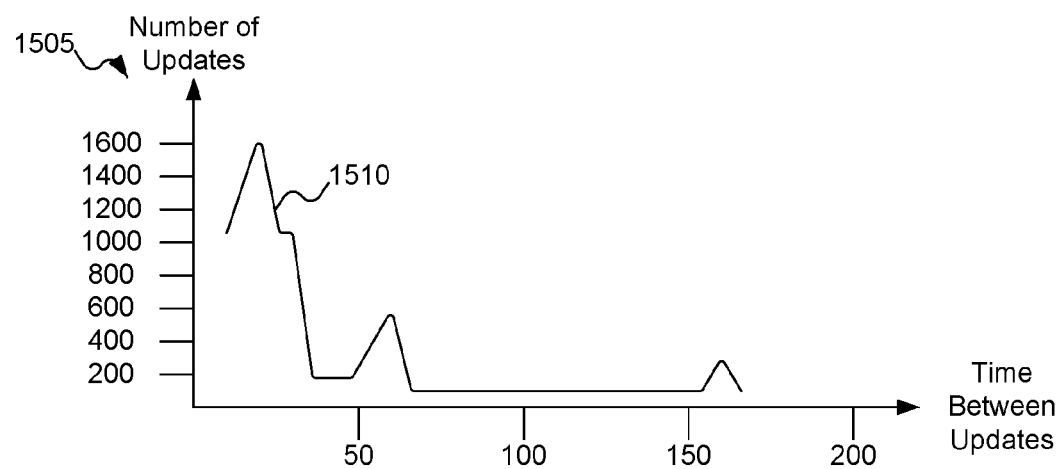
FIG. 15 shows a histogram of data that does not conform to a distribution model like those shown in FIG. 14.

These distributions may follow just about any statistical pattern, such as a normal distribution, a multi-modal distribution, etc. As an example, imagine a stream associated with a server saving data from office workers updating ordinary spreadsheets. Most updates may happen on the order of a few hours (or at most a day), reflecting the normal pattern of work during the week. However, a substantial number of updates may happen at a frequency of a bit over 2 days, reflecting a weekend break between working days. Finally, there may be a remaining few updates that happen at a longer frequency, perhaps indicating a vacation of some sort. FIG. 15 shows an example histogram representing this data. A traditional stream would, at its inception, pick a single lifetime figure representing a likelihood (say 90%) that a given piece of data within the stream would invalidate within, and thereafter the stream would be treated by the system (especially in assigning streams to blocks) as if all data had that exact attribute; all information on the distribution pattern would be lost to the system, and more specifically, the SSD.

Alternatively, the multi-streaming system may keep track of the stream's data lifetime distribution. This may be done in multiple ways. First, this tracking may be done entirely on the host end, and the host may simply supply the SSD with distribution models when needed. Alternatively, the SSD may store information about each stream write request, even in situations where it has no insight into why/how the host creates and populates a stream as it does. By saving each streaming page with metadata indicating the stream ID, and the time the page was saved/invalidated, the SSD may calculate the stream's distribution model and "nominal" data lifetime.

Additionally, a fixed stream TTL does not reflect the fact that a stream's data lifecycle patterns may change over time, or exhibit long-term cycles. Relying solely on a fixed stream TTL does not consider these changes. To reflect the possibility of changing data lifecycle patterns, the system may use a "moving window" of data lifetimes to generate a distribution for the stream, such that outdated data will not skew the model.

These per-stream statistical models may be put to beneficial use in an SSD. The contours of the distribution may assist the stream-to-block (or first-order to second-order stream) assignment mechanism to make the most intelligent choices when choosing to migrate streams.

Figure 14:
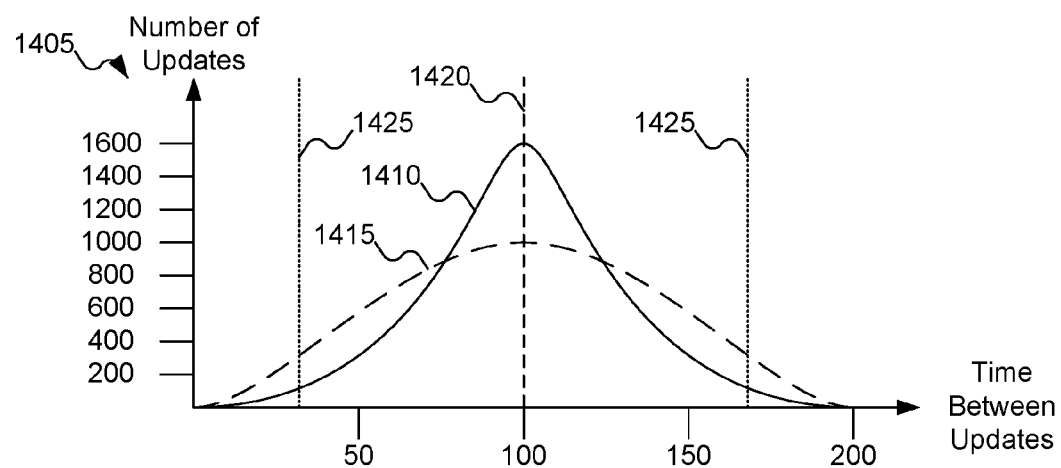
FIG. 14 shows a graph of two normal distribution curves with a common mean, but differing standard deviations.

For example, consider two streams, both with a nominal 30 minute lifespan and with similar fill rates, as shown in FIG. 14. But one stream has a narrow distribution, whereas the other stream has a wide distribution. For a given confidence level, the two streams may be expected to have comparable numbers of outliers. But any outliers in the stream with the wide distribution are likely to be further from the mean than outliers in the narrow stream. If data from the stream with the wide distribution is written to a lifetime-based block earlier than data from the stream with the narrow distribution, data invalidation is more likely to leave the block with no (or less) valid data than if data were written to the block from the streams in some other manner. For example, data from the stream with the wide distribution might be written to the block when the block has 37 minutes remaining in its lifetime, and data from the stream with the narrow distribution might be written to the block when the block has 32 minutes remaining in its lifetime.

Another use for a stream's distribution may arise if a block containing valid data is forced into garbage collection. The garbage collector may look at the remaining valid data, use the metadata to identify the stream it came from and how much time has passed, and use the distribution of that stream to predict how much time the valid data has remaining, then place that data into a stream having the most similar characteristics.

For example, return to the example above where spreadsheets are updated either daily, after a weekend, or after a vacation, (as shown in FIG. 15) and consider a scenario where an erase block contains valid data that was written 40 hours ago. From the distribution model for that stream, the SSD may conclude that the valid data will probably be invalidated within about an additional 24 hours or so, but that there is also a substantial residual risk that the data will remain valid for days after that. The garbage collector may first attempt to restream the data to any existing stream with a probable invalidation time of 24 hours, but with a distribution that allows for long hold-outs. Failing that, the garbage collector may attempt to restream to a stream having a lifetime of 24 hours with a narrower distribution, etc.

FIG. 1 shows a block receiving data associated with a stream with an associated TTL in a typical system. In FIG. 1, the storage device has serviced a plurality of write requests for one specific stream. In practice, the device would service the stream requests by first assigning, and thereafter dedicating, an available unused storage block to the stream and by then writing presented data values to the first available area (i.e., page(s)) within the block, starting at the lowest location address and progressing to higher location addresses. When full, another block is assigned, and dedicated, to the stream. When a block is later completely reclaimed by garbage collection, it returns to an Available-Block pool for subsequent assignment to another or the same stream.

In FIG. 1, some of the earliest-written data values have been deleted or updated, rendering their storage locations invalid. For example, block 103 has been dedicated to a stream. Stream writes 106, 109, 112 were written to pages 115, 118, and 121. Eventually, pages 115, 118, and 121 have all become invalid. Meanwhile, the most recent stream writes 124 and 127 have been written to pages 130 and 133, with other pages 136, 139, 142, and 145 remaining free. If a data value from one of pages 115, 118, or 121 was updated, the new, updated value could now reside at a higher address within the block, such as pages 148, 151, 130, and 133. Alternately, the new value might reside in another block subsequently assigned and dedicated to the stream.

In FIG. 1, valid pages 148, 151, 130, and 133 are shown with remaining TTL values 154, 157, 160, and 163. These values are not actually stored on the SSD, but rather represent the time until the data in the page is expected to expire. This value may be calculated as the difference between the TTL of data in the stream and how long the data has been resident on the SSD. For example, TTL values 154, 157, 160, and 163 indicate that the data in page 148 is expected to expire in one minute, the data in page 151 is expected to expire in two minutes, the data in page 130 is expected to expire in 59 minutes, and the data in page 133 is expected to expire in 60 minutes. This situation may occur, for example, if the stream has a TTL of 60 minutes, and data that occupies one page in block 103 arrives in the stream every minute.

If block 103 ended with page 133, then page 133, with TTL value 163, would be the last page with data to expire, requiring 60 minutes to expire. Thus, when the SSD is ready to perform garbage collection on block 103, the SSD would have to wait until the data in page 133 expires (60 minutes after when it was written), or the SSD will have to copy valid data from block 103 to another block to erase block 103.

In traditional multi-streaming storage, as shown in FIG. 1, a single block is associated with a single stream. The data being written to block 103 may have a predictable TTL. But because of the time required to fill the block, the pages in block 103 may invalidated in a "wave": that is, the pages in block 103 may expire sequentially over time. This may put the SSD in a "difficult" position: either the SSD must wait until all the data has expired, suffering a time penalty for an inability to utilize what would otherwise be "freeable space", or the SSD must copy some valid pages to another block to perform garbage collection on block 103, suffering the known garbage collection penalties.

FIG. 1 may also represent how the SSD fills blocks without multi-streaming storage. Where an SSD operates without multi-streaming storage, each page has an essentially random TTL, and it is not possible to predict when any data in block 103 will expire. Exchanging sequential TTL values 154, 157, 160, and 163 with random values, and by mixing the invalid and valid pages within block 103, FIG. 1 may reflect traditional non-multi-streaming storage.

But while traditional multi-streaming systems assign specific streams to storage blocks, storage blocks do not need to be assigned to specific streams. Instead, an overall lifetime may be assigned to a block, and data from streams of varying TTLs may be written to the block, with the aim that the data in the block should expire at a single, defined time. Using storage device intelligence and historical data, an SSD may determine whether it is more efficient to continue writing data from the current stream to the block, or to write data from a different stream to the remaining pages in the block. Of course, the same logic would also apply to the block's later-assigned stream. Specifically, the storage device might subsequently determine that it is more efficient to write data from a third stream rather than from the second stream to the block. Of course, data from the streams that have been switched away from the block may have their data written to other blocks.

Another solution is to use "second-order streams". The streams described above may be thought of as first-order streams: that is, each stream may contain data with similar TTL characteristics. But instead of writing data from first-order streams to blocks, data from first-order streams are written to second-order streams. The second-order stream may have its own TTL, and the data sent to the second-order stream is written to the blocks. Different first-order streams may provide data to the second-order stream, depending on how much time is left in the life of the second order stream. In such embodiments of the inventive concept, the association between the second-order stream and blocks on the SSD may be maintained, while still achieving a more consistent expiration of data within the block.

FIGS. 2A-2D show an example of the block of FIG. 1 receiving data associated with multiple streams with different TTLs, according to an embodiment of the inventive concept. FIGS. 2A-2D also illustrate the benefit of writing data from multiple streams to a single block. In FIGS. 2A-2D, assume that blocks on the SSD are 1 MB in size, and the SSD is receiving two streams. Stream 205 has an expected TTL of 60 minutes, writes an average of 24 KB of data at a time, and writes a file on average once every minute. Stream 210 has an expected TTL of 45 minutes, writes an average of 256 KB of data at a time, and writes a file on average once every five minutes.

FIG. 2A illustrates again the situation where all the data written to block 103 is associated with a single stream. Given the average file size of 24 KB of data for stream 210, and the average write arrival rate of one file every minute, it will take roughly 45 minutes to fill the 1 MB capacity of block 103. Thus, after block 103 has been filled, the first data written to block 103 has remaining TTL value 215 of 15 minutes, while the last data written to block 103 has a remaining TTL value 220 of 60 minutes, and block 103 will have valid data for a total of one hour, 45 minutes (45 minutes until the last data is written, plus one hour for the data's TTL).

If the target block were forced into garbage collection any time before one hour after the last data was added to the block, then there would still be valid data in the block which would require transfer to another block during garbage collection. Furthermore, the earlier the SSD performs garbage collection on the block, the more valid data remains that must be relocated to another block on the SSD.

Figure 2A:
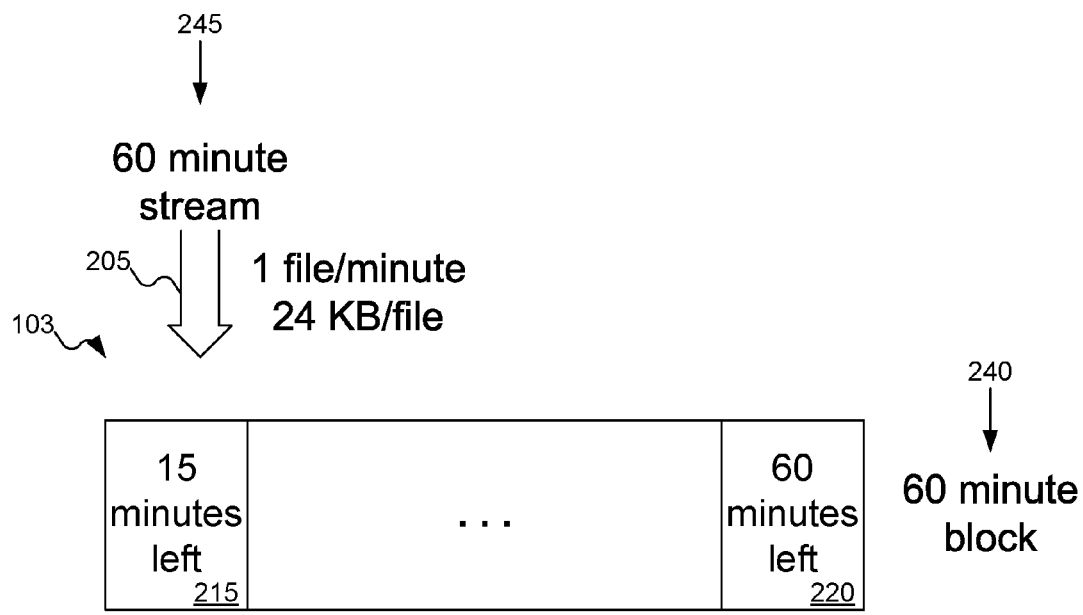
FIGS. 2A-2D show a first example of the block of FIG. 1 receiving data associated with multiple streams with different TTLs, according to an embodiment of the inventive concept.
Figure 2B:
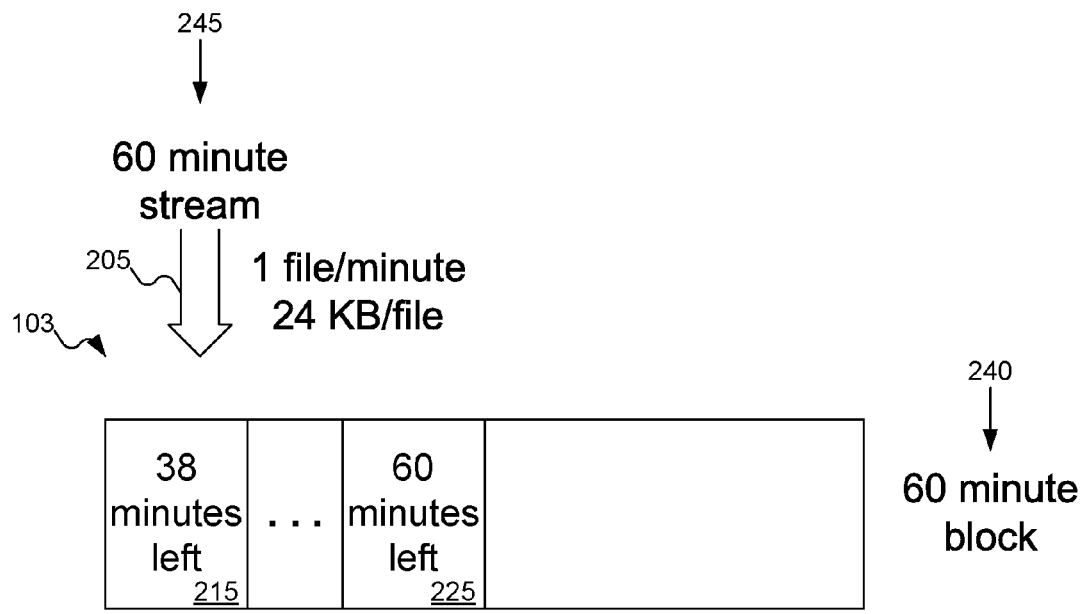

Instead, consider FIG. 2B, where stream 205 writes data to block 103 for only 22 minutes (at which point block 103 will be half-filled). At time 0:22, the first data written will have a remaining TTL value 215 of 38 minutes, and the last data written will have a remaining TTL value 225 of 60 minutes.

Figure 2C:
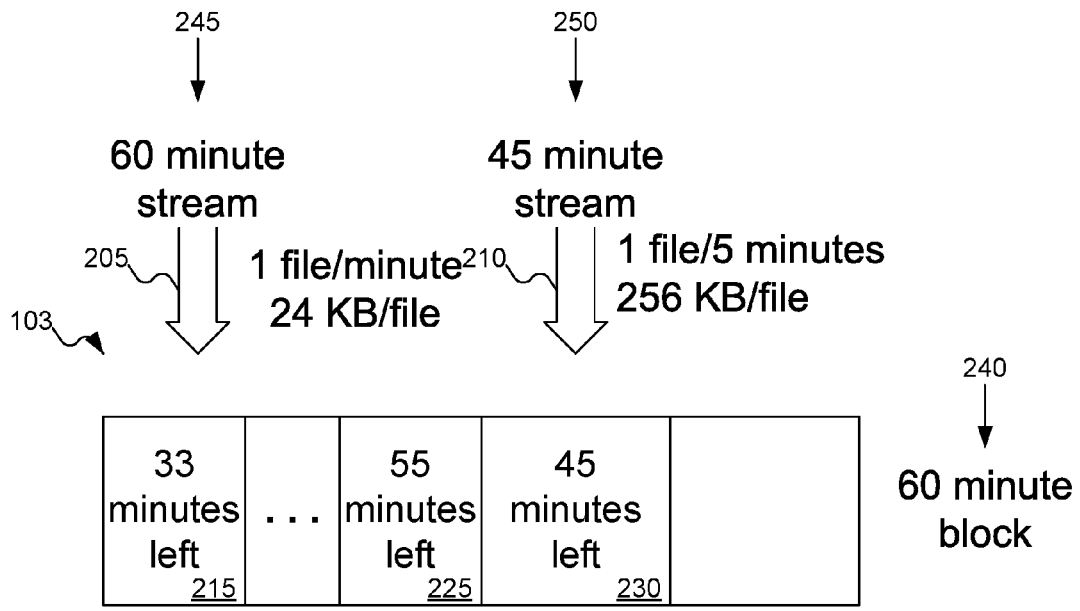

After time 0:22, block 103 switches to stream 210, as shown in FIG. 2C. At time 0:27, stream 210 writes data to block 103, adding data with TTL value 230 of 45 minutes. Note that TTL values 215 and 225 have also decreased by the five minutes waiting for stream 210 to write its first data.

Finally, at time 0:32, stream 210 writes a second file to block 103. Given the average write size and write arrival rate for stream 210, this second file completes block 103. At this point, the data written from stream 205 has remaining TTLs that vary from TTL value 215 of 28 minutes to TTL value 225 of 50 minutes, and the data written from stream 210 has TTL values 230 and 235 of 40 and 45 minutes, respectively. Since block 103 was completely filled at time 0:32, and the data with the longest remaining TTL (TTL value 225) is expected to expire in 50 minutes, block 103 may be subject to garbage collection at time 1:22, which is 23 minutes sooner than would occur in FIG. 2A. In addition, because more data is subject to expiry around the same time, block 103 would be a poor candidate for garbage collection before all the data expires.

Note that with even more streams, with a greater number of options for fill rate, TTL, and data size, the ability to switch streams to fill blocks in such a way that their pages "invalidate" all at once is enhanced. There may be any number of streams, each of which may have any TTL, average write size, and average write arrival rate.

FIGS. 3A-3D show a second example of how block 103 of FIG. 1 may receive data associated with multiple streams with different TTLs. In FIGS. 3A-3D, assume that there are only four streams, which have the same data fill rate and average write size, so that the primary difference between the streams is their TTL. The four streams described in FIGS. 3A-3D have, respectively, TTL values of 60, 45, 30, and 15 minutes.

Figure 3A:
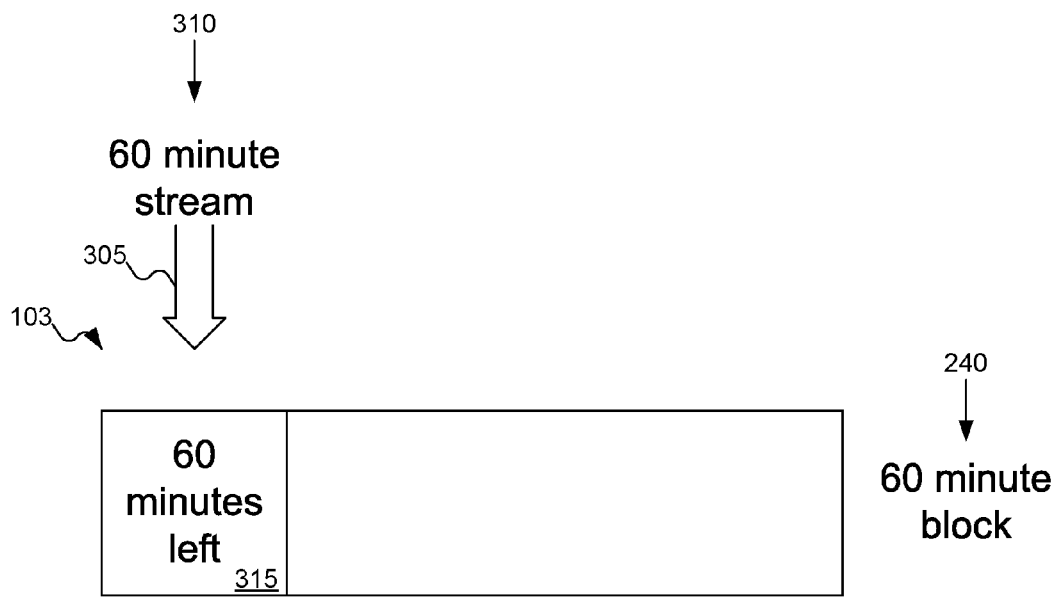
FIGS. 3A-3D show a second example of the block of FIG. 1 receiving data associated with multiple streams with different TTLs.
Figure 3B:
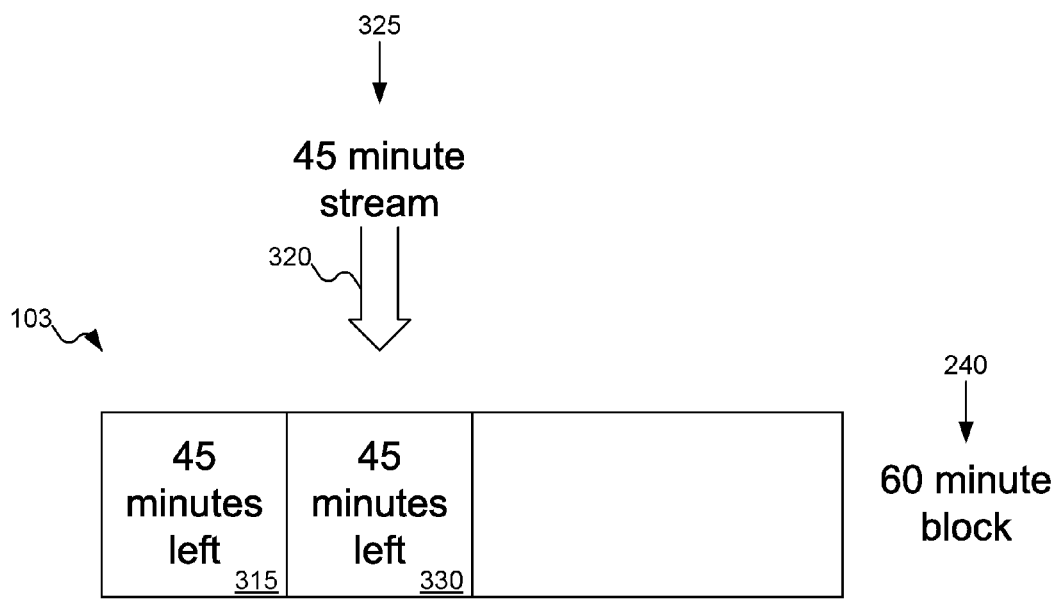

In FIG. 3A, stream 305 is writing to block 103, which has TTL 240 of 60 minutes. Stream 305 has TTL 310 of 60 minutes, and in 15 minutes time enough data is written to fill block 103 one quarter full with data with a longest remaining TTL 315 of 60 minutes. At this point, the SSD switches from stream 305 to stream 320, as shown in FIG. 3B. Stream 320 has TTL 325 of 45 minutes. Again, in 15 minutes enough data is written from stream 320 to fill another quarter of block 103. At this point, block 103 is half full, with data 315 and 330 expected to expire in 45 minutes.

Figure 3C:
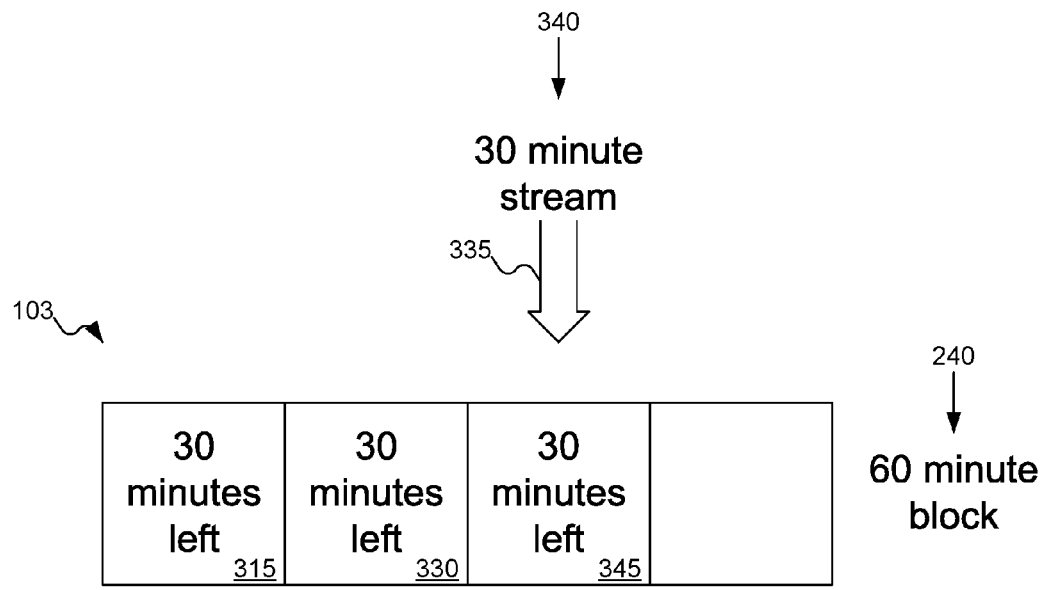
Figure 3D:
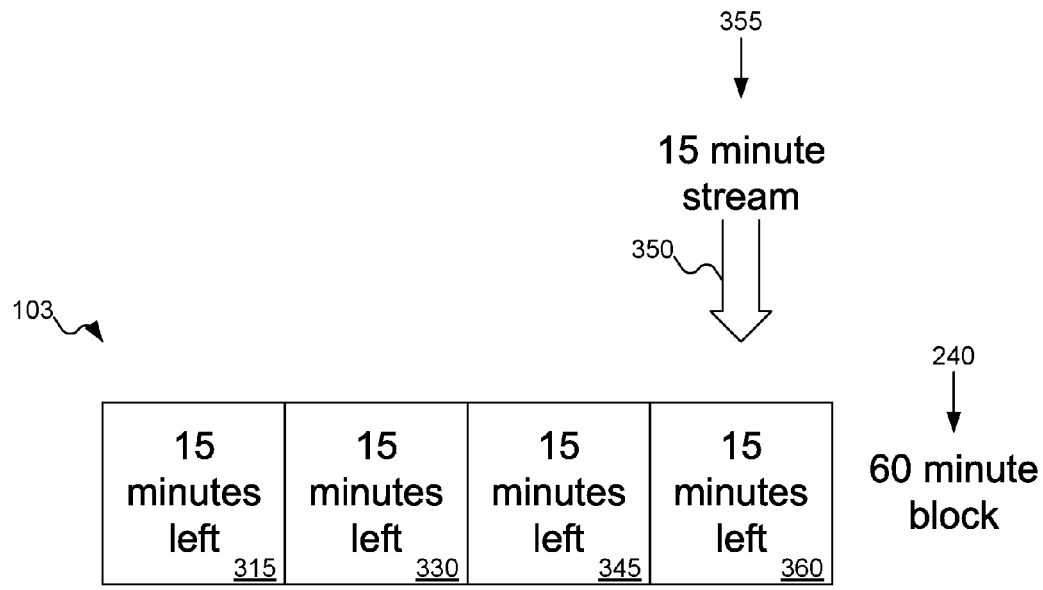

Now the SSD may switch to stream 335, as shown in FIG. 3C. Stream 335 has TTL 340 of 30 minutes. Again, in 15 minutes stream 335 may write enough data to fill another quarter of block 103, which is now three quarters full with data with remaining TTL 315, 330, and 345 of 30 minutes. At this point, the SSD may switch to stream 350, as shown in FIG. 3D. Stream 350 has TTL 355 of 15 minutes. After another 15 minutes, stream 350 has written enough data to completely fill block 103, and the data 315, 330, 345, and 360 in block 103 is expected to expire in 15 minutes. Thus, at time 1:15 after the first data from stream 305 of FIG. 3A is written to block 103, all the data in block 103 is expected to expire, and the entire block may be garbage collected.

Compared to the traditional system, the examples of FIGS. 2B-2D and FIGS. 3A-3D offer improved garbage collection performance. By using multi-streaming storage, the block is sequentially filled with data with decreasing TTL values. The data in blocks may expire more quickly overall, and more data may tend to expire around the same time. As a result, blocks are more likely to have all data expired when garbage collection is performed, obviating the need to copy any valid data to another block before performing garbage collection on the block. In addition, because more data tends to expire at the same time, the block is less likely to be selected for garbage collection before all the data in the block has expired.

Figure 2D:
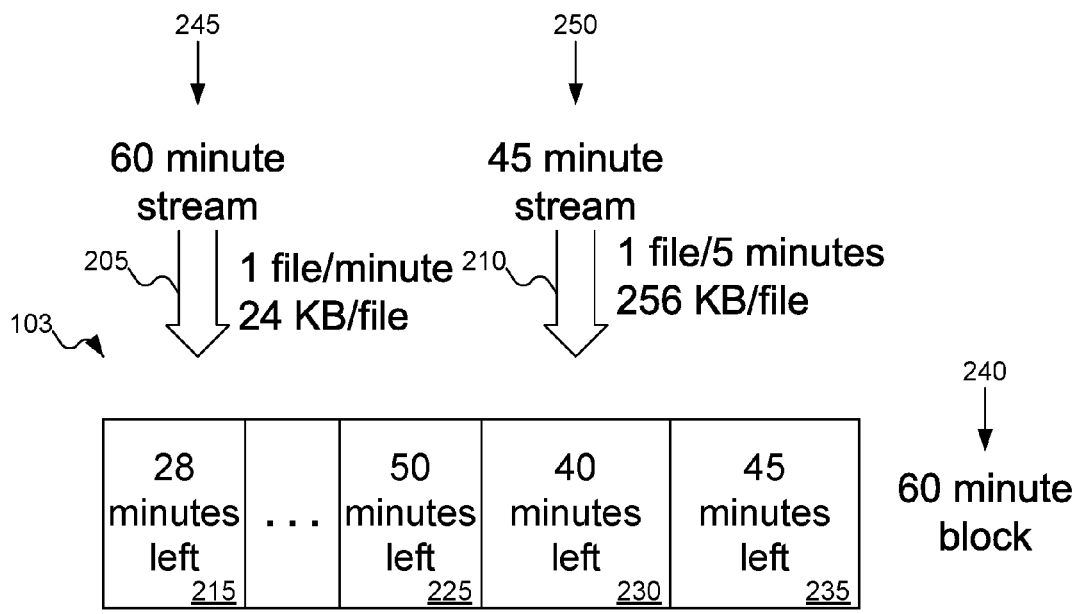

As may be seen by comparing FIGS. 2B-2D with FIGS. 3A-3D, when there are more streams from which to select, the time until all the data in the block expires may be less. For example, in FIGS. 2B-2D, all the data in the block is expected to expire at time 1:32; in FIGS. 3A-3D, all the data in the block is expected to expire at time 1:15. The data in the block is also more likely to have data expire at roughly the same time, making the block less likely to be selected for garbage collection while the block still contains valid data.

In FIGS. 2A-2D, two streams are described and used to write data to block 103. In FIGS. 3A-3D, four streams are described and used to write data to block 103. But while these examples show all of the streams being used to write data to block 103, other embodiments of the inventive concept may use only a subset of the available streams. For example, in FIGS. 2A-3D, there might be 20 streams being written to the SSD, but only a few of those streams are written to block 103. And the various streams may have different TTLs, write sizes, and write arrival rates, without limitation.

There is a lower limit on how early a block would be ready for optimal garbage collection. Each page written to block 103 has its own TTL, depending on the stream from which it originated. In the worst case, a block might have valid data for as long as it takes to fill the block plus the maximum TTL for any data written to the block. More accurately, block 103 will contain some valid data up to $$\max_{pages}(\text{time written (page)} + TTL(\text{page})).$$

Note that it may happen that an earlier-written page might have a longer TTL, and the expiration time for that page might be later than the expiration time for a later-written page with a shorter TTL. But frequently, the expiration time for all data in the block will be the expiration time for the last data written to the block. Thus, if it takes one hour to completely fill the block, and the last data written has a 15 minute TTL, then all the data in the block may be expected to expire at around time 1:15.

Figure 4:
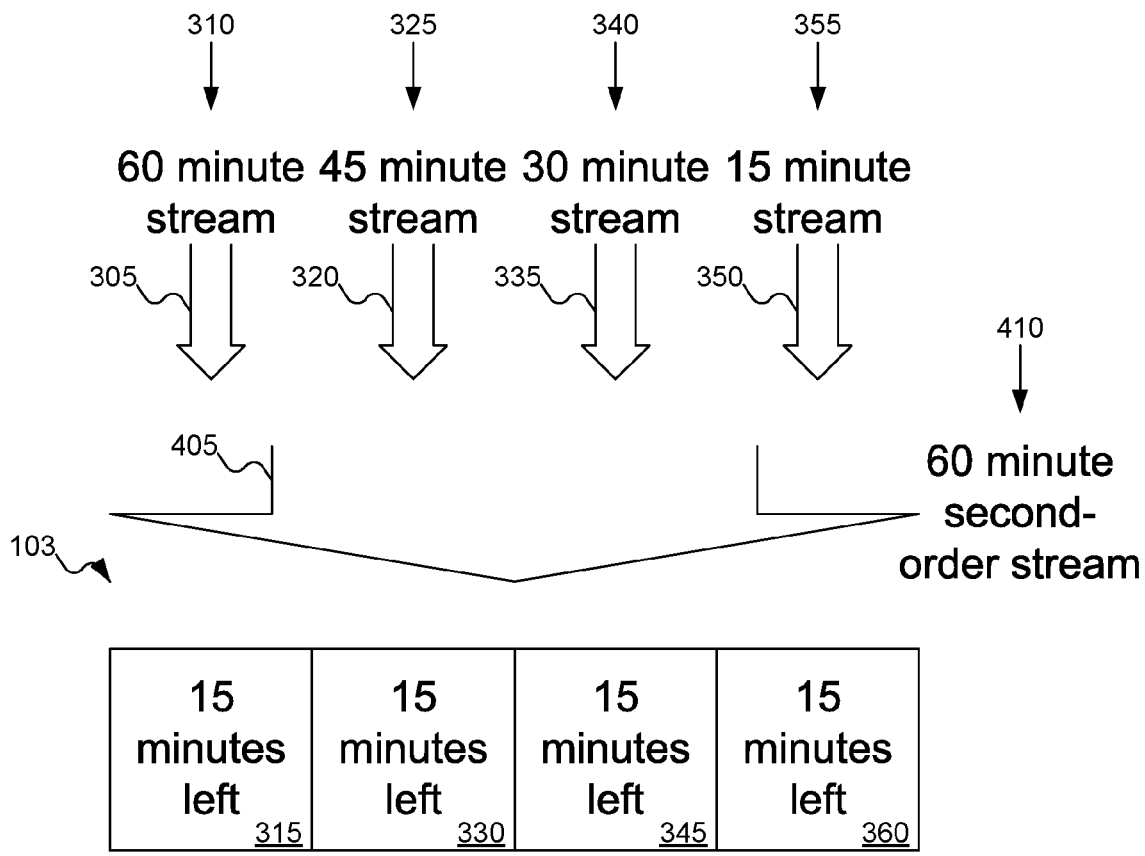
FIG. 4 shows the block of FIG. 1 receiving data associated with a second-order stream with a TTL, according to an embodiment of the inventive concept.

In other embodiments of the inventive concept, all first-order streams would be analyzed as was shown in above. But instead of writing directly to blocks, the first-order streams would write to time-limited second-order streams based on the time remaining in those streams. FIG. 4 illustrates an example of a second-order stream.

As a simple case, assume the same first-order streams shown in FIGS. 3A-3D:
Stream 305, with TTL 310 of 1 hour.
Stream 320, with TTL 325 of 45 minutes.
Stream 335, with TTL 340 of 30 minutes.
Stream 350, with TTL 355 of 15 minutes.
Also assume a single second-order stream 405, with TTL 410 of 1 hour.

When second-order stream 405 is created, it is first assigned data from stream 305. As second-order stream 405 ages and its lifespan approaches 45 minutes, it stops receiving data from stream 305 and starts receiving data from stream 320. Likewise, as the lifespan of second-order stream 405 approaches 30 minutes, it receives data from stream 335, and later when only 15 minutes remain, from stream 350.

Under this approach, block 103 assigned to second-order stream 405 would have all data invalidate within about 15 minutes of each other (note that this is the granularity of the first-order streams), and the maximum lifespan of the whole block would be about 1:15. Note that in this example, the behavior is similar to the embodiment shown in FIGS. 3A-3D, but this need not be the case. In instances where data fill rates are high compared to the lifespan of the data or the remaining size of the block, a second order stream embodiment may provide more flexibility. If a second order stream fills a block before it expires, it may be moved to a new block (with its remaining TTL); meanwhile, the old block will still have all of its data expire at approximately the same time (within the granularity of the first order streams). In other words, with a second-order stream mechanism, there is no strain on the system to find low-lifespan or fast-fill rate streams to fill a block nearing the end of its life. Note also that any block unfilled by an expiring second-order stream may be filled by a new stream having a lifespan similar to the remaining TTL of the data already stored in the block.

Note that with either solution, with more first-order streams, smaller time granularities may be obtained (meaning that the pages would have a tendency to invalidate within closer times of one another).

As with the first order embodiments presented earlier, many second-order streams may operate simultaneously. Different second-order streams may be created with different lifespans, depending on the attributes of the first-order streams.

In either solution, when the SSD decides to switch to a different stream (be it a different first-order stream writing to the block or a different first-order stream assigned to a second-order stream), the SSD may use any desired algorithm for selecting the new stream. One algorithm for selecting a new first-order stream is to select the stream with the smallest TTL greater than the remaining TTL for the block or second-order stream (or the largest TTL, if no stream has a TTL greater than the remaining TTL for the block or second-order stream). Thus, returning to FIG. 3A, since block 103 has TTL 240 of 60 minutes, stream 305, with TTL 310 of 60 minutes, is the best choice. When TTL 240 drops to 45 minutes in FIG. 3B, stream 320, with TTL 325 of 45 minutes, becomes the best choice using this algorithm. Then, when TTL 240 drops to 30 minutes in FIG. 3C, stream 335, with TTL 340 of 30 minutes, becomes the best choice using this algorithm, and so on. The same selection strategy may be applied when selecting a first-order stream to associate with second-order stream 405 of FIG. 4.

As an alternative, the SSD may select a first-order stream that has a TTL closest to the remaining TTL for the block. Thus, returning to FIG. 3A, stream 305, with TTL 310 of 60 minutes, is closest to block TTL 240 of 60 minutes, and remains the stream to use until time 0:07.5. After that time, stream 320, with TTL 325 of 45 minutes, is closest to remaining block TTL 240 of 52 1/2 minutes, and remains so until time 0:22.5. At time 0:22.5, stream 335, with TTL 340 of 30 minutes, is closest to remaining block TTL 240 of 37 1/2 minutes, and so on.

Figure 5:
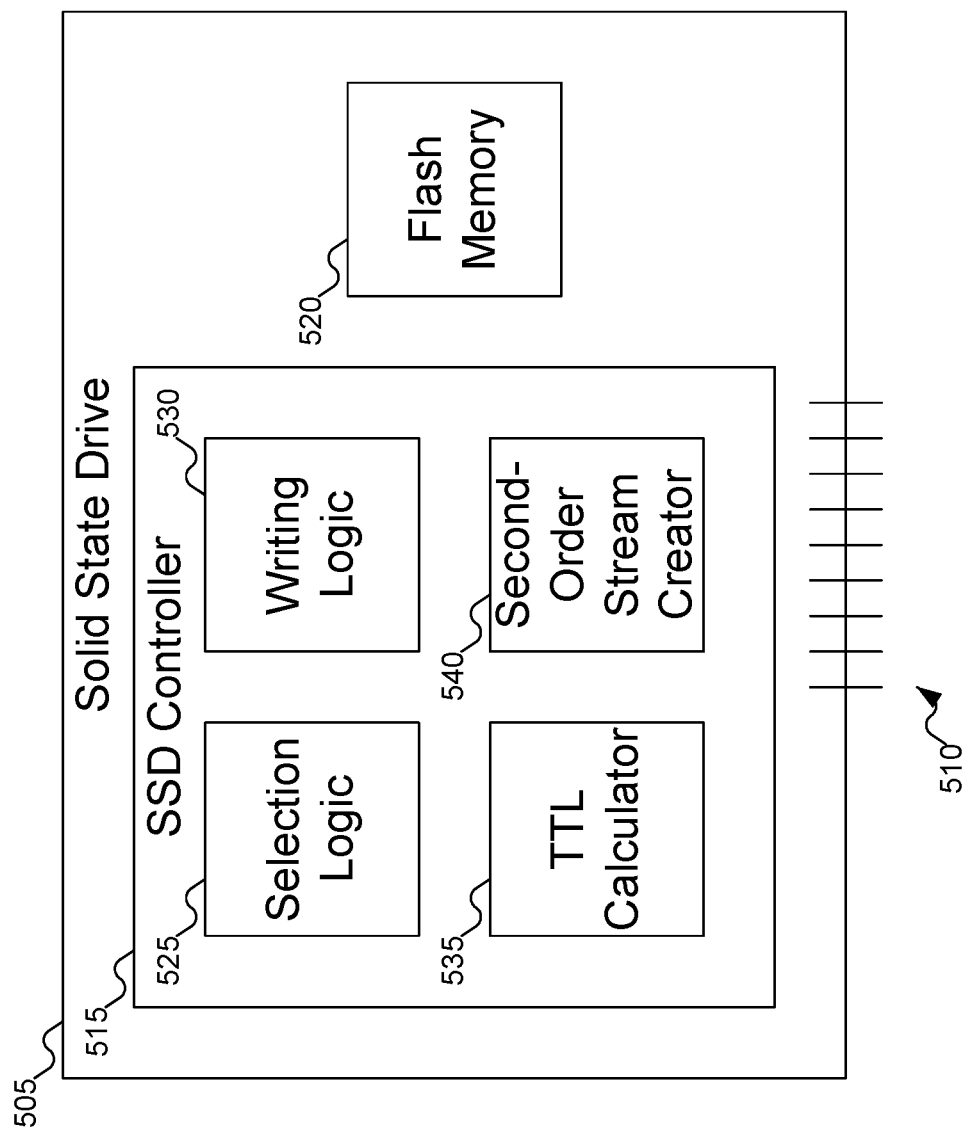
FIG. 5 shows a Solid State Drive (SSD) to write data from different streams to the block of FIG. 1, according to embodiments of the inventive concept.

FIG. 5 shows a Solid State Drive (SSD) to write data from different streams to the block of FIG. 1, according to embodiments of the inventive concept. In FIG. 5, SSD 505 is shown. SSD 505 may include circuitry 510 that may be used to send and receive information (such as operations or data). SSD 505 may also include SSD controller 515 and flash memory 520. SSD controller 515 may control the operation of SSD 505. Flash memory 520 may store data (that is, flash memory 520 may store block 103 of FIG. 1, among other blocks).

SSD controller 515 may include, among other components, selection logic 525, writing logic 530, and TTL calculator 535. Selection logic 525 may select a stream to be used, either for writing to block 103 of FIG. 1 or assigning to second-order stream 405 of FIG. 4 (if second-order stream 405 of FIG. 4 is used). Writing logic 530 may write data to flash memory 520 (possibly under the command of second-order stream 405 of FIG. 4). More specifically, writing logic 530 may write data to a page in flash memory 520, such as a page in block 103 of FIG. 1. TTL calculator 535 may calculate a TTL, for either a stream (such as TTLs 245 and 250 of FIGS. 2A-2D, TTLs 310, 325, 340, and 355 of FIGS. 3A-3D, TTL. 410 of FIG. 4) or a block (such as block TTL 240 of FIGS. 2A-3D).

In embodiments of the inventive concept using second-order streams, SSD controller 515 may also include second-order stream creator 540. Second-order stream creator 540 may create second-order stream 405 of FIG. 4, which may be associated with block 103 of FIG. 4.

Figure 6:
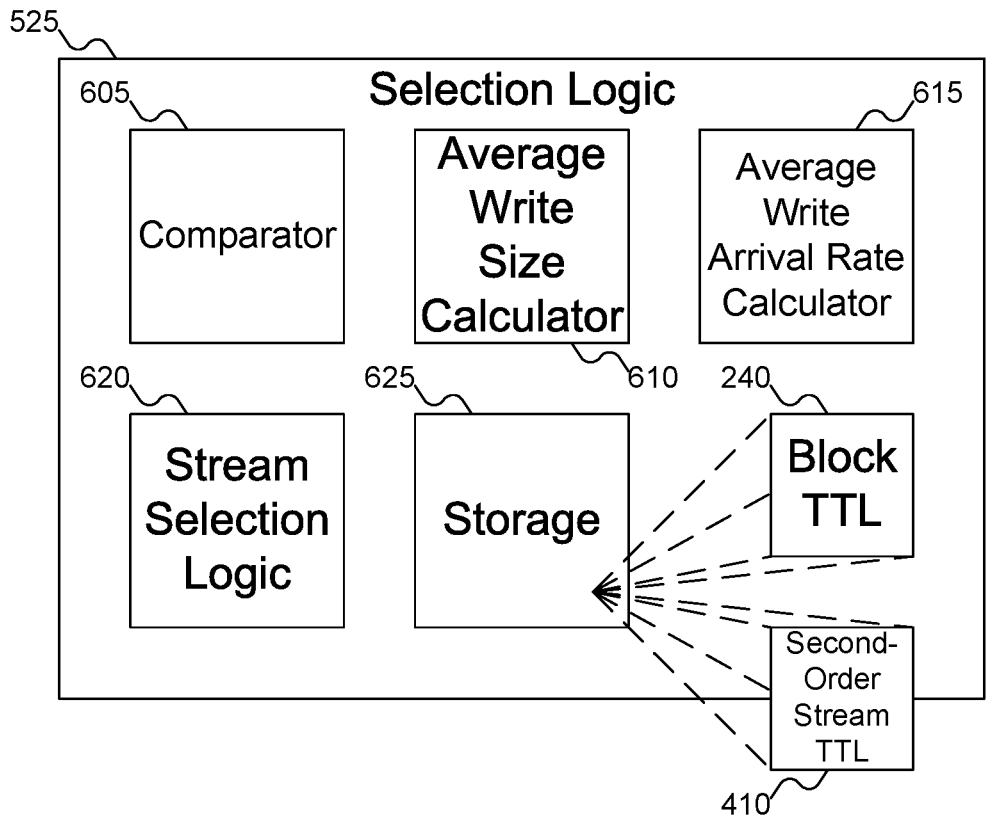
FIG. 6 shows details of the selection logic of FIG. 5.

FIG. 6 shows details of selection logic 525 of FIG. 5. In FIG. 6, selection logic 525 may include comparator 605, average write size calculator 610, average write arrival rate calculator 615, stream selection logic 620, and storage 625. Storage 625 may store block TTL 240 and/or second-order stream TTL 410 (although block TTL 240 and second-order stream TTL 410 may be stored externally to selection logic 525). Comparator 605 may compare TTLs 245 and 250 of FIGS. 2A-2D (for streams 205 and 210 of FIGS. 2A-2D) and TTLs 310, 325, 340, and 355 of FIGS. 3A-3D (for streams 305, 320, 335, and 350 of FIGS. 3A-3D) with either block TTL 240 or second-order stream TTL 410, depending on the embodiment of the inventive concept. Based on this comparison, stream selection logic 620 may select what stream should write to block 103 of FIG. 1 or be assigned to second-order stream 405 of FIG. 4, depending on the embodiment of the inventive concept.

Selection logic 525 may operate at any desired time. For example, selection logic 525 may be used on a periodic basis, such as every 5 minutes. Or, selection logic 525 may be used whenever a new write operation is sent to SSD 505 of FIG. 5. Or, selection logic 525 may be used whenever block TTL 240 or second-order stream TTL 410 becomes lower than TTL 245 or 250 of FIGS. 2A-2D or TTLs 310, 325, 340, or 355 of FIGS. 3A-3D of the stream currently writing to block 103 of FIG. 1 or second-order stream 405 of FIG. 4. Selection logic 525 may also factor in other information, such as the average write size and average write arrival rate of each stream, in selecting a stream. For example, consider again block 103 of FIGS. 2A-3D with TTL 240 of FIGS. 2A-3D of 60 minutes, and assume that block 103 of FIGS. 2A-3D includes 60 pages. A stream that writes one page per minute with a TTL of 60 minutes would mean that block 103 would contain valid data for 120 minutes (60 minutes until the last page is written, and 60 minutes until that page expires). But if the only other stream available writes one page every five minutes with a TTL of 15 minutes and selection logic 525 switched to that stream at time 0:45, it would take 120 minutes to fill block 103, plus another 15 minutes before the last data in block 103 expired. Thus, the average write size and average write arrival rate may impact the optimal time at which to change streams. Other schedules for using selection logic 525 may also be used, without limitation.

Figure 7:
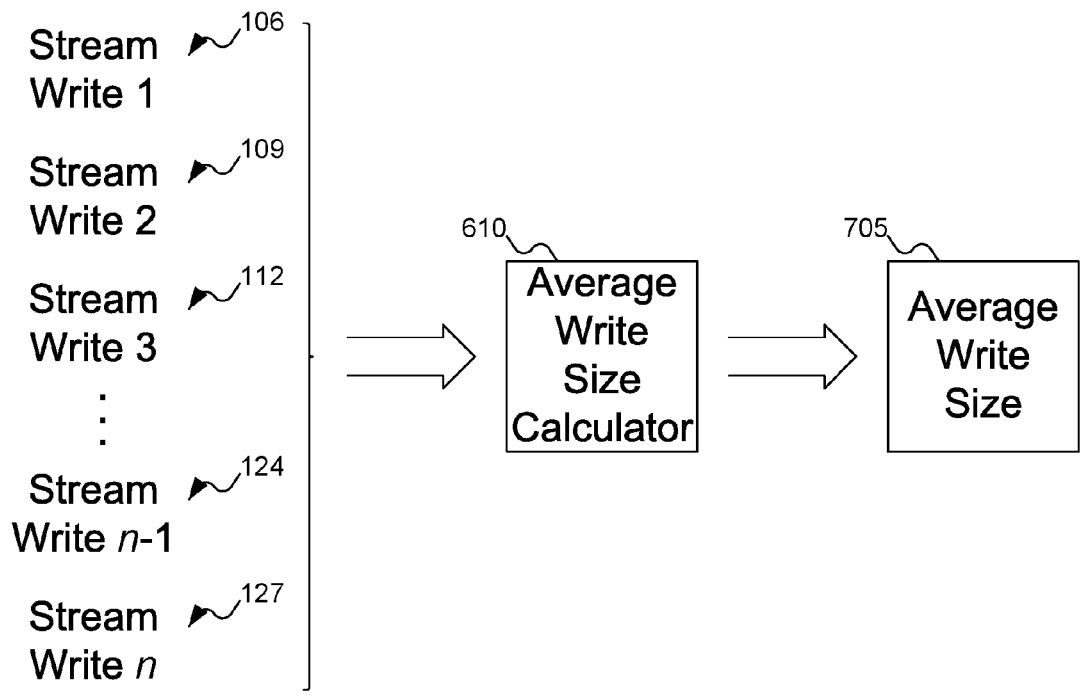
FIG. 7 shows details of the average write size calculator of FIG. 6.

FIG. 7 shows details of average write size calculator 610 of FIG. 6. In FIG. 7, average write size calculator 610 may receive information about write operations 106, 109, 112, 124, and 127 for a given stream, and calculate average write size 705 for those writes (that is, the sum of the amount of data written, divided by the number of write operations performed). As described above, average write size calculator 610 may use all available information for the stream, or the most recent n write operations for the stream, or the earliest k of the last n write operations for the stream, or the write operations for the stream that occurred in the last t minutes, or any other desired approach to select write operations for the stream.

Figure 8:
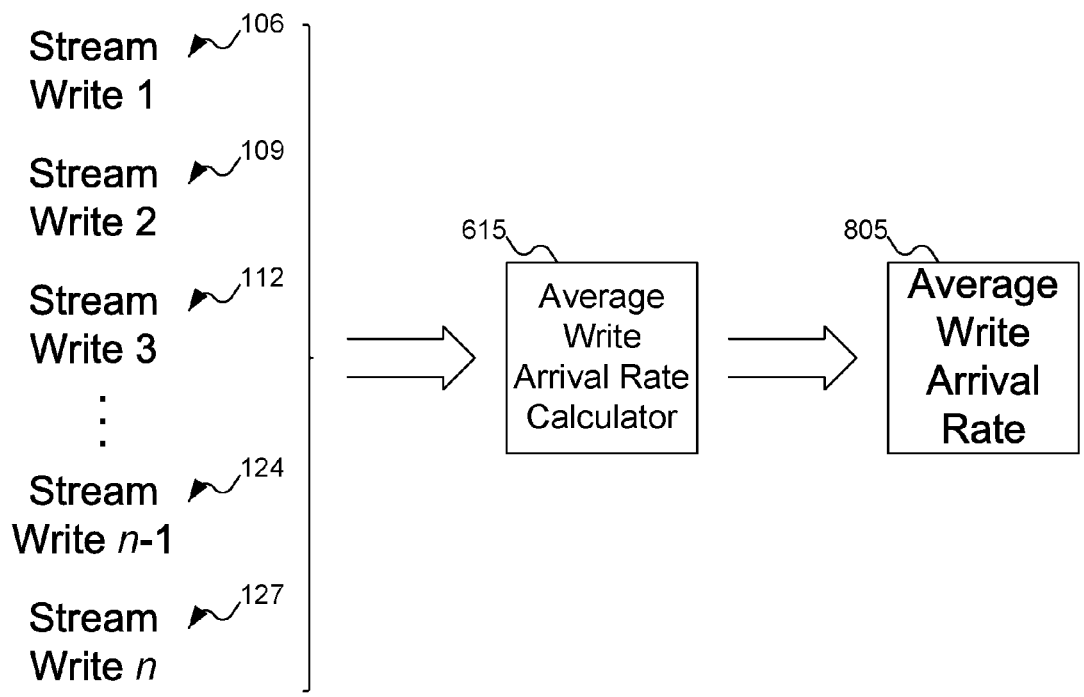
FIG. 8 shows details of the average write arrival rate calculator of FIG. 6.

FIG. 8 shows details of average write arrival rate calculator 615 of FIG. 6. In FIG. 8, average write arrival rate calculator 615 may receive information about write operations 106, 109, 112, 124, and 127 for a given stream, and calculate average write arrival rate 805 for those writes (that is, the amount of time between the first and last write operation, divided by the number of write operations performed in that interval). As described above, average write arrival rate calculator 615 may use all available information for the stream, or the most recent n write operations for the stream, or the earliest k of the last n write operations for the stream, or the write operations for the stream that occurred in the last t minutes, or any other desired approach to select write operations for the stream.

Figure 9:
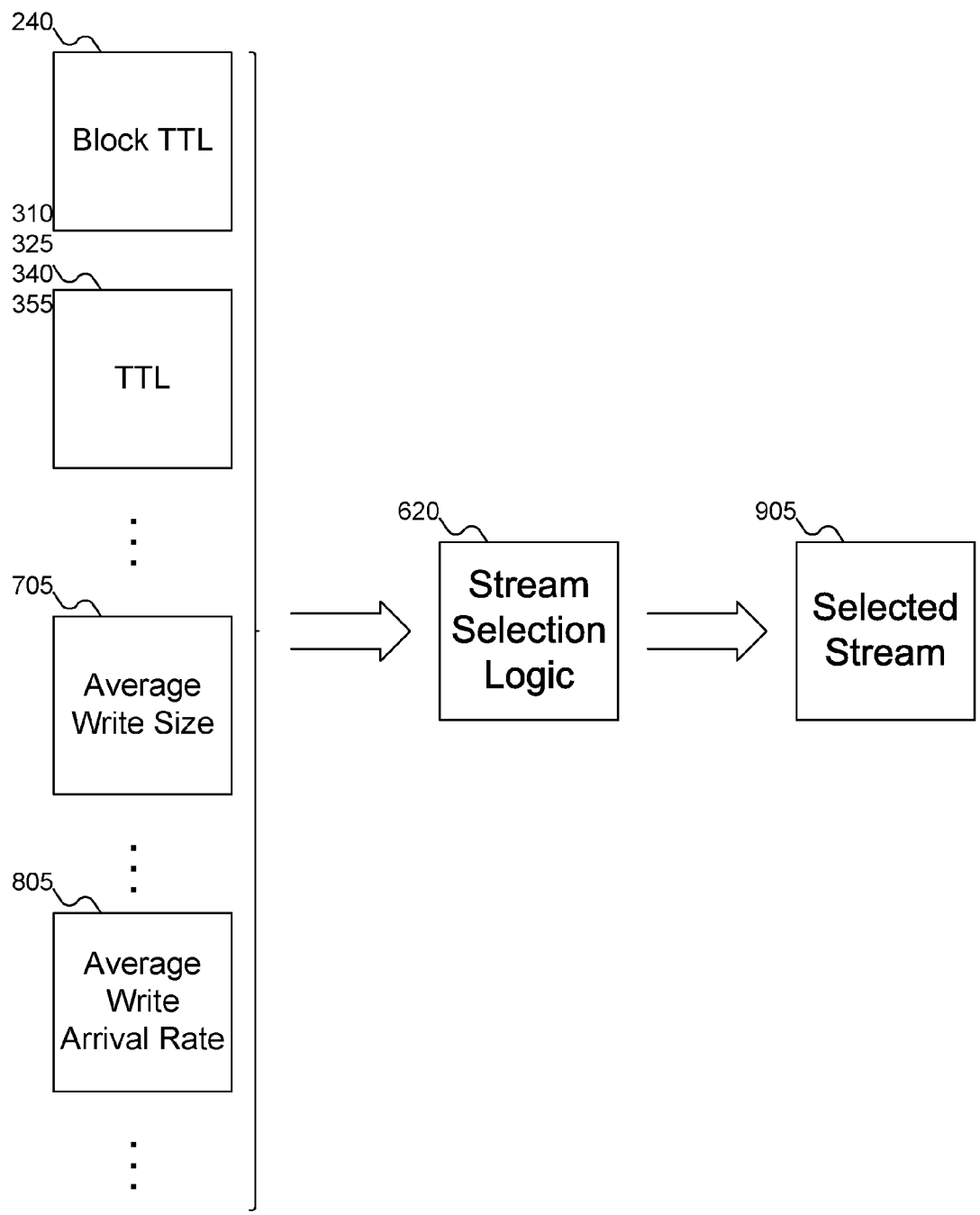
FIG. 9 shows details of the stream selection logic of FIG. 6.

FIG. 9 shows details of stream selection logic 620 of FIG. 6. In FIG. 9, stream selection logic 620 may receive various information, such as block TTL 240 of FIGS. 2A-3D, TTLs 245 and 250 of FIGS. 2A-2D from streams 205 and 210 of FIGS. 2A-2D, TTLs 310, 325, 340, and 355 of FIGS. 3A-3D from streams 305, 320, 335, and 350 of FIGS. 3A-3D, average write size 705 for each stream, and average write arrival rate 805 for each stream. Stream selection logic 620 may use this information to select stream 905 to write to block 103 of FIGS. 2B-3D. Stream selection logic 620 may use any desired strategy to select stream 905 to write to block 103 of FIGS. 2B-3D or to second order stream 405 of FIG. 4. For example, stream selection logic 620 may select a stream with the highest TTL less than the remaining TTL for block 240 of FIGS. 2A-3D. Or, stream selection logic 620 may calculate when to switch streams to optimize data expiration, as exemplified above with reference to FIGS. 2A-2D. Stream selection logic 620 may also use other selection strategies. As described above, stream selection logic 620 may use all of the provided information, or just some of it, to select stream 905. If, in an embodiment of the inventive concept, stream selection logic 620 does not use all of the information shown in FIG. 9, then stream selection logic 620 does not need to be provided all the information shown in FIG. 9.

Figure 10:
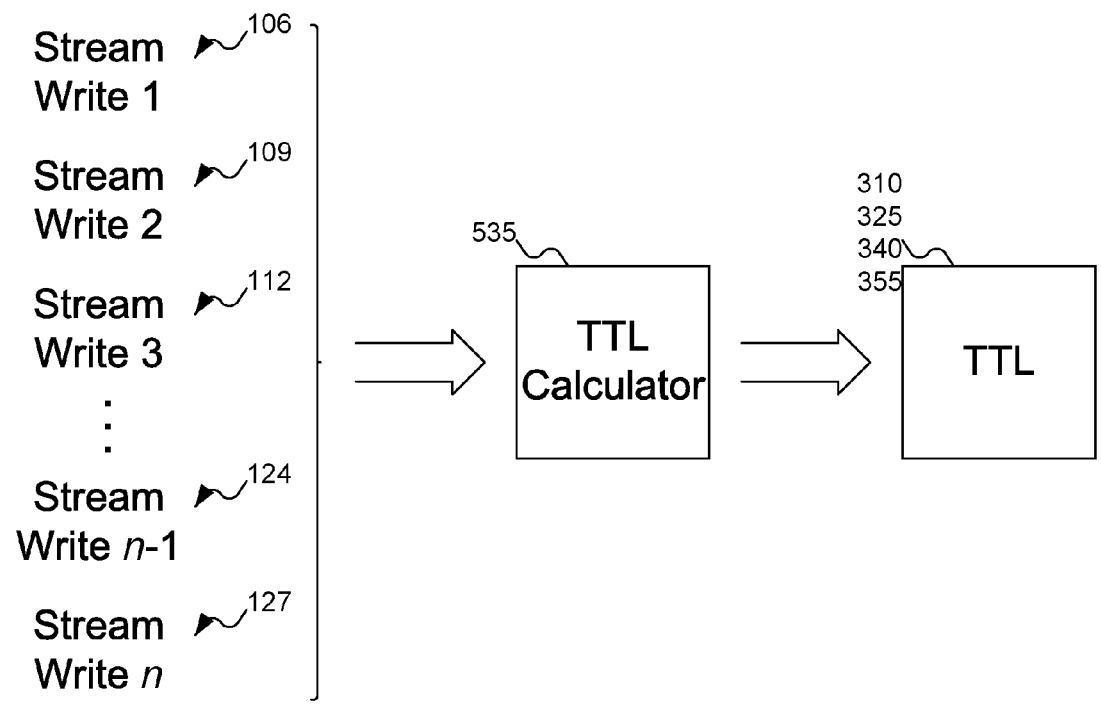
FIG. 10 shows details of the TTL calculator of FIG. 5.

FIG. 10 shows details of TTL calculator 535 of FIG. 5. In FIG. 10, TTL calculator 535 may receive information about write operations 106, 109, 112, 124, and 127 for a given stream, and calculate TTL 310, 325, 340, and 355 for those streams (that is, by measuring the time duration between when data is written and when that data is either modified or deleted, then summing those durations and dividing by the number of pages affected). As described above, TTL calculator 535 may use all available information for the stream, or the most recent n write operations for the stream, or the earliest k of the last n write operations for the stream, or the write operations for the stream that occurred in the last t minutes, or any other desired approach to select write operations for the stream.

Figure 11:
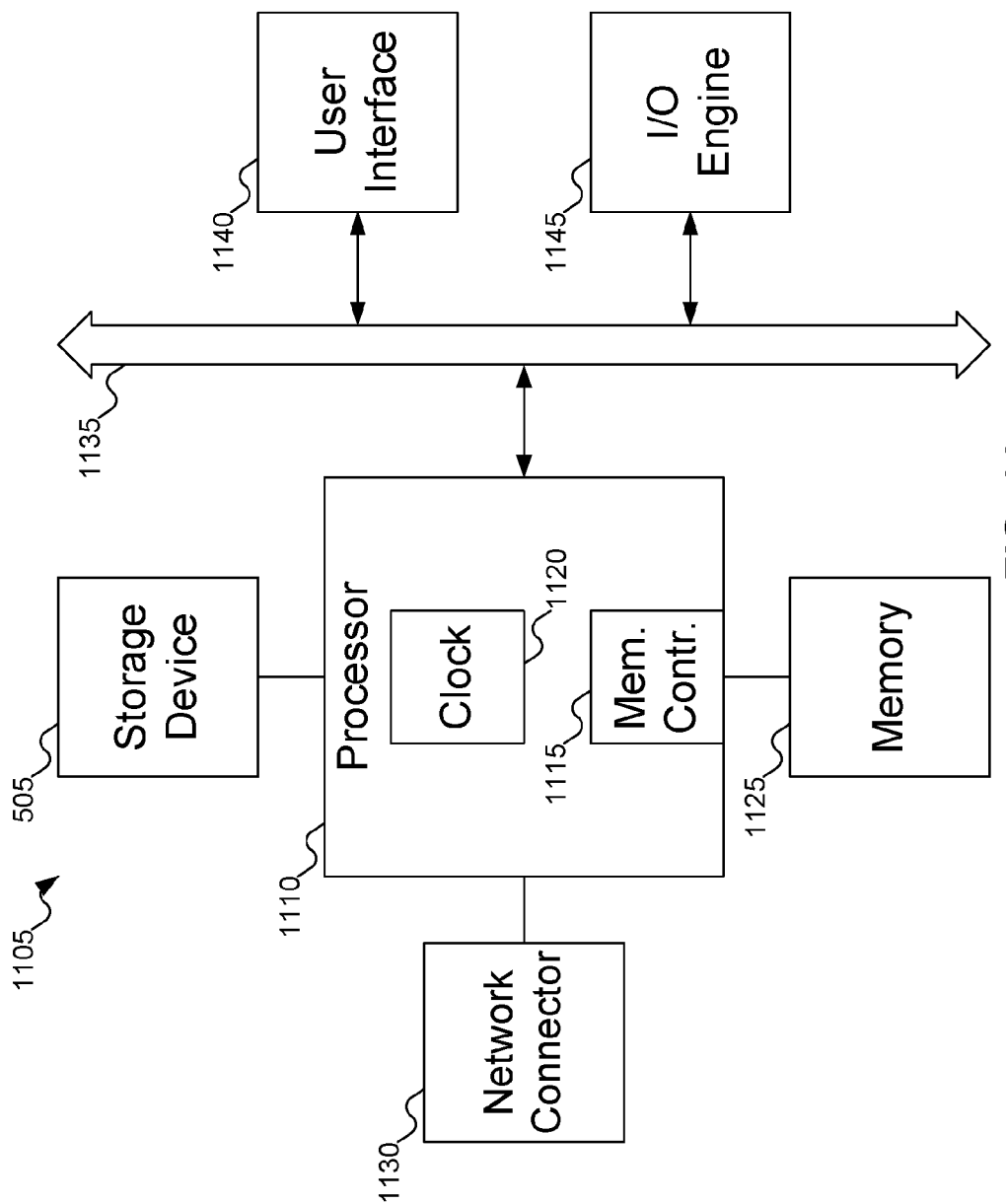
FIG. 11 shows details of a machine that may include the SSD of FIG. 5.

FIG. 11 shows details of a machine that may include the SSD of FIG. 5. Referring to FIG. 11, typically, machine or machines 1105 include one or more processors 1110, which may include memory controller 1115 and clock 1120, which may be used to coordinate the operations of the components of machine or machines 1105. Processors 1110 may also be coupled to memory 1125, which may include random access memory (RAM), read-only memory (ROM), or other state preserving media, as examples. Processors 1110 may also be coupled to storage devices 505 and network connector 1130, which may be, for example, an Ethernet connector. Processors 1110 may also be connected to a bus 1135, to which may be attached user interface 1140 and input/output interface ports that may be managed using input/output engine 1145, among other components.

Figure 12:
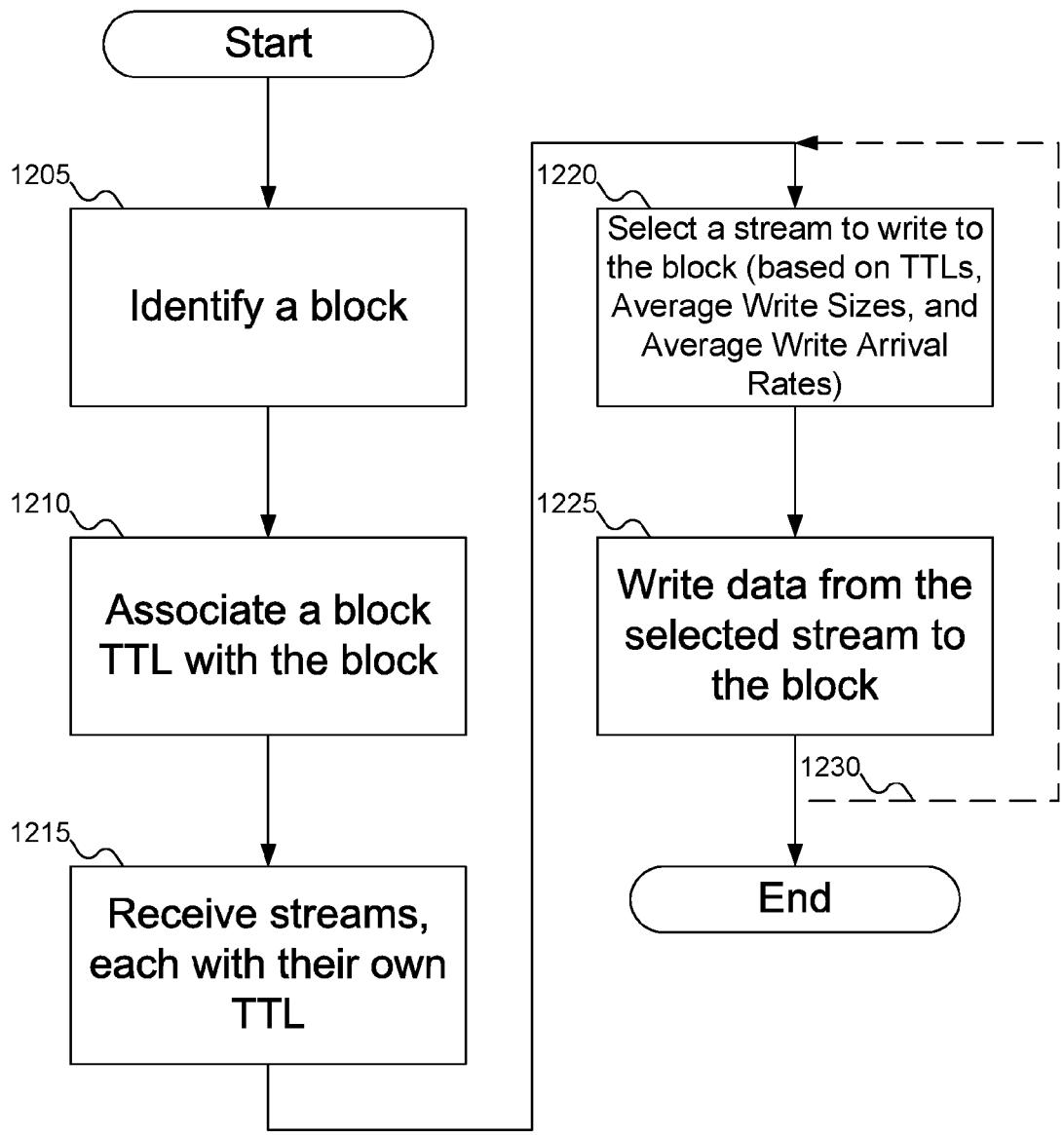
FIG. 12 shows a flowchart of a procedure for the SSD of FIG. 5 to write data from different streams to the block of FIG. 1, according to an embodiment of the inventive concept.

FIG. 12 shows a flowchart of a procedure for the SSD of FIG. 5 to write data from different streams to the block of FIG. 1, according to an embodiment of the inventive concept. In FIG. 12, at block 1205, SSD 505 of FIG. 5 may identify block 103 of FIG. 1. At block 1210, SSD 505 of FIG. 5 may associate TTL 240 of FIGS. 2A-3D with block 103 of FIG. 1. At block 1215, SSD 505 of FIG. 5 may receive streams 205 and 210 of FIGS. 2A-2D, and streams 305, 320, 335, and 350 of FIGS. 3A-3D. At block 1220, SSD 505 of FIG. 5 may select stream 905 to write to block 103 of FIG. 1. At block 1225, SSD 505 of FIG. 5 may write data from selected stream 905 to block 103 of FIG. 1. As shown by dashed line 1230, control may optionally return to block 1220 to enable SSD 505 of FIG. 5 to select a different stream to write to block 103 of FIG. 1 at a later time.

Figure 13:
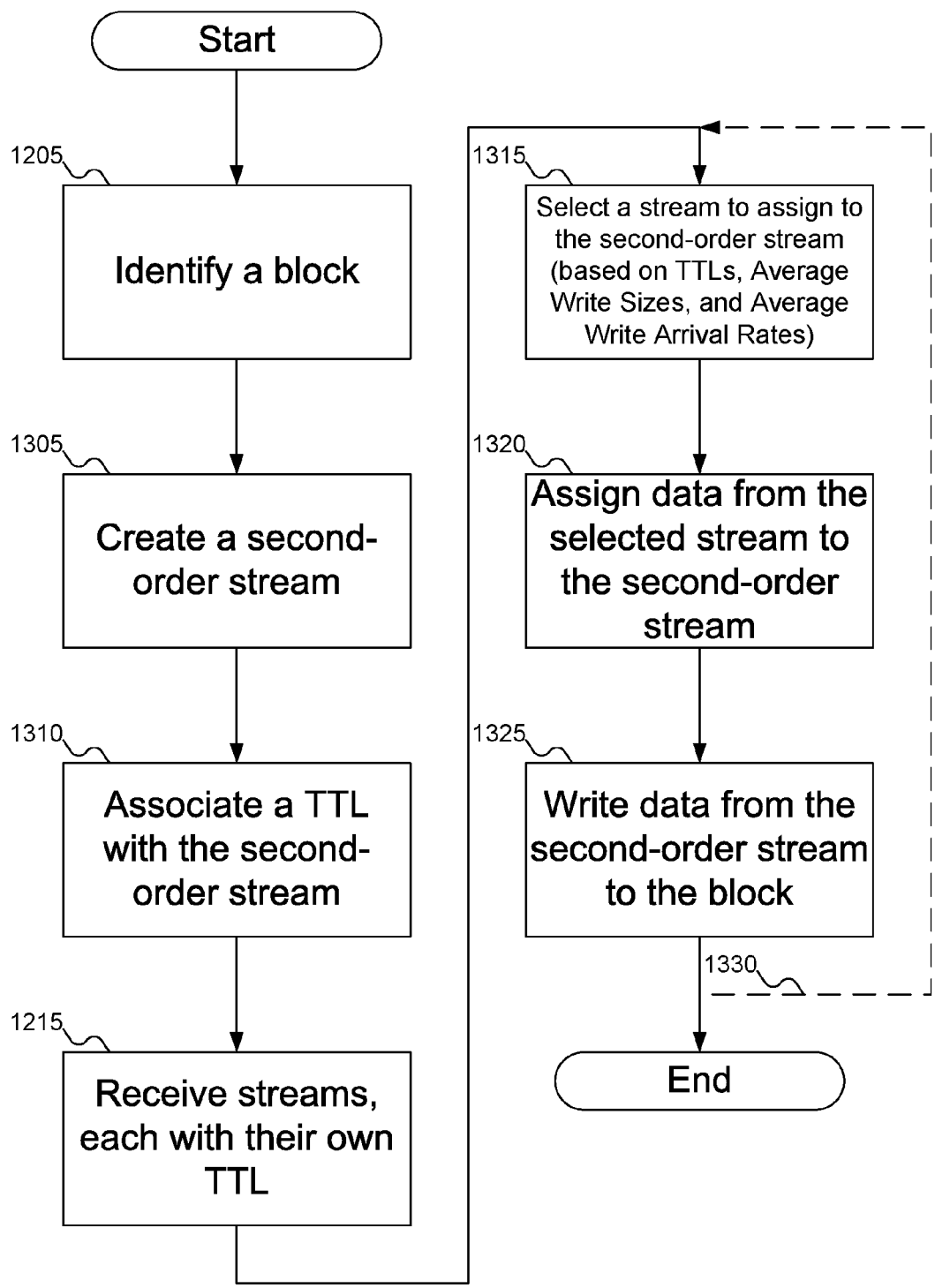
FIG. 13 shows a flowchart of a procedure for the SSD of FIG. 5 to write data from different streams to the block of FIG. 1 using a second-order stream, according to an embodiment of the inventive concept.

FIG. 13 shows a flowchart of a procedure for the SSD of FIG. 5 to write data from different streams to the block of FIG. 1 using a second-order stream, according to an embodiment of the inventive concept. In FIG. 13, at block 1205, SSD 505 of FIG. 5 may identify block 103 of FIG. 1. At block 1305, SSD 505 of FIG. 5 may create second-order stream 405 of FIG. 4. At block 1310, SSD 505 of FIG. 5 may assign TTL 410 of FIG. 4 to second-order stream 405 of FIG. 4. At block 1215, SSD 505 of FIG. 5 may receive streams 205 and 210 of FIGS. 2A-2D or streams 305, 320, 335, and 350 of FIGS. 3A-3D. At block 1315, SSD 505 of FIG. 5 may select stream 905 to write to second-order stream 405 of FIG. 4. At block 1320, SSD 505 of FIG. 5 may write data from selected stream 905 to second-order stream 405 of FIG. 4. At block 1325, SSD 505 of FIG. 5 may write data from second-order stream 405 of FIG. 4 to block 103 of FIG. 1. As shown by dashed line 1330, control may optionally return to block 1315 to enable SSD 505 of FIG. 5 to select a different stream to write to second-order stream 405 of FIG. 4 at a later time.

The above description shows how enhanced multi-streaming may be used to improve overall SSD performance by attempting to time data invalidation in a block. By attempting to carefully time when data in a block is invalidated, garbage collection efficiency may be enhanced, since less (or ideally, no) valid data would need to be programmed to another block before the erase block is freed. But the above description assumes that the metadata provided about the stream—such as the stream TTL—accurately represents the lifespan of the data in the stream. If this information is inaccurate—either because the data does not all conform to the stream metadata or because the host sending the stream metadata has provided incorrect stream metadata—then the overall performance of the SSD might be no better than if data were written to the SSD blocks randomly.

One problem with relying on a stream TTL is that the stream TTL is typically a single number. Be it 30 minutes, 36 hours, or any other single value, this number is often the mean or median value for the lifetime of stream data, or (for normal distributions) a point a certain number of standard deviations above the mean. Using this number in isolation discards an enormous amount of stream metadata. And while there is no way for the either the SSD or the host to know with 100% accuracy how long a particular piece of data will last before it is invalidated, modeling the stream using a more complicated model may provide a more accurate estimate.

FIGS. 14-15 illustrate how much data may be lost by relying on just a single number, such as a mean or median data value, as stream metadata, and the potential consequences of ignoring such information. FIG. 14 shows a graph of two example normal distribution curves with a common mean, but differing standard deviations. In FIG. 14, graph 1405 is shown, plotting the number of updates vs. the amount of time between updates, and comparing curves 1410 and 1415. But curve 1410 has a fairly narrow distribution, and therefore a small standard deviation. Curve 1415, on the other hand, has a fairly wide distribution, and therefore a large standard deviation.

Both curves 1410 and 1415 share mean value 1420 (and could easily share a common median value as well). In addition, for a given confidence level, curves 1410 and 1415 may be expected to have the same number of data points. (A confidence level may be thought of as a distance from mean 1420 in graph 1405 such that a given percentage of data points will lie within no further than that distance from mean 1420. Thus, for example, boundaries 1425 may represent the limits that include 90% of the data points of curve 1410, which may be expressed as a 90% confidence level.) One may also determine boundaries for a 90% confidence level for curve 1415. But because curve 1415 is wider, the boundaries for a 90% confidence level for curve 1415 would be further from mean 1420 than boundaries 1425 for a 90% confidence level for curve 1410. This means that outliers (i.e., data points that are outside the 90% confidence level) for curve 1410 tend to be closer to mean 1420 than outliers for curve 1415. The significance of these differences is discussed further below with reference to FIGS. 23-26.

While curves 1410 and 1415 in FIG. 14 are shown as normal distributions (e.g., Gaussian bell curves), curves 1410 and 1415 may be replaced with any other type of distribution: for example, a multi-modal distribution. The statistical analysis described below may apply equally to other distribution forms.

In some situations, the data does not fit well with a "simple" distribution function. FIG. 15 shows an example histogram of data that does not conform to a distribution model like those shown in FIG. 14. Graph 1505 in FIG. 15, like graph 1405 of FIG. 14, plotting the number of updates vs. the amount of time between updates. Curve 1510 may represent data update times for, for example, the office workers' spreadsheets discussed above. Most updates tend to happen around 18-24 hours apart. Then factoring in weekends, data might remain unchanged for approximately 60 hours. Then, as people might take vacations, updates might take around 160 hours.

Curve 1510 in graph 1505 does not conform to a normal distribution (or any other simple distribution). Instead, there are a large concentration of updates from around 18-36 hours, a smaller concentration of updates around 60 hours, and a still small concentration of updates around 160 hours. Centered around these local maxima, curve 1510 has what appears to be a normal distribution; but viewed in its entirety, the distribution of curve 1510 is not normal.

Using either a mean time between updates or a confidence interval (such as 90%), a stream TTL for curve 1510 would be roughly 60 hours. But this number hardly gives a complete picture of how the data is distributed. As may be seen by examining curve 1510, it is most likely that the data will be updated around 36 hours. If the data is not updated within 36 hours, it is next most likely that the data will be updated around 60 hours. And if the data is not updated by 60 hours, it is likely the data will be unchanged until around 160 hours.

Figure 16:
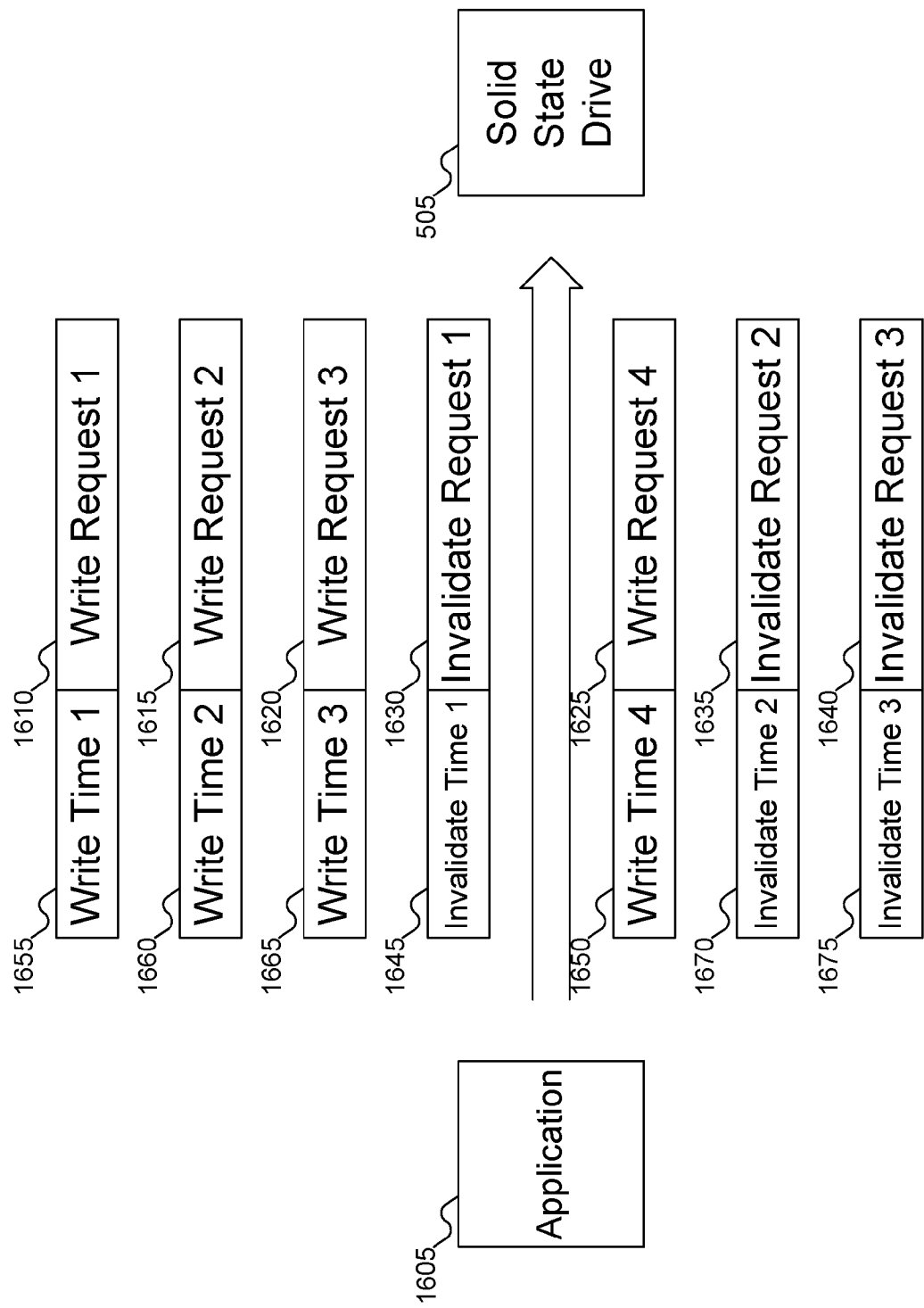
FIG. 16 shows a stream sending write and invalidate requests to the SSD of FIG. 5, according to an embodiment of the inventive concept.

FIG. 16 shows a stream sending write and invalidate requests to the SSD of FIG. 5, according to an embodiment of the inventive concept. In FIG. 16, application 1605 is shown issuing various write and invalidate requests to SSD 505. Application 1605 may also issue read requests; but as read requests to not change the data stored on SSD 505, read requests may be ignored for purposes of this discussion. For example, FIG. 16 shows application 1605 issuing write requests 1610, 1615, 1620, and 1625, and invalidate requests 1630, 1635, and 1640. These write requests and invalidate requests may be part of a stream, such as streams 305, 320, 335, and 350 of FIGS. 3A-3D. While FIG. 16 shows four write requests and three invalidate requests, these numbers are merely exemplary: embodiments of the inventive concept may support application 1605 issuing any number of write and invalidate requests as part of a stream.

Application 1605 may also send overwrite requests—that is, requests to replace existing data at an existing address with new data. With SSDs, overwrites are not permitted: the existing data must be invalidated (i.e., deleted) and the new data written to a new address on the storage device. For multi-streaming using other types of storage devices, overwrites may be possible. In some embodiments of the inventive concept, overwrites may be treated as not ending the life span of the data (since the data is immediately replaced). In other embodiments of the inventive concept, overwrites may be viewed as deleting the original data and writing new data in its place, and therefore both ending the original data life span and starting a new data life span. But if overwrites are viewed as not ending the life span of the original data, overwrites may be ignored (like read requests). And if overwrites are viewed as ending the life span of the original data and starting a life span for new data, overwrites may be considered a combination of delete and write requests. Thus, for example, rather than sending invalidate request 1630 and write request 1625, application 1605 might send a single overwrite request, which SSD 505 may interpret as invalidate request 1630 and write request 1625. In this example, invalidate time 1645 and write time 1650 might be identical in value (or very close, with invalidate time 1645 slightly preceding write time 1650).

FIG. 16 suggests that streams may be determined by an application issuing the requests. While this is one way to decide what data is to be included in a stream, embodiments of the inventive concept may include any desired source for a stream designation. For example, a stream might include all requests issuing from a particular host machine, or a set of host machines. Or, a stream might include all requests associated with particular users, regardless of the machine any particular user in that group is using. Typically, streams are defined externally to SSD 505, since SSD 505 has no information about the source of the requests beyond the file system that issued the request, but streams could be defined by SSD 505 given sufficient information to associate requests with a particular stream, as described herein.

For simplicity, FIG. 16 also shows the write requests and invalidate requests paired by number. For example, invalidate request 1630 may delete the data originally written by write request 1610, invalidate request 1635 may delete the data originally written by write request 1615, and invalidate request 1640 may delete the data originally written by write request 1620. (The data written by write request 1625 may still be resident on SSD 505, as application 1605 has not yet issued a invalidate request for this data.) While FIG. 16 shows the write requests and invalidate requests identified by numbers, in practice SSD 505 may match invalidate requests with write requests based on the data being accessed: for example, using the Logical Page Address (LPA) in the request.

FIG. 16 also shows write times 1655, 1660, 1665, and 1650, and invalidate times 1645, 1670, and 1675. Each write time and invalidate time may correspond to a particular write and invalidate request. Thus, for example, write time 1655 may be the time at which write request 1610 is used, write time 1660 may be the time at which write request 1615 is issued, and so on. SSD 505 may determine the time of the request either by accessing an internal clock when the request is received (if SSD 505 includes such a clock) or by interrogating the host machine from which the requests issued. Alternatively in some embodiments of the inventive concept, the host machine may provide write times 1655, 1660, 1665 and 1650 and invalidate times 1645, 1670, and 1675 automatically. And in yet other embodiments of the inventive concept, instead of using the time the request was issued, SSD 505 may use the time SSD 505 performed the request (again, relying on either an internal clock or a clock in the host machine to determine the time of the request).

Figure 17:
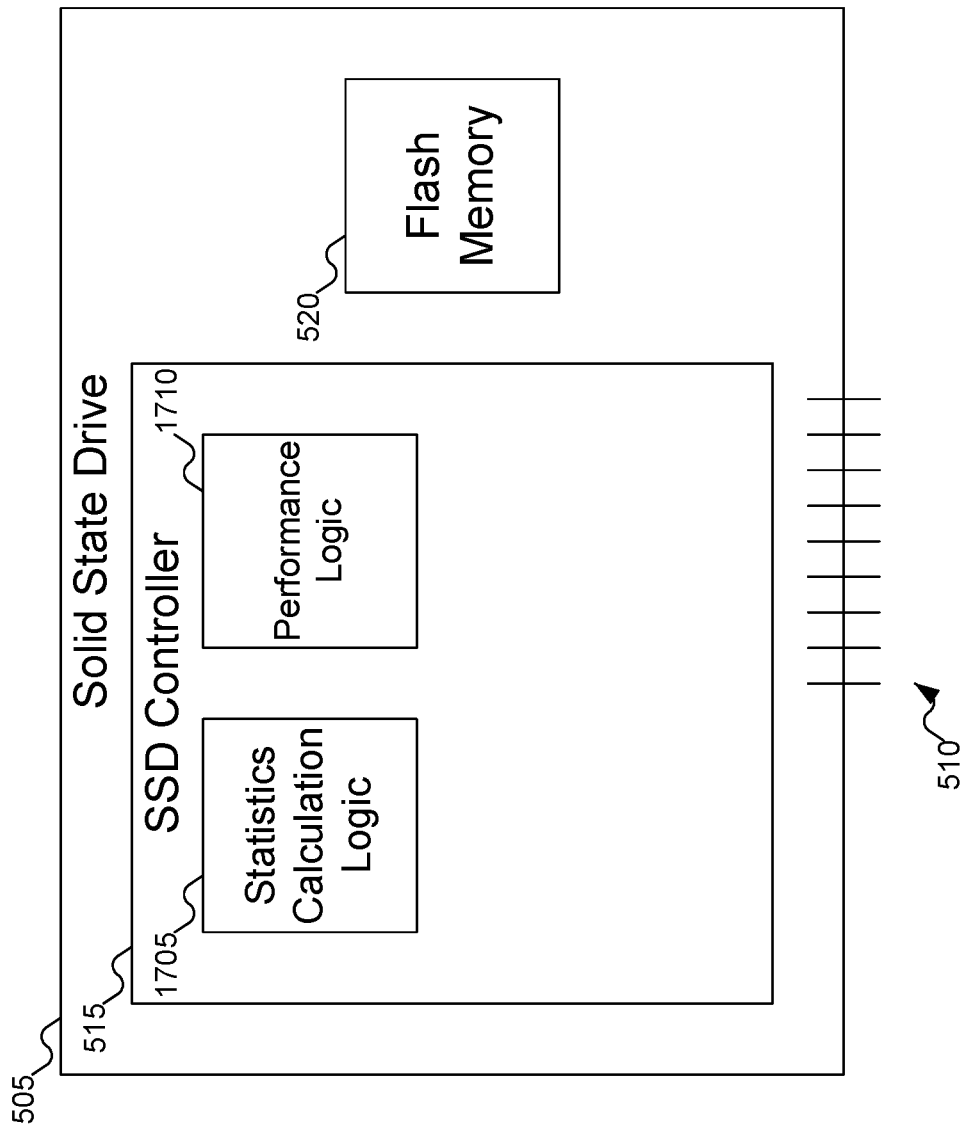
FIG. 17 shows details of the SSD of FIG. 16.

FIG. 17 shows details of SSD 505 of FIG. 16. In contrast to SSD 505 of FIG. 5, in FIG. 17 SSD 505 may include other components within SSD controller 515. Specifically, SSD controller 515 may include statistics calculation logic 1705 and performance logic 1710. Statistics calculation logic 1705 may calculate the statistics for a data stream, and performance logic 1710 may use the statistics calculated by statistics calculation logic 1705 to improve the performance of SSD 505.

Figure 18:
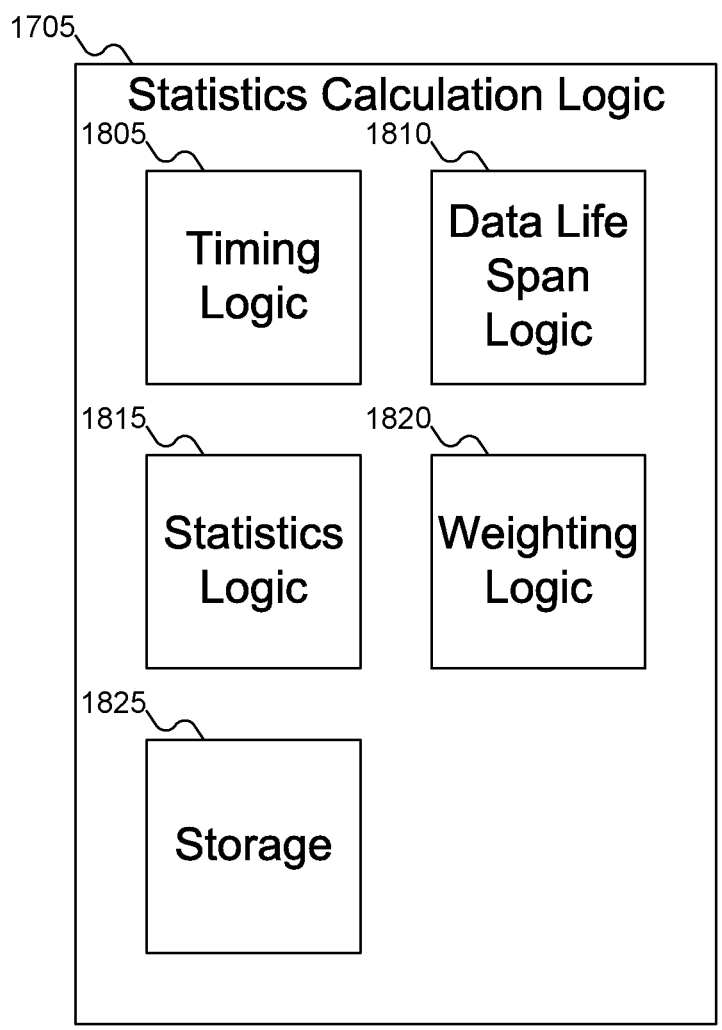
FIG. 18 shows details of the statistics calculation logic of FIG. 17.

FIG. 18 shows details of statistics calculation logic 1705 of FIG. 17. In FIG. 18, statistics calculation logic 1705 may include timing logic 1805, data life span logic 1810, statistics logic 1815, weighting logic 1820, and storage 1825. Timing logic 1805 may determine the time of a request. Data life span logic 1810 may calculate the life span of an individual data element. Statistics logic 1815 may determine statistics for the stream as a whole from information about individual data elements. Weighting logic 1820 may store information about how to weight individual data elements.

Storage 1825 may store stream metadata: for example, the write and invalidate times for individual requests, the life spans of data elements, and/or the overall statistical information about the stream. For any particular data element stored on SSD 505 of FIG. 17, statistics calculation logic 1705 may use two pieces of data: the ID of the stream which issued the request and how long the data was stored before it was deleted (or, more technically, invalidated by application 1605 of FIG. 16, since deletion depends on SSD 505 of FIG. 17 performing garbage collection to reclaim the invalid pages, which might not occur immediately upon data invalidation). The ID of the stream enables statistics logic 1815 to know from what stream the data originated, permitting statistics logic 1815 to calculate the statistics for that stream. How long the data was stored before it was invalidated provides statistics logic 1815 with the metadata pertinent to that particular data element for the stream. Given these two values, statistics calculation logic 1705 may attempt to fit a statistical function, such as a distribution function, to the data of the stream, or may store a histogram of the data of the stream. The statistical function or histogram may then be used to make predictions about the lifetime of future data in the stream that are hopefully more accurate.

For example, many distribution functions, including the normal distribution, are completely defined by knowing the mean and variance of the data. These values may be calculated using the equations $$m = \frac{\sum X}{n} \text{ and } s = \sqrt{\frac{\sum (X-m)^2}{n-1}},$$

where X is replaced by each of the individual data life spans for the stream and n represents the number of data elements in the set being exampled. The size of n, and the corresponding values of X, may vary, not only because of changes in data written to SSD 505 of FIG. 17 but also because data that is too old may be discarded. For example, as described below, a sliding window may be used, limiting the data used in the calculated statistics to only a most recent subset of all stream data life spans. If a sliding window is employed that considers only the 1000 most recent data life spans, then n would remain constant at 1000 (after 1000 stream writes and invalidations had occurred), and the values of X would vary with the 1000 most recent stream writes and invalidations. For other distributions functions, other variables may be computed. Statistics logic 1815 may generate any number of distribution functions and then select the distribution function that provides the smallest margin of error relative to the actual data. And if no sufficiently accurate distribution function may be found, statistics logic 1815 may always generate histogram 1510 of FIG. 15 to determine the expected life spans for data.

Although FIGS. 17 and 18 suggest that storage 1825 of FIG. 3 is within SSD controller 515, other embodiments of the inventive concept may include storage 1825 elsewhere. For example, storage 1825 occupy part of flash memory 520 of FIG. 17. Or, storage 1825 may be stored within the flash translation layer (FTL) of SSD 505 of FIG. 17. Or, storage 1825 may be stored in dynamic RAM within SSD 505 of FIG. 17.

How long the data was stored on SSD 505 of FIG. 17 may be stored either as a single value, or by storing a pair of write and invalidate times for the data (which permits direct calculation of how long the data was stored on SSD 505 of FIG. 17). But there are advantages to storing the write time for data as well, even where storage 1825 stores how long the data was stored as a single value. For example, knowing when the data was written to SSD 505 of FIG. 17 permits statistics logic 1815 to know how old the data is. Statistics logic 1815 may then use the age of the data in determining how heavily to weight its influence in calculated statistics 1410, 1415, and/or 1510 of FIGS. 14-15, it the data is used at all.

As an example of why the age of data may be pertinent to calculating statistics for a stream, it is important to recognize that storing information about every piece of data ever written on SSD 505 of FIG. 17 may require significant storage space. By using a sliding window that includes only the most recent transactions, or a sliding window that stores a digest or summary of the previous data, embodiments of the inventive concept may reduce the storage requirements for statistical data. The size of the sliding window may be any desired size. For example, the sliding window might include only the most recent 1000 data writes. Then, instead of potentially needing gigabytes of data just to store statistical information, storage 1825 would only need a few kilobytes per stream, making the storage requirements much easier to manage. The size of the sliding window may be any desired size: 1000 data writes is used here only as an example. Obviously, if a sliding window is used, the number of write times and invalidate times used in statistics logic 1815 is fewer than the number of write requests and invalidate requests issued in the stream.

By storing the write time of the data as well as how long the data was stored on SSD 505 of FIG. 17, statistics logic 1815 may factor in the age of data requests into its models. In this manner, statistics logic 1815 may identify the most recent data writes within the sliding window, and may delete older data writes from storage 1825. By using a sliding window, the impact of older data may be ignored. Older data might have a negative impact on the calculated statistics, if the data lifecycle patterns have changed. For example, consider the situation where originally data was stored on SSD 505 of FIG. 17 for 48 hours, but more recently has been stored for only 24 hours. If all the historical data is considered, the mean time until invalidation will end up higher than currently occurs. Thus, data will be written to blocks on SSD 505 of FIG. 17 that are expected to store valid data longer than would actually occur for data from that stream.

Consider also the reverse scenario, where older data was stored for less time than current data. In this scenario, the mean time until invalidation would be less than currently occurs. This could result in data being stored in blocks on SSD 505 that are expected to be invalidated sooner than would actually occur. If such blocks were then subject to garbage collection, there might well be valid data that would have to be programmed before the block could be freed. This programming would slow down garbage collection (and therefore data access requests) and increase the write amplification factor for SSD 505 of FIG. 17, both of which are undesirable.

Figure 19:
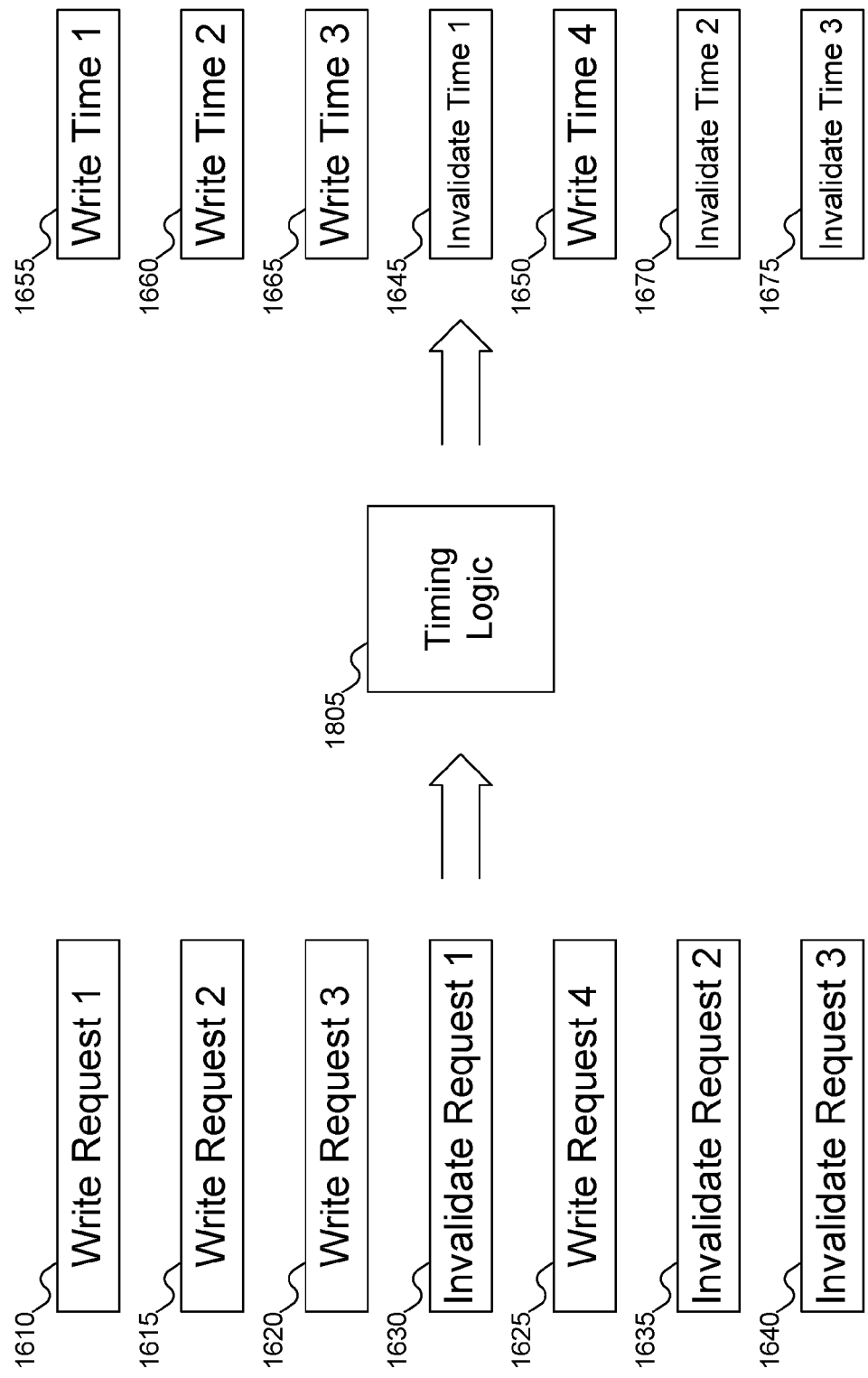
FIG. 19 shows the timing logic of FIG. 18 determining write times for the write requests of FIG. 16.

FIG. 19 shows timing logic 1805 of FIG. 18 determining write times for the write requests of FIG. 16. In FIG. 19, timing logic 1805 may receive various requests 1610-1640 and determine times 1655-1675 of those requests. As described above with reference to FIG. 16, in different embodiments of the inventive concept the time of a request may be the time the request is issued or the time the request is performed. Timing logic 1805 may determine the time of a request either by accessing the information from the request (if included with the request), by checking a clock in SSD 505 of FIG. 17, or by requesting the time of a request from the host machine.

Figure 20:
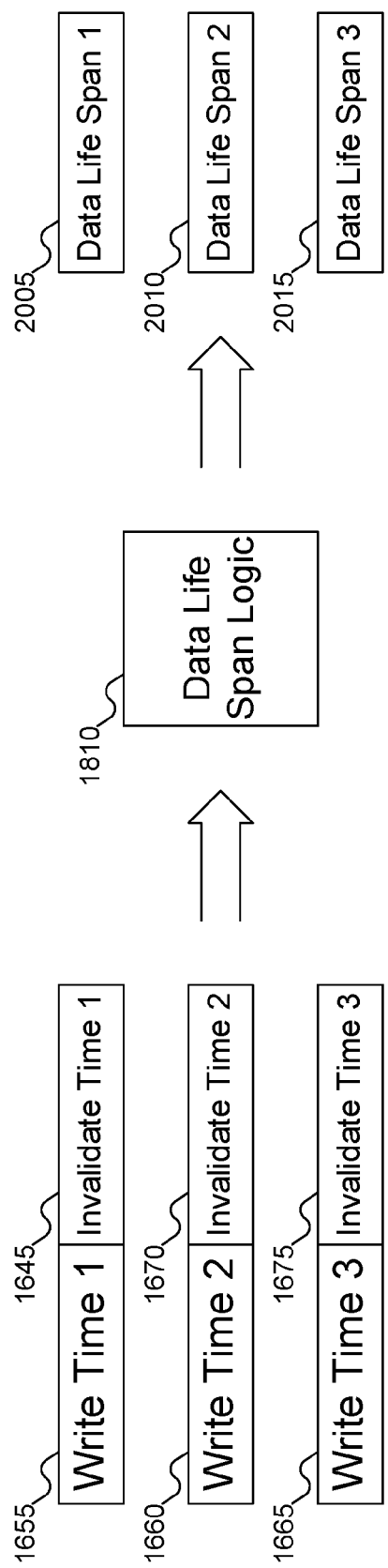
FIG. 20 shows the data life span logic of FIG. 18 determining data life spans from paired write and invalidate requests.

FIG. 20 shows data life span logic 1810 of FIG. 18 determining data life spans from paired write and invalidate requests. In FIG. 20, data life span logic 1810 may receive pairs of write and invalidate times. For example, data life span logic 1810 may receive the pair that includes write time 1655 and invalidate time 1645, the pair that include write time 1660 and invalidate time 1670, and the pair that includes write time 1665 and invalidate time 1715. As described above with reference to FIG. 16, write times and invalidate times may be paired up based on information provided with the corresponding write and invalidate requests or in other ways, such as based on the LBA of the requests.

A write request does not typically specify an address on the SSD, since the address where the data will be written is not known when a write request is issued (although it is possible that an SSD could permit an application to specify a particular location where data should be written). But once the SSD has identified the address where the data will be written, the SSD may associate this address with the write request to enable matching of write and invalidate requests.

Once write and invalidate requests are paired up, the associated write and invalidate times may be considered paired as well. Then, knowing when data was written and when it was deleted, data life span logic 1810 may calculate how long the data lived on the SSD by subtracting the write time from the invalidate time. Thus, data life span logic 1810 may calculate data life span 2005 as the difference between invalidate time 1645 and write time 1655, data life span 2010 as the difference between invalidate time 1670 and write time 1660, and data life span 2015 as the difference between invalidate time 1675 and write time 1665.

Figure 21:
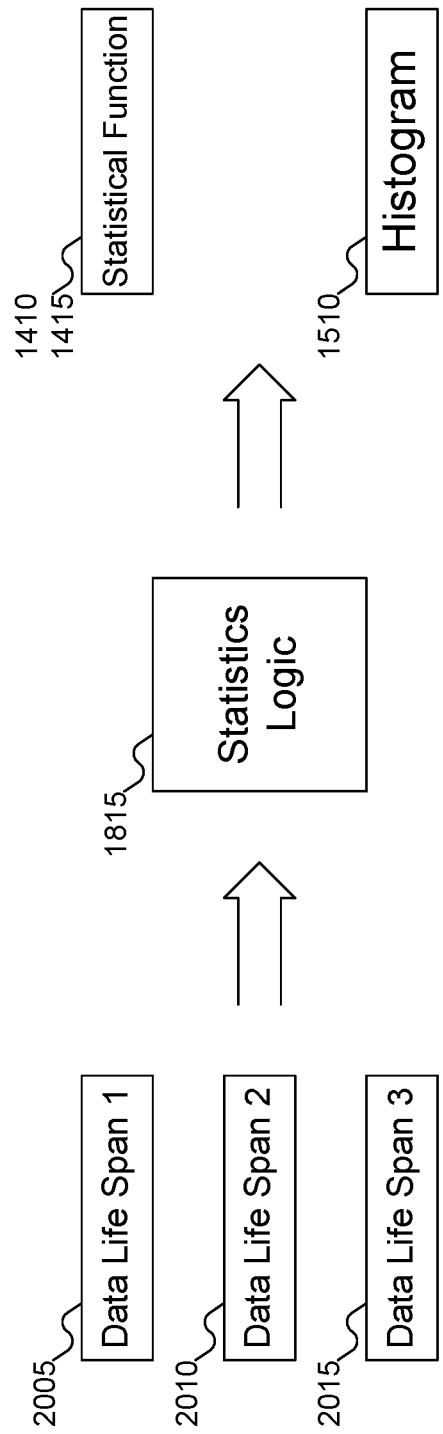
FIG. 21 shows the statistics logic of FIG. 18 generating functions and/or histograms from the data life spans of FIG. 20.

FIG. 21 shows statistics logic 1815 of FIG. 18 generating functions and/or histograms from the data life spans of FIG. 20. In FIG. 21, statistics logic 1815 may receive data life spans 2005, 2010, and 2015 and generate either statistical functions, like curves 1410 and 1415 of FIG. 14, or a histogram, like histogram 1510 of FIG. 15. Statistics logic 1815 may first attempt to fit a statistical function, such as a distribution function like those shown as curves 1410 and 1415 of FIG. 14, to the data life spans. It is unlikely that any statistical function will fit the data perfectly, but provided the statistical function satisfies the data to within an acceptable tolerance, a statistical function may be used. The acceptable tolerance may be determined in advance, but may be changed dynamically if it turns out that the tolerance currently in use is either too tight or too loose. The tolerance may be measured in any desired manner: for example, the tolerance may be measured using a worst case analysis (finding the data point that most differs from an expected value of the statistical function), a root-sum squared analysis (which considers how far each data point deviates from expected values of the statistical function), a second order tolerance (which may consider how far the distribution of data values varies from an expected distribution), or any other desired tolerance measure.

If no statistical function provides an acceptable predictor of the data values, statistics logic 1815 may generate a histogram. Since a histogram does not attempt to fit a curve to the data, a histogram is always possible. But if a statistical function may be found that fits the available data, a statistical function may usually be expressed more simply than a histogram and provides easier solution of key metrics, such as the mean or median data value, the statistical deviation, or the range of values for a particular confidence level.

Figure 22:
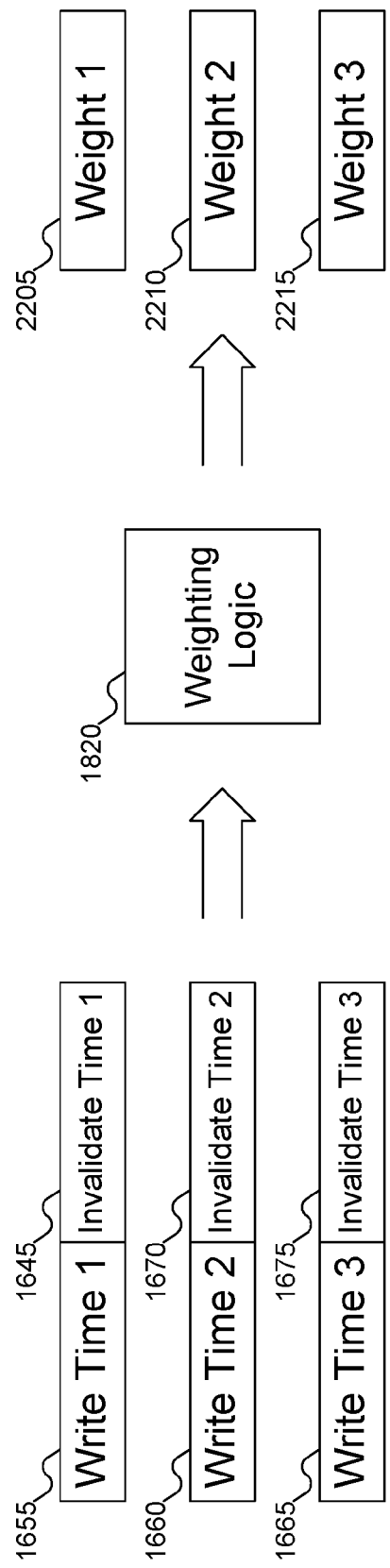
FIG. 22 shows the weighting logic of FIG. 18 determining weights for pairs of write and invalidate times, according to another embodiment of the inventive concept.

FIG. 22 shows weighting logic 1820 of FIG. 18 determining weights for pairs of write and invalidate times, according to another embodiment of the inventive concept. As described above with reference to FIG. 18, storing all of the historical statistical data for a stream may be storage space-intensive, and using a sliding window may reduce the amount of data retained. But in some embodiments of the inventive concept, storage space might not be considered a concern (for example, if the statistical data is stored in low-cost storage, such as a hard disk drive, rather than on SSD 505 of FIG. 17). But again, if all historical data is retained, older data might have a disproportionate impact on the calculated statistics. To ameliorate this concern, weights 2205, 2210, and 2215 may be used.

For each pair of write and invalidate times, weighting logic 1820 may assign a weight. Thus, in FIG. 22, weight 2205 may be assigned to write time 1655 and invalidate time 1645, weight 2210 may be assigned to write time 1660 and invalidate time 1670, and weight 2215 may be assigned to write time 1665 and invalidate time 1675. Weights 2205, 2210, and 2215 may be factored into the calculation of the statistics by statistical logic 1815 of FIG. 18. In this manner, newer data may be weighted more highly than older data, permitting the use of older data while not letting older data impact the results too aggressively (or vice versa).

Weights 2205, 2210, and 2215 may be determined in any desired manner. For example, the newest pair of write and invalidate times may be assigned the number 1, then next newest pair of write and invalidate times may be assigned the number 2, and so on. Then, when calculating the statistics for the stream, the inverse of the weight may be applied to the data. Or, the data points may be divided into bins based on their age, and each bin may be assigned a weight, giving the most recent data points the highest weight. This approach gives all data points within a particular bin equal weight, to avoid any one data point dominating the result. Other weighting strategies may also be used.

Now that the calculation of the statistics for a stream is understood, there are several possible uses for these statistics. Among other possibilities, calculated statistics 1410, 1415, and 1510 may be used to select a block into which new data may be written, coalescing multiple streams into one (or, alternatively, writing multiple streams to a single block), programming valid data from an erase block, and reporting "lying" applications.

Figure 23:
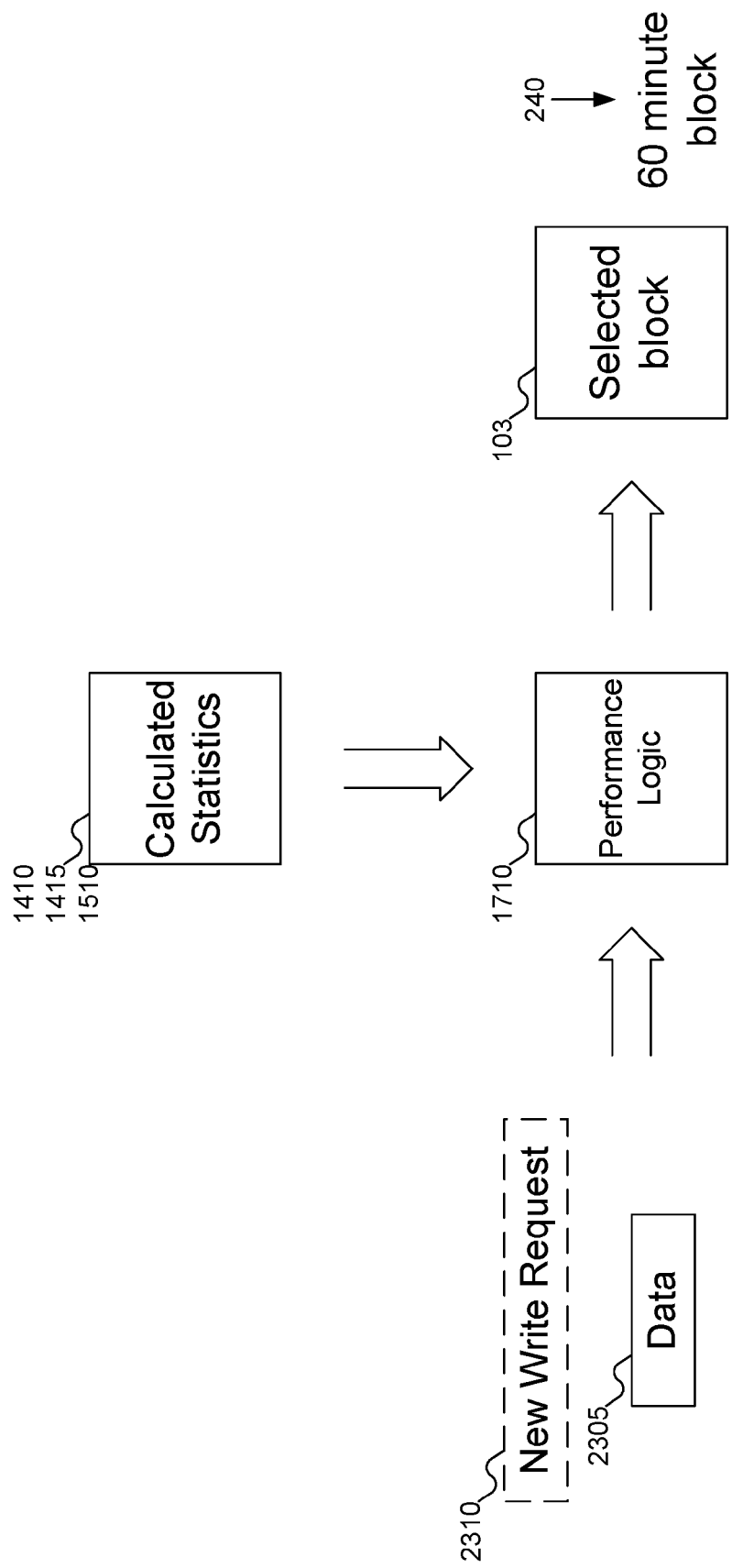
FIG. 23 shows the performance logic of FIG. 17 using the calculated statistics of FIG. 21 to select a block to store data in a new write request for a stream, according to an embodiment of the inventive concept.

FIG. 23 shows performance logic 1710 of FIG. 17 using the calculated statistics of FIG. 21 to select a block to store data in a new write request for a stream, according to an embodiment of the inventive concept. In FIG. 23, performance logic 1710 may receive data 2305. Data 2305 might be new data received from application 1605 of FIG. 16 (shown as new write request 2310 with a dashed box). Or data 2305 might be data that needs to be programmed from an erase block to a new block. Regardless of the reason, performance logic 1710 may use calculated statistics 1410, 1415, and/or 1510 to select block 103 to which data 2305 should be written.

For example, assume that data 2305 comes from a stream whose data life spans have a normal distribution. Further assume that the normal distribution of this stream has a mean of 50 minutes and a standard deviation such that 90% of the data life spans are 60 minutes or less. These statistics may be expressed in the alternative as a stream which has a 60 minutes estimated lifecycle, with a 90% confidence level. Block 103 has remaining TTL 240 of 60 minutes. Since data 2305 is expected (with 90% confidence) to expire within 60 minutes, block 103 is a good fit for data 2305. Therefore, performance logic 1710 may select block 103 to write data 2305.

FIG. 23 describes how a block, such as block 103, may be selected to store an individual data, such as data 2305. FIG. 23 shows how calculated statistics 1410, 1415, and/or 1510 of FIGS. 14-15 may be used to select a block to which data 2305 may be written. Using calculated statistics 1410, 1415, and/or 1510 of FIGS. 14-15 provides an alternative to using a stream TTL (as a stream TTL is merely one possible statistics that may be calculated for a stream).

As described above with reference to FIGS. 1, 4-6, and 13, second-order streams provide a mechanism that may simplify the management of what data is written to a particular block. Embodiments of the inventive concept that use calculated statistics, as described above with reference to FIGS. 14-23 and below with reference to FIG. 24052, may be used to select a second-order stream to which data 2305 may be written. Put another way, calculated statistics 1410, 1415, and/or 1510 of FIGS. 14-15 may be used to select a second-order stream which may, in turn, be associated with a particular block. Any data written to the second-order stream may be written to the associated block, regardless of which first-order stream originates the data. In embodiments of the inventive concept that use second-order streams, performance logic 1710 may select what data to write to a second-order stream based on the second-order stream's TTL, as opposed to block TTL 240.

Performance logic 1710 might select block 103 because it is a block with a remaining TTL that is greater than the estimated lifecycle of data 2305, but minimally so. For example, between a block with a remaining TTL of 60 minutes and a block with a remaining TTL of 90 minutes, the block with a remaining TTL of 60 minutes is a better choice, since data 2305 is more likely to expire along with the other data in the block. On the other hand, between a block with a remaining TTL of 90 minutes and a block with a remaining TTL of 45 minutes, the block with a remaining TTL of 90 minutes may be a better choice, since data 2305 is not likely to be still be valid when that block would otherwise be subject to garbage collection.

Note that performance logic 1710 does not need to select a block assigned to the stream from which data 2305 originates. That is, instead of assigning block 103 to the stream from which data 2305 originates, performance logic 1710 may select any appropriate block to store data 2305, of which block 103 might just happen to be the best choice. Thus, performance logic 1710 may write data from multiple streams to a single block, if the data happens to have an estimated life span that fits the block's remaining TTL. Thus, if multiple streams happen to have similar estimated lifecycles, data from both streams may be written to the same block, a result that may not occur in conventional systems.

Figure 24:
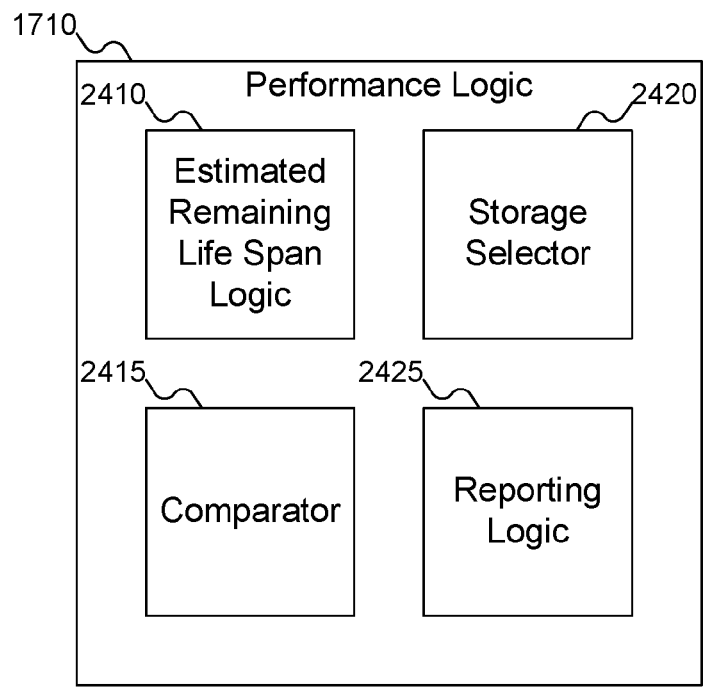
FIG. 24 shows details of the performance logic of FIG. 17, according to embodiments of the inventive concept.

FIG. 24 shows details of performance logic 1710 of FIG. 17, according to embodiments of the inventive concept. In FIG. 24, performance logic 1710 may include estimated remaining life span logic 2410, comparator 2415, storage selector 2420, and reporting logic 2425. Estimated remaining life span logic 2410 may determine the estimated remaining life span for a particular data element. While estimated remaining life span logic 2410 includes the word "remaining", in the general sense an initial estimate of how long a data element is expected to reside on SSD 505 of FIG. 17, when initially received in a write request, is also an estimated remaining life span for the data element. Thus, "remaining" is intended to encompass both the estimated remaining life for data that has been resident on SSD 505 of FIG. 17 for some interval of time and an original estimate of how long a new data element is expected to be resident on SSD 505 of FIG. 17 when initially received by SSD 505 of FIG. 17. Or put another way, when data is initially received by SSD 505 of FIG. 17, its estimated remaining life span is its expected life span given that the data has been stored on SSD 505 of FIG. 17 for zero units of time.

An example might help to explain this concept. Consider a stream that generated histogram 1510 of FIG. 15. With a 90% confidence level, data in this stream has an estimated life span of 36 hours. Therefore, if data has already been stored on SSD 505 of FIG. 17 for, say, 12 hours, the data has an estimated remaining life span of 24 hours (36 hours minus 12 hours). But if the data is newly received at SSD 505 of FIG. 17, the data has an estimated remaining life span of 36 hours (36 hours minus 0 hours, since the data has not been stored for any interval of time). Therefore, the use of the word "remaining" is intended to include the possibility that the data in question has not yet been stored on SSD 505 of FIG. 17 for any length of time at all.

Comparator 2415 may be used to compare two (or more) values to determine which value is the largest or smallest value. Comparator 2415 has multiple uses. In some embodiments of the inventive concept, comparator 2415 may be used to compare the estimated remaining life span of a data element, as calculated by estimated remaining life span logic 2410, with a block TTL, such as block TTL 240, in an attempt to find a block that is a good fit for the estimated remaining life span of the data element. In other embodiments of the inventive concept, comparator 2415 may be used to compare the estimated remaining life span of a data element, as calculated by estimated remaining life span logic 2410, with a second-order stream TTL, such as second-order stream TTL 415 of FIG. 4, in an attempt to find a second-order stream that is a good fit for the estimated remaining life span of the data element. In yet other embodiments of the inventive concept, comparator 2415 may be used to compare a stream TTL, such as stream TTL 310, received from application 1605 of FIG. 16 with calculated statistics 1410, 1415, and/or 1510 of FIGS. 14-15, to determine whether application 1605 of FIG. 16 was "lying" (reporting inaccurate stream metadata, whether intentionally or accidentally).

Storage selector 2420 may select storage into which data may be written. This storage may be a block (for example, if the data in question originates from a first order stream as shown in FIGS. 3A-3D), or a second-order stream (for example, if the data in question originates from a stream that feeds a second-order stream, as shown in FIG. 4). Note that the data must be ultimately stored in a block in flash memory 520 of FIG. 17. Thus, even if storage selector 2420 is used to select a second-order stream, that operation is an indirect block selection (since the second-order stream is associated with a block in flash memory 520 of FIG. 17, to which the data would ultimately be written).

Regardless of how storage selector 2420 operates (to select a block or to select a second-order stream), the data in question may either be new data, received from a stream in a new write request, or data that was previously stored in a block that is being subject to garbage collection and therefore requires programming.

Reporting logic 2425 may be used to inform an application, such as application 1605 of FIG. 16, or host responsible for a stream, that the stream metadata, such as the stream TTL, is inconsistent with calculated statistics 1410, 1415, and/or 1510 of FIGS. 14-15. If the stream metadata received from application 1605 of FIG. 16 differs significantly from calculated statistics 1410, 1415, and/or 1510 of FIGS. 14-15, reporting logic 2425 may report the discrepancy. How much variance is necessary for the stream metadata to "differ significantly" from calculated statistics 1410, 1415, and/or 1510 of FIGS. 14-15 may be defined by the user. What information sent to application 1605 of FIG. 16 by reporting logic 2425 may vary: reporting logic 2425 might send only a subset of calculated statistics 1410, 1415, and/or 1510 of FIGS. 14-15 (such as the actual value for the statistics application 1605 of FIG. 16 is attempting to send), or reporting logic 2425 might send all of calculated statistics 1410, 1415, and/or 1510 of FIGS. 14-15.

Figure 25:
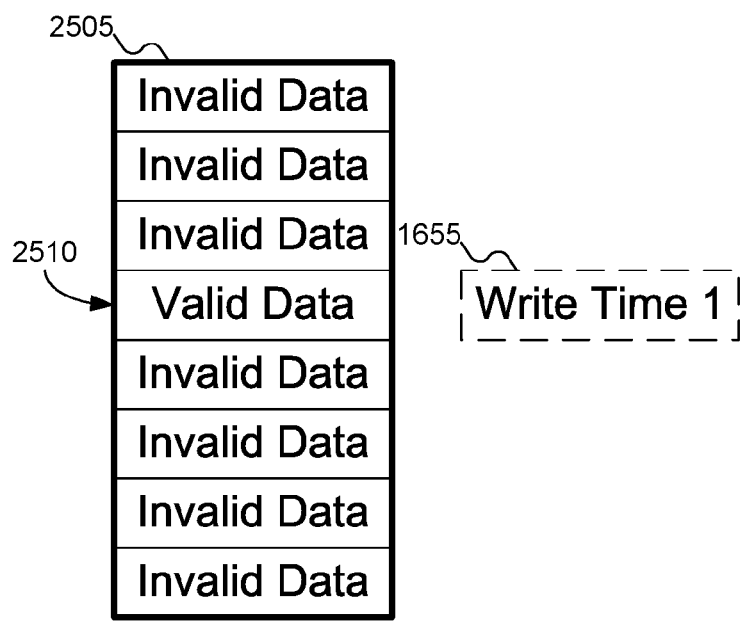
FIG. 25 shows an erase block on the SSD of FIG. 17 storing valid data.

FIG. 25 shows an erase block on SSD 505 of FIG. 17 storing valid data. In FIG. 25, block 2505 is shown. Block 2505 is shown as including eight pages of data, but embodiments of the inventive concept may support blocks containing any number of pages. In block 2505, page 2510 stores valid data; all the remaining pages in block 2505 store invalid data. Thus, block 2505 might be considered a good candidate for garbage collection.

Since page 2510 stores valid data, page 2510 would need to be relocated to another block before block 2505 may be freed. But since page 2510 has been located on SSD 505 of FIG. 17 for some time, its remaining life span is less than its original stream's TTL or any other calculated statistic for the stream. Thus, to optimally program page 2510, block locator 2420 of FIG. 24 would need to know the estimated remaining life span for page 2510, as may be calculated by estimated remaining life span logic 2410 of FIG. 24.

Figure 26:
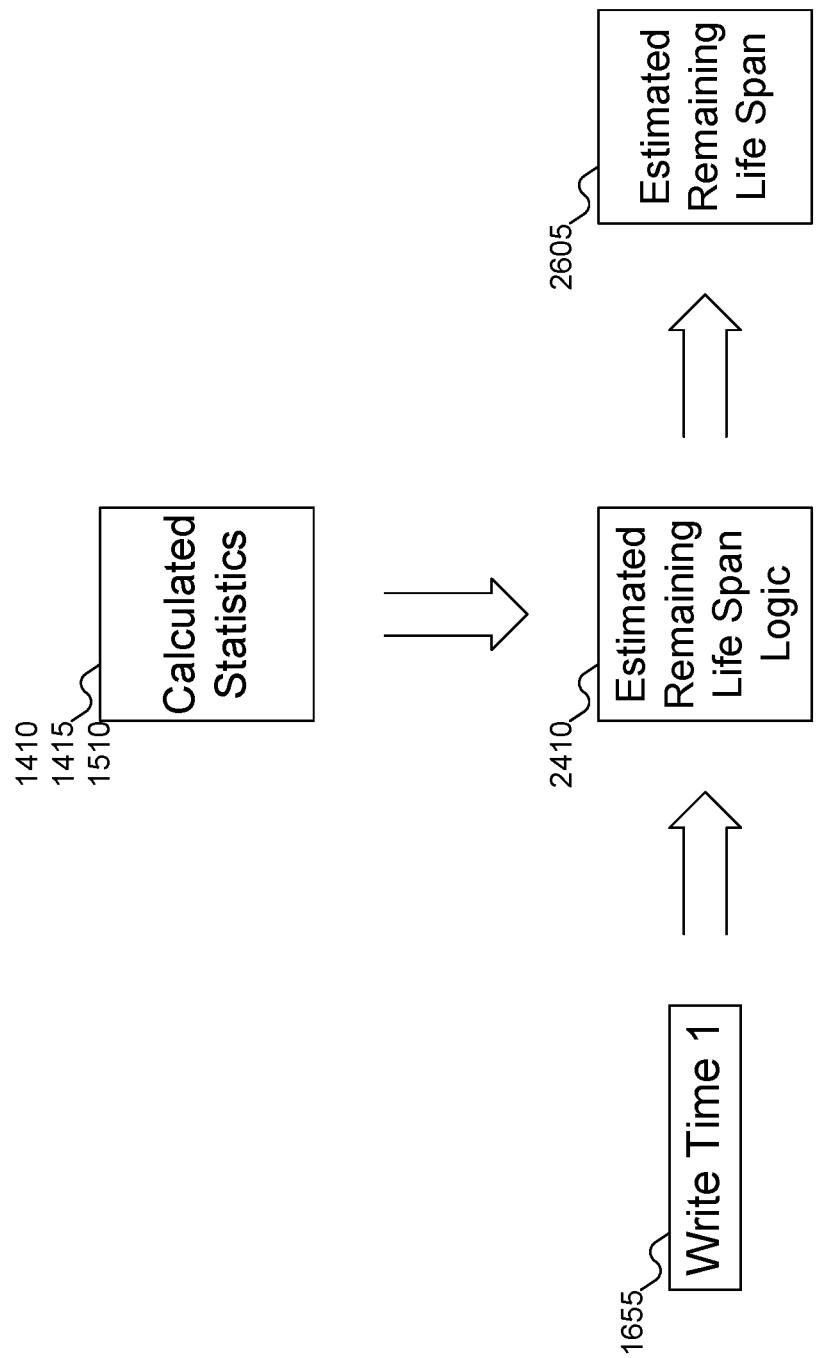
FIG. 26 shows the estimated remaining life span logic of FIG. 24 estimating a remaining data life span for the valid data of FIG. 25.

FIG. 26 shows estimated remaining life span logic 2410 of FIG. 24 estimating a remaining data life span for the valid data of FIG. 25. In FIG. 26, estimated remaining life span logic 2410 may take calculated statistics 1410, 1415, and/or 1510 (or, alternatively, the statistical function or the histogram) for the stream to which the valid data was originally assigned. Estimated remaining life span logic 2410 may also take write time 1655, which represents when page 2510 of FIG. 25 was written to block 2505 of FIG. 25. Using these values, estimated remaining life span logic 2410 may calculate the estimated remaining life span 2605 of page 2510 of FIG. 25.

Note, however, that estimated remaining life span 2605, whether for valid data that is being programmed as part of garbage collection of an erase block, as shown in FIG. 25, or for new data, as described with reference to FIG. 23, may be more complicated than simply subtracting how long data has been stored from the estimated stream TTL. For example, consider again the stream the produced histogram 1510 of FIG. 15. As noted before, a 90% confidence level for this histogram could indicate that the estimated life span of data in the stream is 36 hours. But what if page 2510 of FIG. 25 has already been stored for 40 hours? If estimated remaining life span logic 2410 of FIG. 24 simply performed this subtraction, all that performance logic 1710 of FIG. 17 would know is that page 2510 of FIG. 25 was expected to have been invalidated already.

Instead, estimated remaining life span logic 2410 may consider the entirety of histogram 1510 of FIG. 15. Since page 2510 of FIG. 25 has already been stored for 40 hours, it has exceeded the estimated life span of the stream; relying on just the estimated life span would not provide meaningful information. But from histogram 1510 it may be determined that if data lasts longer than 36 hours, it is most likely to last 60 hours (although it could last even longer than that). Thus, estimated remaining life span logic 2410 may conclude that the estimated remaining life span for page 2510 of FIG. 25 is now 20 hours (60 hours being the new best estimate less 40 hours already stored), even though page 2510 of FIG. 25 has been stored for longer than the original estimated life span. Given this estimate, storage selector 2415 of FIG. 24 may then look for a block with a TTL of roughly 20 hours, and program page 2510 of FIG. 25 into that block.

Although storage selector 2415 of FIG. 24 could select a block associated with the stream that originated page 2510 of FIG. 25, embodiments of the inventive concept permit blocks associated with other streams to be used. Note that SSD 505 of FIG. 17 does not actually care what stream data generates any particular data. The idea of streams is a technique to improve storage efficiency by (hopefully) storing data with typical life spans together. If streams work as hoped, then the data in blocks will invalidate at roughly the same time, permitting blocks to be subject to garbage collection without needing to perform programming of any valid data first.

In the situation described with reference to FIG. 25, obviously things did not go exactly as expected, since page 2510 of FIG. 25 still contains valid data when block 2505 of FIG. 25 is subject to garbage collection. But if page 2510 of FIG. 25 may be stored in a block with other data with comparable remaining life spans, the data in the new block will hopefully invalidate around the same time, permitting the new block to be subject to garbage collection without having to program any data.

Once page 2510 of FIG. 25 has been programmed into a new block, a new question arises: does page 2510 of FIG. 25 retain its original stream affiliation, or is page 2510 of FIG. 25 treated as part of the stream associated with the block into which page 2510 of FIG. 25 is programmed? Embodiments of the inventive concept support both possibilities. By retaining the original stream affiliation, any subsequent programming of page 2510 of FIG. 25 is more likely to be accurate. But considering page 2510 of FIG. 25 to be part of the new stream simplifies data management, since streams are affiliated with blocks rather than pages. Of course, this choice has little impact unless the block into which page 2510 of FIG. 25 is programmed is also subject to garbage collection before application 1605 of FIG. 16 invalidates page 2510 of FIG. 25.

Figure 27A:
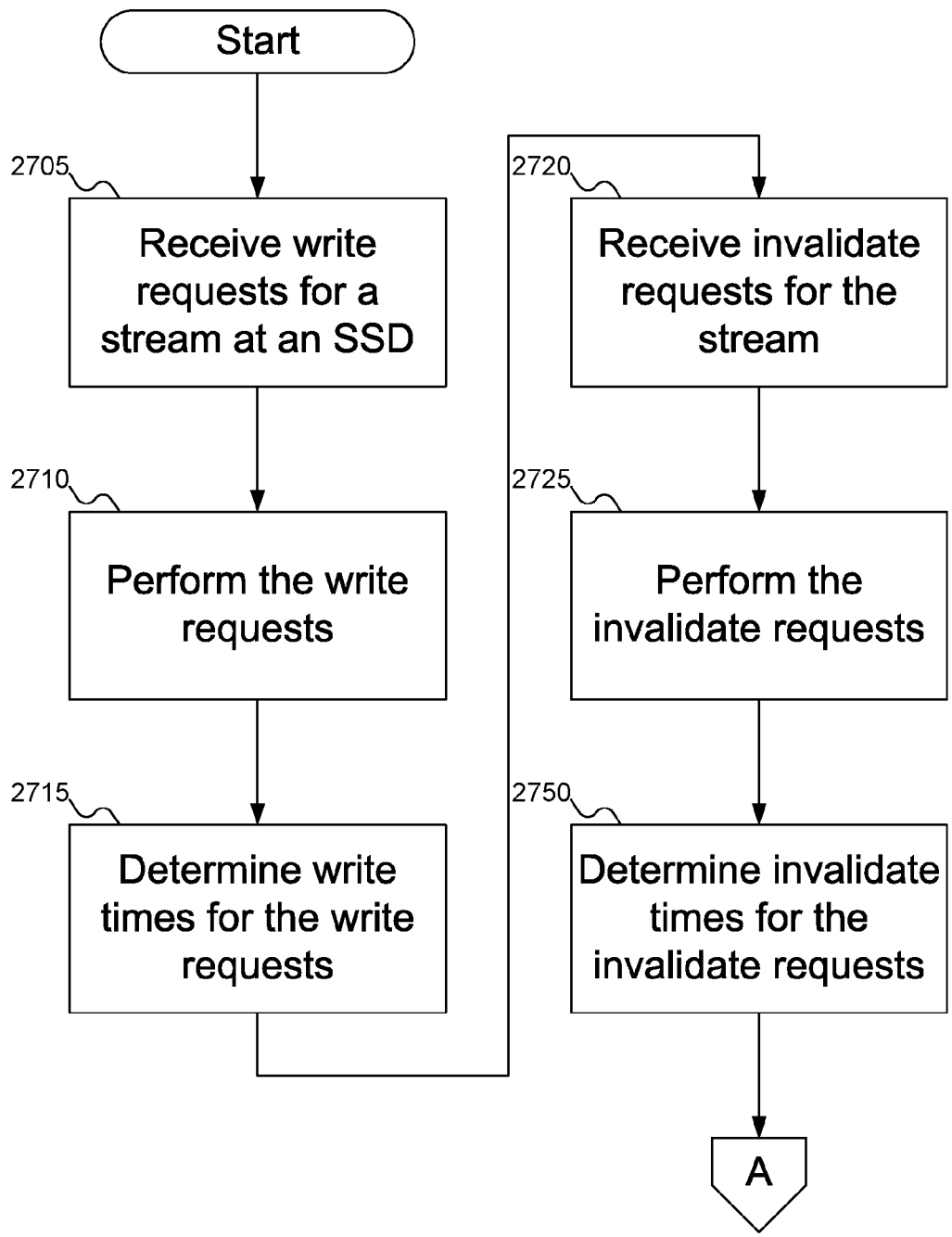
FIGS. 27A-27B show a flowchart of a procedure for the SSD of FIG. 17 to calculate statistics for a stream and to use those statistics to improve the performance of the SSD of FIG. 17, according to an embodiment of the inventive concept.
Figure 27B:
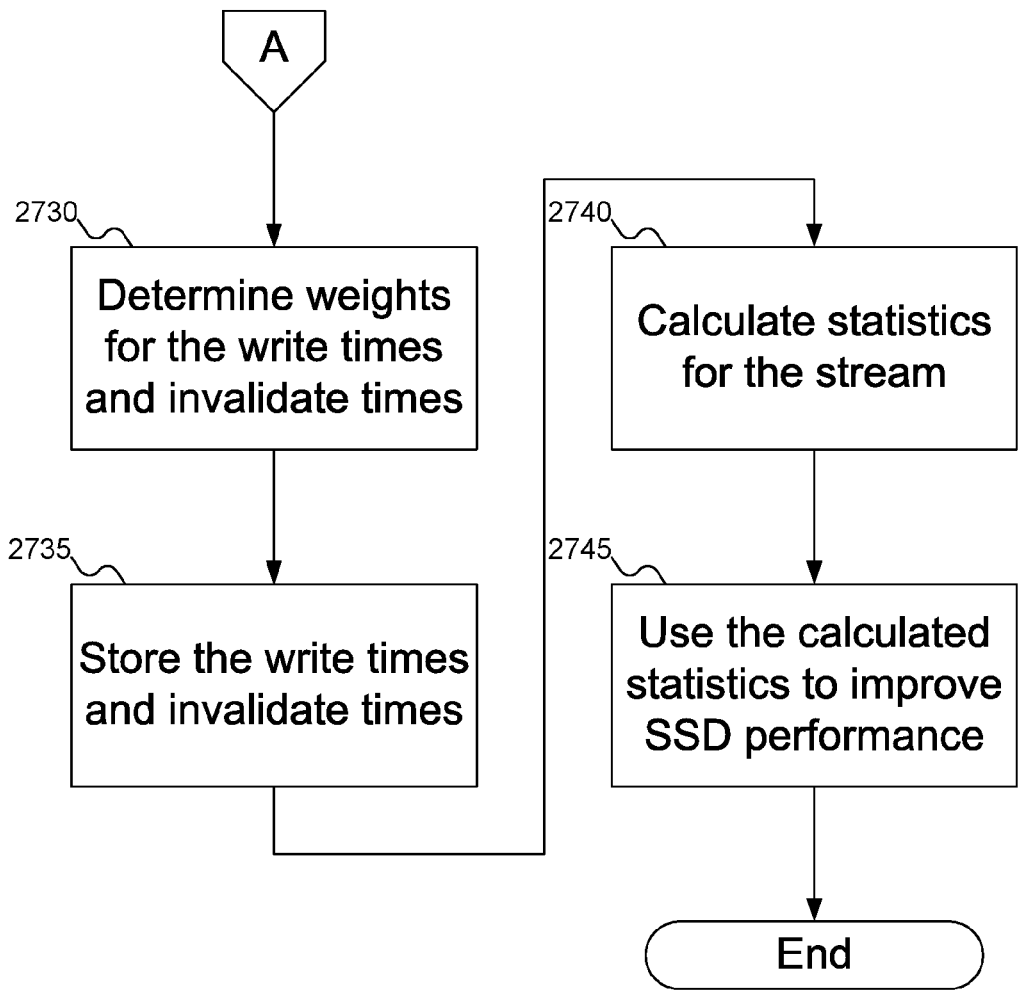

FIGS. 27A-27B show a flowchart of an example procedure for SSD 505 of FIG. 17 to calculate statistics for a stream and to use those statistics to improve the performance of SSD 505 of FIG. 17, according to an embodiment of the inventive concept. In FIG. 27A, at block 2705, reception circuitry may receive write requests 1610, 1615, 1620, and 1625 for a stream. At block 2710, writing logic 530 of FIG. 5 may perform the write requests. At block 2715, timing logic 1805 of FIG. 18 may determine write times 1655, 1660, 1665, and 1650 of FIG. 16 of write requests 1610, 1615, 1620, and 1625 of FIG. 3. At block 2720, reception circuitry may receive invalidate requests 1630, 1635, and 1640 for the stream. At block 2725, writing logic 530 of FIG. 5 may perform the invalidate requests. At block 2720, timing logic 1805 of FIG. 18 may determine invalidate times 1645, 1670, and 1675 of FIG. 16 of invalidate requests 1630, 1635, and 1640 of FIG. 3.

At block 2730 (FIG. 27B), weighting logic 1820 of FIG. 18 may determine weights for the various write times 1655, 1660, 1665, and 1650 of FIG. 16 and invalidate times 1645, 1670, and 1675 of FIG. 16. At block 2735, storage 1825 of FIG. 18 may store write times 1655, 1660, 1665, and 1650 of FIG. 16 and invalidate times 1645, 1670, and 1675 of FIG. 16. At block 2740, statistics logic 1815 may calculate statistics 1410, 1415, and/or 1510 of FIGS. 14-15. At block 2745, performance logic 1710 of FIG. 17 may use calculated statistics 1410, 1415, and/or 1510 of FIGS. 14-15 to improve the performance of SSD 505 of FIG. 17. Performance logic 1710 of FIG. 17 may use calculated statistics 1410, 1415, and/or 1510 of FIGS. 14-15 to select a block or a second-order stream into which data may be written, to combine multiple streams that have common or similar statistics for writing to a shared block, to restream data being programmed during garbage collection, and/or to inform an application that the stream TTL it has provided is inaccurate.

Figure 28:
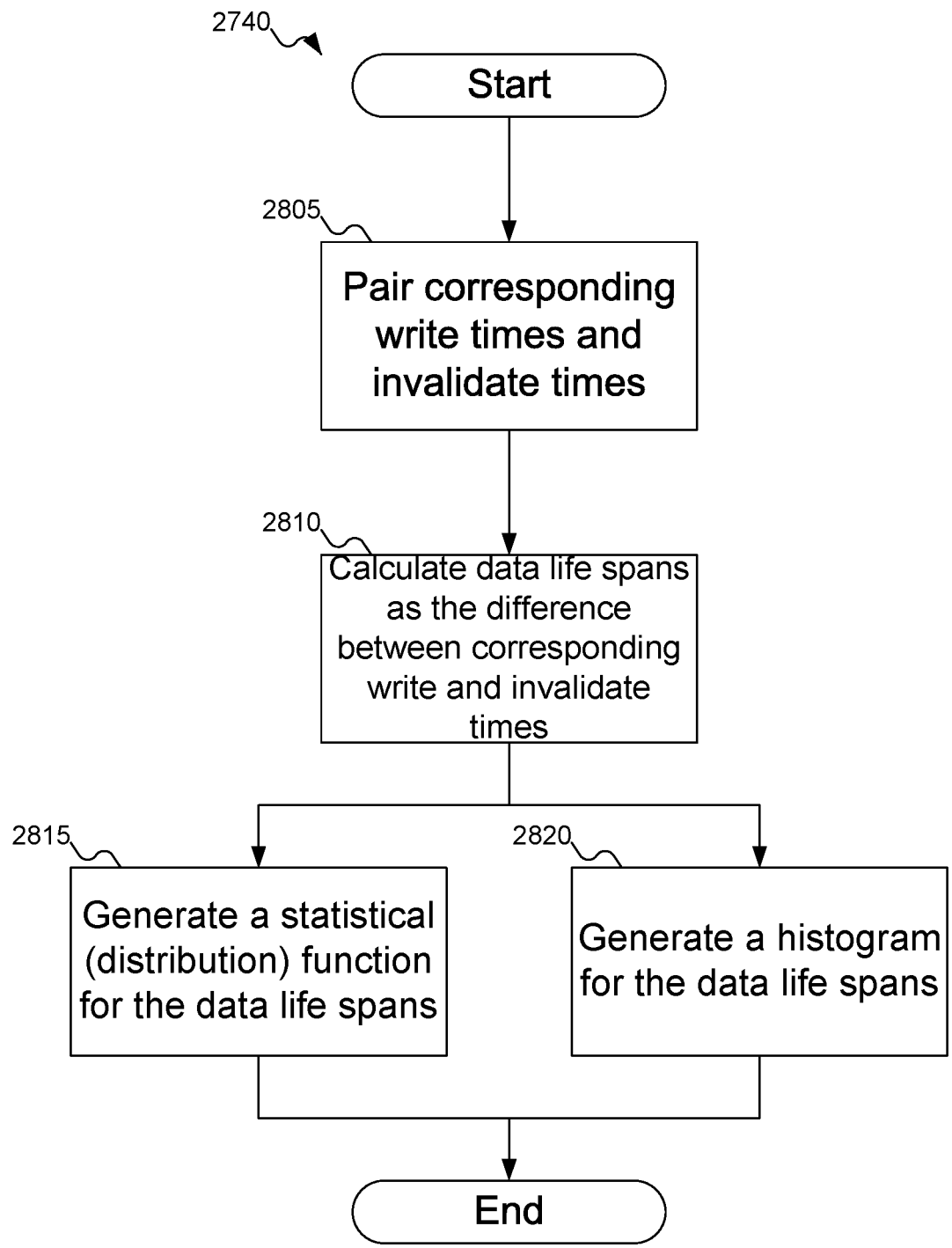
FIG. 28 shows a flowchart of a procedure for the statistics calculation logic of FIG. 18 to calculate statistics for a stream, according to an embodiment of the inventive concept.

FIG. 28 shows a flowchart of an example procedure for statistics calculation logic 1705 of FIG. 18 to calculate statistics for a stream, according to an embodiment of the inventive concept. In FIG. 28, at block 2805, statistics calculation logic 1705 of FIG. 18 may pair write times 1655, 1660, 1650, and 1650 of FIG. 16 with invalidate times 1645, 1670, and 1675 of FIG. 18 for write requests and invalidate requests that correspond. At block 2810, data life span logic 1810 of FIG. 18 may calculate the data life spans for data as the difference between the write time and the invalidate time. At block 2815, statistics logic 1815 of FIG. 18 may generate statistical functions 1410 and/or 1415 of FIG. 14, which may be distribution functions, that fits the data life spans. Alternatively, at block 2820, statistics logic 1815 of FIG. 18 may generate histogram 1510 of FIG. 15.

Figure 29:
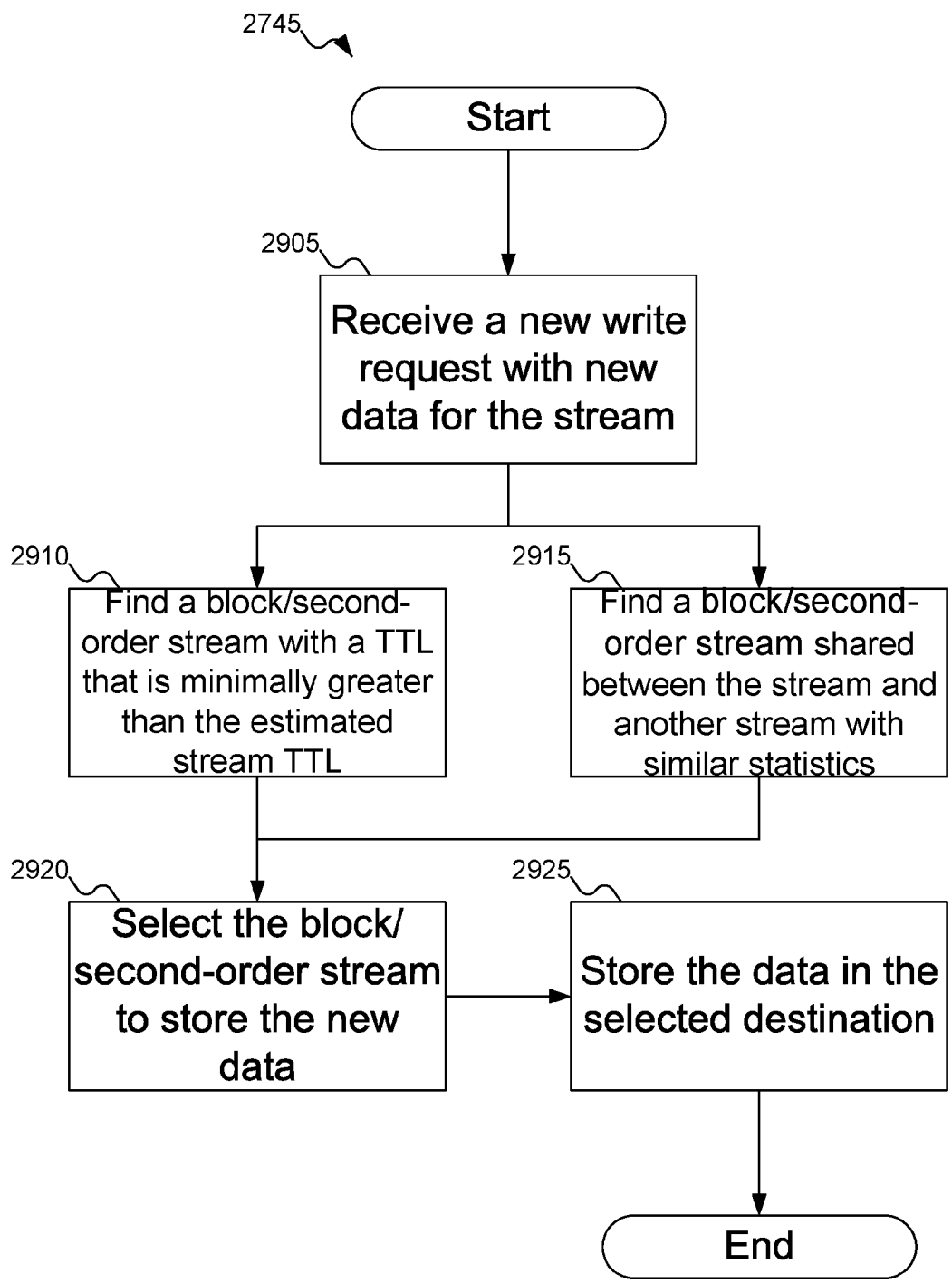
FIG. 29 shows a flowchart of a procedure for the performance logic of FIG. 17 to use the calculated statistics for a stream to select a destination to store new data for a stream, according to an embodiment of the inventive concept.

FIG. 29 shows a flowchart of an example procedure for performance logic 1710 of FIG. 17 to use calculated statistics 1410, 1415, and/or 1510 of FIGS. 14-15 to select a destination to store new data for a stream, according to an embodiment of the inventive concept. In FIG. 29, at block 2905, reception circuitry 510 of FIG. 17 may receive new write request 2310 of FIG. 23, including new data 2305 of FIG. 23 and a stream ID. At block 2910, storage selector 2420 of FIG. 24 may locate a destination to store new data 2305 of FIG. 23. The destination may be either a block with a lifetime that matches the stream lifetime (according to calculated statistics 1410, 1415, and/or 1510 of FIGS. 14-15), or a second-order stream with a lifetime that matches the stream lifetime. Alternatively, storage selector 2420 of FIG. 24 may locate a destination shared between two or more streams, if the streams have common or similar stream metadata (such as estimated lifetime), as shown at block 2915: again, the destination may be either a block or a second-order stream, depending on. At block 2920, storage selector 2420 of FIG. 24 may select the destination into which data 2305 of FIG. 23 is to be stored. And at block 2925, writing logic 530 of FIG. 5 may write new data 2305 of FIG. 23 to the selected destination.

Figure 30:
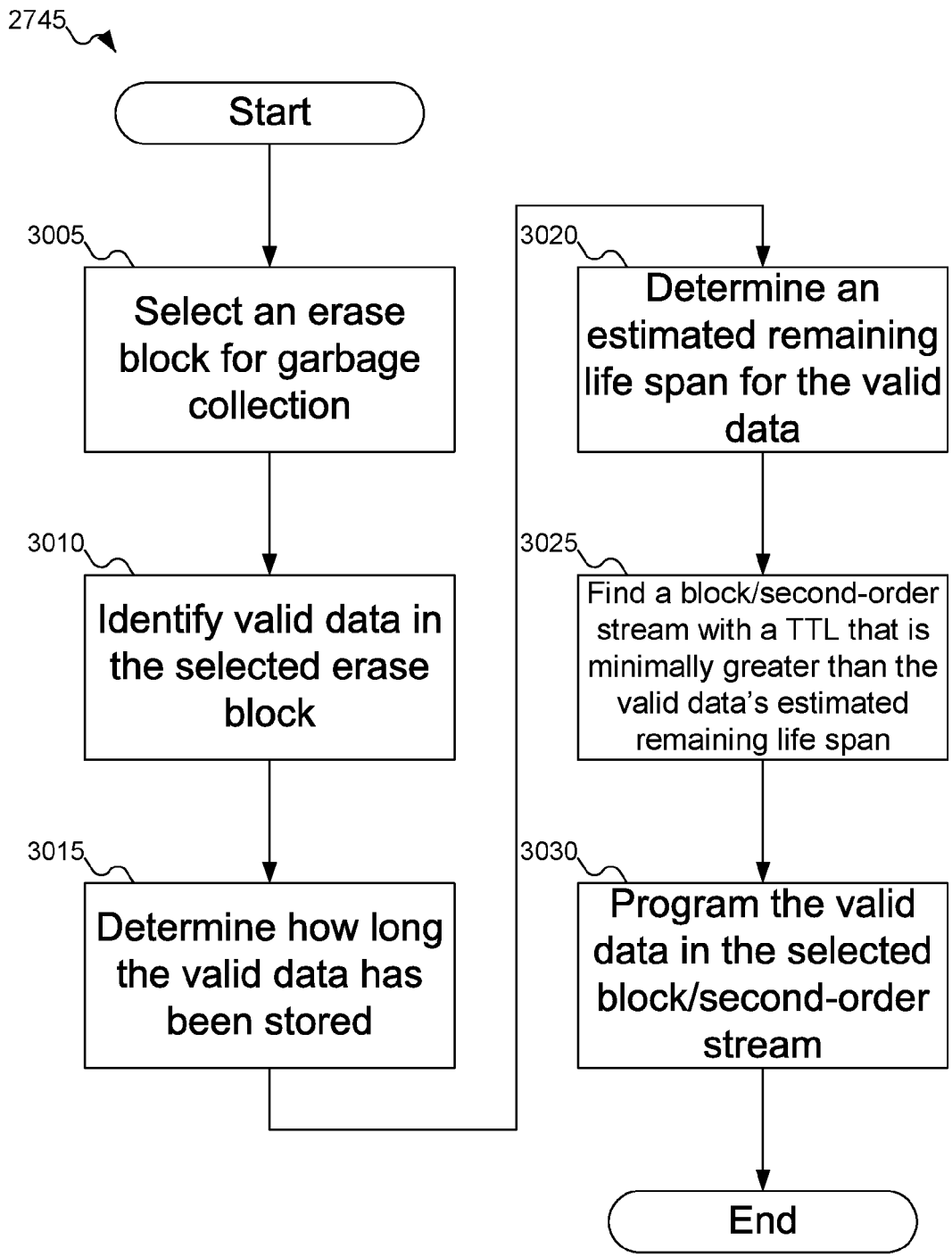
FIG. 30 shows a flowchart of a procedure for the performance logic of FIG. 17 to use the calculated statistics to select a destination into which the valid data of FIG. 25 may be programmed from the erase block of FIG. 25 during garbage collection, according to an embodiment of the inventive concept.

FIG. 30 shows a flowchart of an example procedure for performance logic 1710 of FIG. 17 to use calculated statistics 1410, 1415, and/or 1510 of FIGS. 14-15 to select a destination into which valid data 2510 of FIG. 25 may be programmed from erase block 2505 of FIG. 25 during garbage collection, according to an embodiment of the inventive concept. In FIG. 30, at block 3005, a garbage collection logic may select block 2505 of FIG. 25 for garbage collection. At block 3010, the garbage collection logic may identify valid data 2510 of FIG. 25 in erase block 2505 of FIG. 25. At block 3015, estimated remaining life span logic 2410 of FIG. 24 may determine how long valid data 2510 of FIG. 25 has been stored on SSD 505 of FIG. 17. At block 3020, estimated remaining life span logic 2410 of FIG. 24 may calculate estimated remaining life span 2605 of FIG. 26 for valid data 2510 of FIG. 25 using calculated statistics 1410, 1415, and/or 1510 of FIGS. 14-15. At block 3025, storage selector 2420 of FIG. 24 may select a block or a second-order stream that has a block TTL that is minimally greater than estimated remaining life span 2605 of FIG. 26. In block 3025, if storage selector 2420 of FIG. 24 is selecting a block, storage selector 2420 of FIG. 24 may select an existing block with a known TTL, or selecting a new block and assigning it a TTL that is slightly greater than estimated remaining life span 2605 of FIG. 26, depending on what works best. For example, if there are no blocks with free pages currently in use, or if all blocks with free pages currently in use have TTLs that either smaller than estimated remaining life span 2605 of FIG. 26 or significantly greater than estimated remaining life span 2605 of FIG. 26, storage selector 2420 of FIG. 24 may select a block not currently in use and assign it a block TTL that would satisfy estimated remaining life span 2605 of FIG. 26. Alternatively, if storage selector 2420 of FIG. 24 is selecting a second-order stream, storage selector 2420 of FIG. 24 may select the second-order stream based on the remaining TTL of the second-order stream. Regardless of whether storage selector 2420 of FIG. 24 is selecting a block or a second-order stream, at block 3030, writing logic 530 of FIG. 5 may program valid data 2510 of FIG. 25 to the selected block/second-order stream.

Figure 31:
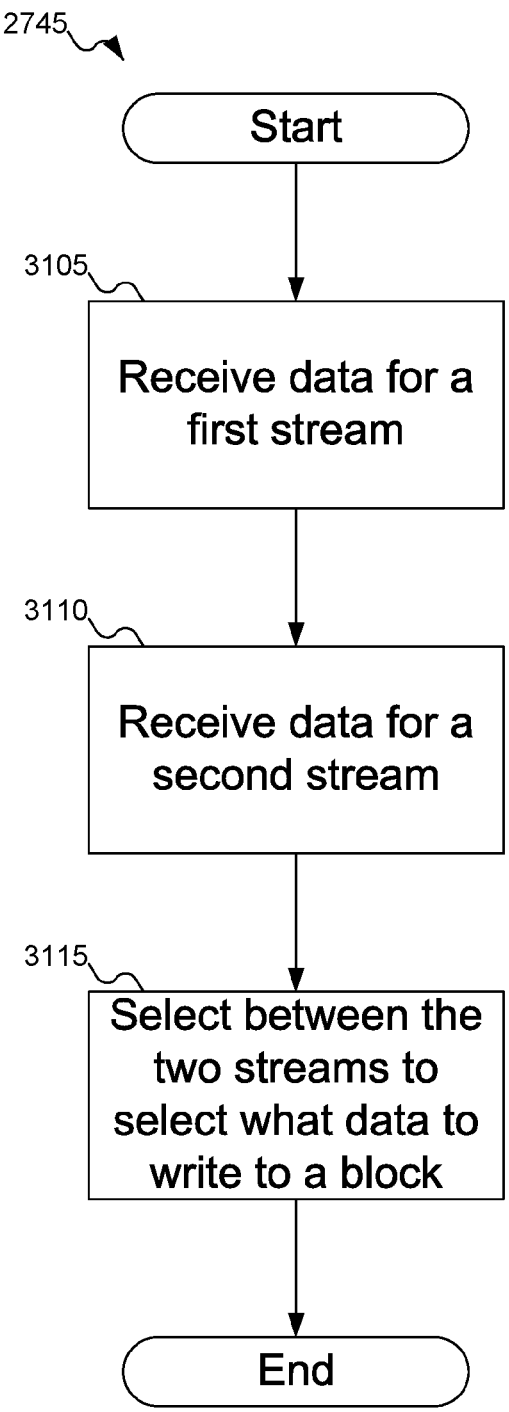
FIG. 31 shows a flowchart of a procedure for the performance logic of FIG. 17 to select a stream from which to write data into a block, according to an embodiment of the inventive concept.

FIG. 31 shows a flowchart of an example procedure for performance logic 1710 of FIG. 17 to select a stream from which to write data into a block, according to an embodiment of the inventive concept. In FIG. 31, at block 3105, reception circuitry 510 of FIG. 17 may receive data for stream 305 of FIG. 3A. At block 3110, reception circuitry 510 of FIG. 17 may receive data for stream 320 of FIG. 3B. At block 3115, storage selector 2420 of FIG. 24 may select from between streams 305 of FIG. 3A and 320 of FIG. 3B to write to a block, based on calculated statistics 1410, 1415, and/or 1510 of FIGS. 14-15.

Figure 32:
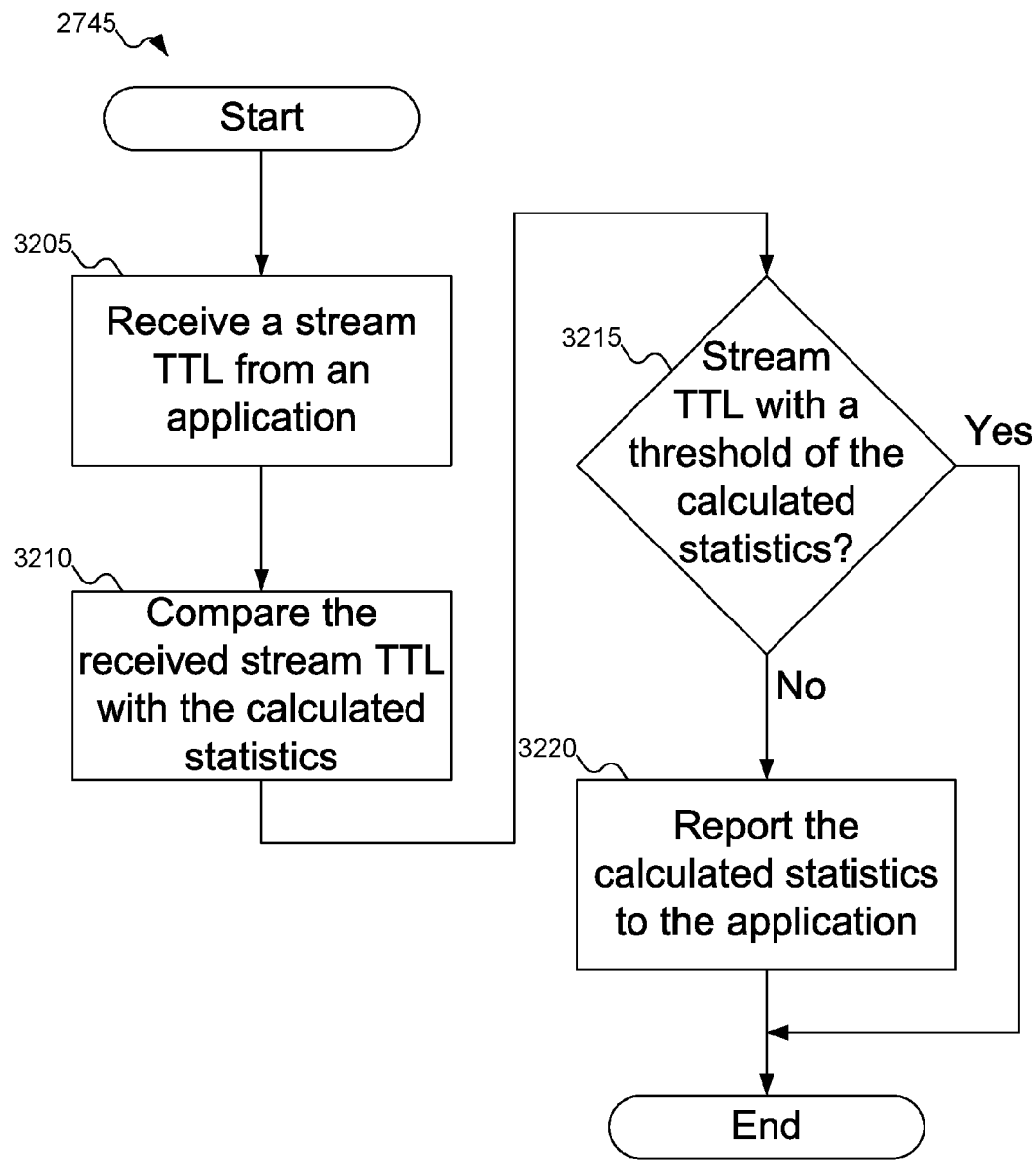
FIG. 32 shows a flowchart of a procedure for the performance logic of FIG. 17 to report to an application whether the stream Time-To-Live (TTL) reported by the application is accurate, according to an embodiment of the inventive concept.

FIG. 32 shows a flowchart of an example procedure for performance logic 1710 of FIG. 17 to report to application 1605 of FIG. 16, or more generally a host, whether the stream Time-To-Live (TTL) reported by application 1605 of FIG. 16 is accurate, according to an embodiment of the inventive concept. In FIG. 32, at block 3205, performance logic 1710 of FIG. 17 may receive a stream TTL (or other stream metadata) from application 1605 of FIG. 16, or some other source responsible for stream requests. At block 3210, comparator 2415 of FIG. 24 may compare the received stream TTL with calculated statistics 1410, 1415, and/or 1510 of FIGS. 14-15. At block 3215, performance logic 1710 of FIG. 17 may determine whether the stream TTL, as received from application 1605 of FIG. 16, is within an acceptable threshold of calculated statistics 1410, 1415, and/or 1510 of FIGS. 14-15. If not, then at block 3220, reporting logic 2425 may report to application 1605 of FIG. 16 that the provided stream TTL is not consistent with calculated statistics 1410, 1415, and/or 1510 of FIGS. 14-15. Reporting logic 2425 of FIG. 24 may also provide calculated statistics 1410, 1415, and/or 1510 of FIGS. 14-3, or a subset thereof, to application 1605 of FIG. 16, to correct application 1605 of FIG. 16.

FIGS. 1-32 show some embodiments of the inventive concept. But the embodiments of the inventive concept may be combined in any desired combination. For example, instead of relying on stream TTLs 310, 325, 340, and 355 of FIGS. 3A-3D as provided by the host machine or application 1605 of FIG. 16, statistics calculation logic 1705 of FIG. 17 may calculate statistics 1410, 1415, and/or 1510 of FIGS. 14-15. Selection logic 525 of FIG. 5 may then use statistics 1410, 1415, and/or 1510 of FIGS. 14-3 instead of stream TTLs 310, 325, 340, and 355 of FIGS. 3A-3D in selecting what stream to write to block 103.

In FIGS. 12-13 and 27A-32, some embodiments of the inventive concept are shown. But a person skilled in the art will recognize that other embodiments of the inventive concept are also possible, by changing the order of the blocks, by omitting blocks, or by including links not shown in the drawings. All such variations of the flowcharts are considered to be embodiments of the inventive concept, whether expressly described or not.

The following discussion is intended to provide a brief, general description of a suitable machine or machines in which certain aspects of the inventive concept may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present inventive concept may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the inventive concept may include a tangible, non-transitory machine-readable medium comprising instructions executable by one or more processors, the instructions comprising instructions to perform the elements of the inventive concepts as described herein.

Having described and illustrated the principles of the inventive concept with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms may reference the same or different embodiments that are combinable into other embodiments.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

Embodiments of the inventive concept may extend to the following statements, without limitation:

Statement 1. An embodiment of the inventive concept includes a Solid State Drive (SSD) (505), comprising:

storage (520) for data;

reception circuitry (510) to receive a first plurality of write requests (1610, 1615, 1620, 1625) and a second plurality of invalidate requests (1630, 1635, 1640) from a first stream (305, 320, 335, 350), the first plurality of write requests (1610, 1615, 1620, 1625) and the second plurality of invalidate requests (1630, 1635, 1640) affecting the data in the storage (520);

statistics calculation logic (1705) to calculate statistics (1410, 1415, 1510) for the first stream (305, 320, 335, 350) from the plurality of write requests (1610, 1615, 1620, 1625) and the plurality of invalidate requests (1630, 1635, 1640); and performance logic (1710) to use the calculated statistics (1410, 1415, 1510) to increase a likelihood that all data written to a block (103) on the SSD (505) will be invalidated around the same time.

Statement 2. An embodiment of the inventive concept includes an SSD (505) according to statement 1, wherein the statistics calculation logic (1705) includes:

a timing logic (1805) to determine a plurality of write times (1655, 1660, 1665, 1650) for the first plurality of write requests (1610, 1615, 1620, 1625) and a plurality of invalidate times (1645, 1670, 1675) for the plurality of invalidate requests (1630, 1635, 1640), and to pair individual write times (1655, 1660, 1665, 1650) for individual write requests (1610, 1615, 1620, 1625) with individual invalidate times (1645, 1670, 1675) for corresponding individual invalidate requests (1630, 1635, 1640); and a data life span logic (1810) to calculate data life spans (2005, 2010, 2015) from the corresponding write times (1655, 1660, 1665, 1650) from the plurality of write times (1655, 1660, 1665, 1650) and invalidate times (1645, 1670, 1675) from the plurality of invalidate times (1645, 1670, 1675).

Statement 3. An embodiment of the inventive concept includes an SSD (505) according to statement 2, wherein the statistics calculation logic (1705) further includes a statistics logic (1815) to generate a statistical function (1410, 1415) that fits the calculated data life spans (2005, 2010, 2015).

Statement 4. An embodiment of the inventive concept includes an SSD (505) according to statement 3, wherein the statistics logic (1815) is operative to calculate a distribution function (1410, 1415) that fits the calculated data life spans (2005, 2010, 2015).

Statement 5. An embodiment of the inventive concept includes an SSD (505) according to statement 2, wherein the statistics calculation logic (1705) is operative to generate a histogram (1510) from the calculated data life spans (2005, 2010, 2015).

Statement 6. An embodiment of the inventive concept includes an SSD (505) according to statement 2, further comprising storage (1825) for the calculated data life spans (2005, 2010, 2015).

Statement 7. An embodiment of the inventive concept includes an SSD (505) according to statement 2, wherein the plurality of write times (1655, 1660, 1665, 1650) and the plurality of invalidate times (1645, 1670, 1675) includes a most recent number of write times (1655, 1660, 1665, 1650) and invalidate times (1645, 1670, 1675).

Statement 8. An embodiment of the inventive concept includes an SSD (505) according to statement 2, wherein the statistics calculation logic (1705) further includes a weighting logic (1820) to determine weights (2205, 2210, 2215) for the calculated data life spans (2005, 2010, 2015).

Statement 9. An embodiment of the inventive concept includes an SSD (505) according to statement 1, wherein:

the reception circuitry (510) is operative to receive a new write request (2310), the new write request (2310) including new data (2305); and the performance logic (1710) includes a storage selector (2420) to select a destination (103, 405) to store the new data (2305) responsive to the calculated statistics (1410, 1415, 1510), the destination (103, 405) being one of a block (103) on the SSD (505) and a second-order stream (405).

Statement 10. An embodiment of the inventive concept includes an SSD (505) according to statement 9, wherein the destination (103) includes a Time-To-Live (TTL) (240, 410) that is minimally greater than an expected stream TTL (310, 325, 340, 355) for a confidence level.

Statement 11. An embodiment of the inventive concept includes an SSD (505) according to statement 9, wherein the storage selector (2420) is operative to select the block (103) to store both the new data (2305) and data from a second stream (305, 320, 335, 350), the second stream (305, 320, 335, 350) including a second stream TTL (310, 325, 340, 355) for a second confidence level, the second stream TTL (310, 325, 340, 355) close to the expected stream TTL (310, 325, 340, 355).

Statement 12. An embodiment of the inventive concept includes an SSD (505) according to statement 1, wherein the performance logic (1710) includes:

an estimated remaining life span logic (2410) to calculate an estimated remaining life span (2605) for a valid data (2510) using the calculated statistics (1410, 1415, 1510), the valid data (2510) (2510) in an erase block (2505) subject to garbage collection; and a storage selector (2420) to select a destination (103, 405) to program the valid data (2510), the destination (103, 405) being one of a second block (103) and a second-order stream (405), the destination (103, 405) having a TTL (240, 410) minimally greater than the estimated remaining life span (2605) for the valid data (2510).

Statement 13. An embodiment of the inventive concept includes an SSD (505) according to statement 12, wherein the second block (103) is allocated to a second stream (305, 320, 335, 350).

Statement 14. An embodiment of the inventive concept includes an SSD (505) according to statement 1, wherein the performance logic (1710) is operative to select between the first stream (305, 320, 335, 350) and a second stream (305, 320, 335, 350) to write data to a block (103), responsive to the calculated statistics (1410, 1415, 1510) and a second calculated statistics (1410, 1415, 1510) for the second stream (305, 320, 335, 350).

Statement 15. An embodiment of the inventive concept includes an SSD (505) according to statement 1, wherein the performance logic (1710) includes:

a comparator (2415) to compare the calculated statistics (1410, 1415, 1510) with a stream TTL (310, 325, 340, 355) provided by an application (1605); and a reporting logic (2425) to report a subset of the calculated statistics (1410, 1415, 1510) to the application (1605) if the stream TTL (310, 325, 340, 355) differs significantly from the calculated statistics (1410, 1415, 1510).

Statement 16. An embodiment of the inventive concept includes a logic for a Solid State Drive (SSD) (505), comprising:

a timing logic (1805) to determine a plurality of write times (1655, 1660, 1665, 1650) for a first plurality of write requests (1610, 1615, 1620, 1625) and a plurality of invalidate times (1645, 1670, 1675) for a plurality of invalidate requests (1630, 1635, 1640), and to pair individual write times (1655, 1660, 1665, 1650) for individual write requests (1610, 1615, 1620, 1625) with individual invalidate times (1645, 1670, 1675) for corresponding individual invalidate requests (1630, 1635, 1640);

a data life span logic (1810) to calculate data life spans (2005, 2010, 2015) from the corresponding write times (1655, 1660, 1665, 1650) from the plurality of write times (1655, 1660, 1665, 1650) and invalidate times (1645, 1670, 1675) from the plurality of invalidate times (1645, 1670, 1675);

statistics calculation logic (1705) to calculate statistics (1410, 1415, 1510) for a first stream (305, 320, 335, 350) from the calculated data life spans (2005, 2010, 2015); and performance logic (1710) to use the calculated statistics (1410, 1415, 1510) to increase a likelihood that all data written to a block (103) on the SSD (505) will be invalidated around the same time.

Statement 17. An embodiment of the inventive concept includes a logic according to statement 16, wherein the statistics calculation logic (1705) further includes a statistics logic (1815) to generate a statistical function (1410, 1415) that fits the calculated data life spans (2005, 2010, 2015).

Statement 18. An embodiment of the inventive concept includes a logic according to statement 17, wherein the statistics logic (1815) is operative to calculate a distribution function (1410, 1415) that fits the calculated data life spans (2005, 2010, 2015).

Statement 19. An embodiment of the inventive concept includes a logic according to statement 16, wherein the statistics calculation logic (1705) is operative to generate a histogram (1510) from the calculated data life spans (2005, 2010, 2015).

Statement 20. An embodiment of the inventive concept includes a logic according to statement 16, further comprising storage (1825) for the calculated data life spans (2005, 2010, 2015).

Statement 21. An embodiment of the inventive concept includes a logic according to statement 16, wherein the plurality of write times (1655, 1660, 1665, 1650) and the plurality of invalidate times (1645, 1670, 1675) includes a most recent number of write times (1655, 1660, 1665, 1650) and invalidate times (1645, 1670, 1675).

Statement 22. An embodiment of the inventive concept includes a logic according to statement 16, wherein the statistics calculation logic (1705) further includes a weighting logic (1820) to determine weights (2205, 2210, 2215) for the calculated data life spans (2005, 2010, 2015).

Statement 23. An embodiment of the inventive concept includes a logic according to statement 16, wherein the performance logic (1710) is operative to select a destination (103, 405) to store a new data (2305) responsive to the calculated statistics (1410, 1415, 1510), the destination (103, 405) being one of a block (103) on the SSD (505) and a second-order stream (405).

Statement 24. An embodiment of the inventive concept includes a logic according to statement 23, wherein the destination (103, 405) includes a block Time-To-Live (TTL) (240) that is minimally greater than an expected stream TTL (310, 325, 340, 355) for a confidence level.

Statement 25. An embodiment of the inventive concept includes a logic according to statement 23, wherein the performance logic (1710) is operative to select the block (103) to store the new data (2305) and data from a second stream (305, 320, 335, 350), the second stream (305, 320, 335, 350) including a second stream TTL (310, 325, 340, 355) for a second confidence level, the second stream TTL (310, 325, 340, 355) close to the expected stream TTL (310, 325, 340, 355).

Statement 26. An embodiment of the inventive concept includes a logic according to statement 16, wherein the performance logic (1710) includes:

an estimated remaining life span logic (2410) to calculate an estimated remaining life span (2605) for a valid data (2510) using the calculated statistics (1410, 1415, 1510), the valid data (2510) in an erase block (2505) subject to garbage collection; and a storage selector (2420) to select a destination (103, 405) to program the valid data (2510), the destination (103, 405) being one of a second block (103) and a second-order stream (405), the destination (103, 405) having a block TTL (240) minimally greater than the estimated remaining life span (2605) for the valid data (2510).

Statement 27. An embodiment of the inventive concept includes a logic according to statement 26, wherein the second block (103) is allocated to a second stream (305, 320, 335, 350).

Statement 28. An embodiment of the inventive concept includes a logic according to statement 16, wherein the performance logic (1710) is operative to select between the first stream (305, 320, 335, 350) and a second stream (305, 320, 335, 350) to write data to a block, responsive to the calculated statistics (1410, 1415, 1510) and a second calculated statistics (1410, 1415, 1510) for the second stream (305, 320, 335, 350).

Statement 29. An embodiment of the inventive concept includes a logic according to statement 16, wherein the performance logic (1710) includes:

a comparator (2415) to compare the calculated statistics (1410, 1415, 1510) with a stream TTL (310, 325, 340, 355) provided by an application (1605); and a reporting logic (2425) to report a subset of the calculated statistics (1410, 1415, 1510) to the application (1605) if the stream TTL (310, 325, 340, 355) differs significantly from the calculated statistics (1410, 1415, 1510).

Statement 30. An embodiment of the inventive concept includes a method, comprising:

receiving (2705) a first plurality of write requests (1610, 1615, 1620, 1625) at a Solid State Drive (SSD) (505), each of the first plurality of write requests (1610, 1615, 1620, 1625) associated with a first stream (305, 320, 335, 350);

determining (2715) a second plurality of write times (1655, 1660, 1665, 1650), each of the second plurality of write times (1655, 1660, 1665, 1650) associated with one of the first plurality of write requests (1610, 1615, 1620, 1625);

receiving (2720) a third plurality of invalidate requests (1630, 1635, 1640) at the SSD (505), each of the third plurality of invalidate requests (1630, 1635, 1640) deleting data written by one of the first plurality of write requests (1610, 1615, 1620, 1625);

determining (2750) a fourth plurality of invalidate times (1645, 1670, 1675), each of the fourth plurality of invalidate times (1645, 1670, 1675) associated with one of the third plurality of invalidate requests (1630, 1635, 1640);

calculating (2740) statistics (1410, 1415, 1510) for the first stream (305, 320, 335, 350), the calculated statistics (1410, 1415, 1510) responsive to the second plurality of write times (1655, 1660, 1665, 1650) and the fourth plurality of invalidate times (1645, 1670, 1675); and using (2745) the calculated statistics (1410, 1415, 1510) to increase a likelihood that all data written to a block (103) on the SSD (505) will be invalidated around the same time.

Statement 31. An embodiment of the inventive concept includes a method according to statement 30, wherein:

determining (2715) a second plurality of write times (1655, 1660, 1665, 1650) includes:

performing (2710) each of the first plurality of write requests (1610, 1615, 1620, 1625); and determining (2715) the second plurality of write times (1655, 1660, 1665, 1650) as times at which the first plurality of write requests (1610, 1615, 1620, 1625) were performed; and determining (2750) a fourth plurality of invalidate times (1645, 1670, 1675) includes:

performing (2725) each of the third plurality of invalidate requests (1630, 1635, 1640); and determining (2750) the fourth plurality of invalidate times (1645, 1670, 1675) as times at which the third plurality of invalidate requests (1630, 1635, 1640) were performed.

Statement 32. An embodiment of the inventive concept includes a method according to statement 30, wherein calculating (2740) statistics (1410, 1415, 1510) for the first stream (305, 320, 335, 350) includes storing (2735) the second plurality of write times (1655, 1660, 1665, 1650) and the fourth plurality of invalidate times (1645, 1670, 1675).

Statement 33. An embodiment of the inventive concept includes a method according to statement 30, wherein calculating (2740) statistics (1410, 1415, 1510) for the first stream (305, 320, 335, 350) includes:

determining (2805) a fifth plurality of pairs of times, each pair of times in the fifth plurality of pairs of times including one write time (1655, 1660, 1665, 1650) from the second plurality of write times (1655, 1660, 1665, 1650) and one invalidate time (1645, 1670, 1675) from the fourth plurality of invalidate times (1645, 1670, 1675), the one write time (1655, 1660, 1665, 1650) and the one invalidate time (1645, 1670, 1675) associated with a particular write request (1610, 1615, 1620, 1625) in the first plurality of write requests (1610, 1615, 1620, 1625);

calculating (2810) a sixth plurality of data life spans (2005, 2010, 2015), each data life span (2005, 2010, 2015) in the sixth plurality of data life spans (2005, 2010, 2015) including a difference between the one write time (1655, 1660, 1665, 1650) and the one invalidate time (1645, 1670, 1675) in one of the fifth plurality of pairs of times; and calculating (2740) the statistics (1410, 1415, 1510) for the first stream (305, 320, 335, 350), the calculated statistics (1410, 1415, 1510) responsive to the sixth plurality of data life spans (2005, 2010, 2015).

Statement 34. An embodiment of the inventive concept includes a method according to statement 33, wherein determining (2805) a fifth plurality of pairs of times includes determining (2805) the fifth plurality of pairs of times, the fifth plurality of pairs of times being fewer in number than the first plurality of write requests (1610, 1615, 1620, 1625).

Statement 35. An embodiment of the inventive concept includes a method according to claim 34, wherein determining (2805) the fifth plurality of pairs of times includes determining (2805) the fifth plurality of pairs of times, the fifth plurality of pairs of times being for a most recent subset of the first plurality of write requests (1610, 1615, 1620, 1625).

Statement 36. An embodiment of the inventive concept includes a method according to statement 34, wherein determining (2750) a fourth plurality of invalidate times (1645, 1670, 1675) includes determining (2750) the fourth plurality of invalidate times (1645, 1670, 1675), the fourth plurality of invalidate times (1645, 1670, 1675) being equal in number to the second plurality of write times (1655, 1660, 1665, 1650).

Statement 37. An embodiment of the inventive concept includes a method according to statement 33, wherein:

determining (2715) a second plurality of write times (1655, 1660, 1665, 1650) includes determining (2730) a sixth plurality of weights (2205, 2210, 2215), each weight in the sixth plurality of weights (2205, 2210, 2215) associated with a write time in the second plurality of write times (1655, 1660, 1665, 1650); and calculating (2740) the statistics (1410, 1415, 1510) for the first stream (305, 320, 335, 350) includes calculating (2740) the statistics (1410, 1415, 1510) for the first stream (305, 320, 335, 350), the calculated statistics (1410, 1415, 1510) responsive to the sixth plurality of data life spans (2005, 2010, 2015) and the sixth plurality of weights (2205, 2210, 2215).

Statement 38. An embodiment of the inventive concept includes a method according to statement 33, wherein calculating (2740) statistics (1410, 1415, 1510) for the first stream (305, 320, 335, 350) includes generating (2815) a statistical function (1410, 1415) that fits the sixth plurality of data life spans (2005, 2010, 2015).

Statement 39. An embodiment of the inventive concept includes a method according to statement 38, wherein generating (2815) a statistical function (1410, 1415) includes generating (2815) a distribution function (1410, 1415) that fits the sixth plurality of data life spans (2005, 2010, 2015).

Statement 40. An embodiment of the inventive concept includes a method according to statement 33, wherein calculating (2740) statistics (1410, 1415, 1510) for the first stream (305, 320, 335, 350) includes generating (2820) a histogram (1510) for the sixth plurality of data life spans (2005, 2010, 2015).

Statement 41. An embodiment of the inventive concept includes a method according to statement 30, wherein using (2745) the calculated statistics (1410, 1415, 1510) to improve performance of the SSD (505) includes:

receiving (2905) a new write request (1610, 1615, 1620, 1625), the new write request (1610, 1615, 1620, 1625) including new data (2305); and selecting (2920) a destination (103, 405) to store the new data (2305) using (2745) the calculated statistics (1410, 1415, 1510), the destination (103, 405) being one of a block (103) on the SSD (505) and a second-order stream (405).

Statement 42. An embodiment of the inventive concept includes a method according to statement 41, wherein selecting (2920) a destination (103, 405) to store the new data (2305) using (2745) the calculated statistics (1410, 1415, 1510) includes selecting (2910) the destination (103, 405) to store the new data (2305), the destination (103, 405) having a Time-To-Live (TTL) (240, 410) minimally greater than an expected first stream TTL (310, 325, 340, 355) for the first stream (305, 320, 335, 350) for a first confidence level.

Statement 43. An embodiment of the inventive concept includes a method according to statement 42, wherein selecting (2910) the destination (103, 405) to store the new data (2305) includes selecting (2915) the destination (103, 405) to store the new data (2305) using (2745) the calculated statistics (1410, 1415, 1510), the block designated to store data from the first stream (305, 320, 335, 350) and a second stream (305, 320, 335, 350), the second stream (305, 320, 335, 350) including a second stream TTL (310, 325, 340, 355) close to the first stream TTL (310, 325, 340, 355) for a second confidence level.

Statement 44. An embodiment of the inventive concept includes a method according to statement 30, wherein using (2745) the calculated statistics (1410, 1415, 1510) to improve performance of the SSD (505) includes using (2745) the calculated statistics (1410, 1415, 1510) to select a target block to program valid data (2510) from an erase block (2505) subject to garbage collection.

Statement 45. An embodiment of the inventive concept includes a method according to statement 44, wherein using (2745) the calculated statistics (1410, 1415, 1510) to select a target block to program valid data (2510) from an erase block (2505) subject to garbage collection includes:

identifying (3010) the valid data (2510) in the erase block (2505);

determining (3020) an estimated remaining life span (2605) for the valid data (2510) using (2745) the calculated statistics (1410, 1415, 1510);

selecting (3025) the target block (103) having a block TTL (240) minimally greater than the estimated remaining life span (2605) for the valid data (2510); and programming (3030) the valid data (2510) to the target block (103).

Statement 46. An embodiment of the inventive concept includes a method according to statement 45, wherein selecting (3025) the target block (103) having a block TTL (240) minimally greater than the estimated remaining life span (2605) for the valid data (2510) includes selecting (3025) the target block (103) having the block TTL (240) minimally greater than the estimated remaining life span (2605) for the valid data (2510), wherein the second block (103) is allocated to a second stream (305, 320, 335, 350).

Statement 47. An embodiment of the inventive concept includes a method according to statement 30, wherein:

the method further comprises:

receiving (2705) a fifth plurality of second write requests (1610, 1615, 1620, 1625) at the SSD (505), each of the fifth plurality of second write requests (1610, 1615, 1620, 1625) associated with a second stream (305, 320, 335, 350);

determining (2715) a sixth plurality of second write times, each of the sixth plurality of second write times associated with one of the fifth plurality of second write requests (1610, 1615, 1620, 1625);

receiving (2720) a seventh plurality of second invalidate requests (1630, 1635, 1640) at the SSD (505), each of the seventh plurality of second invalidate requests (1630, 1635, 1640) deleting second data written by one of the fifth plurality of second write requests (1610, 1615, 1620, 1625);

determining (2750) an eighth plurality of second invalidate times, each of the eighth plurality of second invalidate times associated with one of the seventh plurality of second invalidate requests (1630, 1635, 1640);

calculating (2740) second statistics (1410, 1415, 1510) for the second stream (305, 320, 335, 350), the second statistics (1410, 1415, 1510) responsive to the sixth plurality of second write times and the eighth plurality of second invalidate times;

receiving a first new write request (1610, 1615, 1620, 1625) at the SSD (505), the first new write request (1610, 1615, 1620, 1625) associated with the first stream (305, 320, 335, 350); and receiving a second new write request (1610, 1615, 1620, 1625) at the SSD (505), the second new write request (1610, 1615, 1620, 1625) associated with the second stream (305, 320, 335, 350); and using (2745) the calculated statistics (1410, 1415, 1510) to improve performance of the SSD (505) includes selecting (3115) whether to write the first new write request (1610, 1615, 1620, 1625) or the second new write request (1610, 1615, 1620, 1625) to a block on the SSD (505) based on the calculated statistics (1410, 1415, 1510) and the second calculated statistics (1410, 1415, 1510).

Statement 48. An embodiment of the inventive concept includes a method according to statement 30, wherein:

the method further comprises receiving (3205) a stream TTL (310, 325, 340, 355) from an application (1605); and using (2745) the calculated statistics (1410, 1415, 1510) to improve performance of the SSD (505) includes:

comparing (3210) the stream TTL (310, 325, 340, 355) with the calculated statistics (1410, 1415, 1510); and if the stream TTL (310, 325, 340, 355) differs significantly from the calculated statistics (1410, 1415, 1510), reporting a subset of the calculated statistics (1410, 1415, 1510) to the application (1605).

Consequently, in view of the wide variety of permutations to the embodiments described herein, this detailed description and accompanying material is intended to be illustrative only, and should not be taken as limiting the scope of the inventive concept. What is claimed as the inventive concept, therefore, is all such modifications as may come within the scope and spirit of the following claims and equivalents thereto.

What is claimed is:

1. A method, comprising:
receiving a plurality of write requests at a Solid State Drive (SSD), each of the plurality of write requests associated with a stream;
determining a plurality of write times, each of the plurality of write times associated with one of the plurality of write requests;
receiving a plurality of invalidate requests at the SSD, each of the plurality of invalidate requests deleting data written by one of the plurality of write requests;
determining a plurality of invalidate times, each of the plurality of invalidate times associated with one of the plurality of invalidate requests;
calculating statistics for the stream, the calculated statistics responsive to the plurality of write times and the plurality of invalidate times; and
using the calculated statistics to increase a likelihood that all data written to a block on the SSD will be invalidated around the same time, including:
receiving a new write request, the new write request including new data; and
selecting a destination to store the new data using the calculated statistics, the destination being one of a block on the SSD and a second-order stream.

2. A method according to claim 1, wherein calculating statistics for the stream includes:
determining a plurality of pairs of times, each pair of times in the plurality of pairs of times including one write time from the plurality of write times and one invalidate time from the plurality of invalidate times, the one write time and the one invalidate time associated with a particular write request in the plurality of write requests;
calculating a plurality of data life spans, each data life span in the plurality of data life spans including a difference between the one write time and the one invalidate time in one of the plurality of pairs of times; and
calculating the statistics for the stream, the calculated statistics responsive to the plurality of data life spans.

3. A method according to claim 2, wherein determining a plurality of pairs of times includes determining the plurality of pairs of times, the plurality of pairs of times being fewer in number than the plurality of write requests.

4. A method according to claim 2, wherein calculating statistics for the stream includes generating a statistical function that fits the plurality of data life spans.

5. A method according to claim 2, wherein calculating statistics for the stream includes generating a histogram for the plurality of data life spans.

6. A method according to claim 1, wherein using the calculated statistics to improve performance of the SSD includes using the calculated statistics to select a target block to program valid data from an erase block subject to garbage collection.

7. A method according to claim 6, wherein using the calculated statistics to select a target block to program valid data from an erase block subject to garbage collection includes:
identifying the valid data in the erase block;
determining an estimated remaining life span for the valid data using the calculated statistics;
selecting the target block having a block TTL minimally greater than the estimated remaining life span for the valid data; and
programming the valid data to the target block.

8. A Solid State Drive (SSD), comprising:
storage for data;
reception circuitry to receive a plurality of write requests, a plurality of invalidate requests from a stream, and a new write request, the plurality of write requests and the plurality of invalidate requests affecting the data in the storage, the new write request including new data;
statistics calculation logic to calculate statistics for the stream from the plurality of write requests and the plurality of invalidate requests; and
performance logic including a storage selector to select a destination to store the new data responsive to the calculated statistics, the destination being one of a block on the SSD and a second-order stream, thereby increasing a likelihood that all data written to the destination will be invalidated around the same time.

9. An SSD according to claim 8, wherein the statistics calculation logic includes:
a timing logic to determine a plurality of write times for the plurality of write requests and a plurality of invalidate times for the plurality of invalidate requests, and to pair individual write times for individual write requests with individual invalidate times for corresponding individual invalidate requests; and
a data life span logic to calculate data life spans from the corresponding write times from the plurality of write times and invalidate times from the plurality of invalidate times.

10. An SSD according to claim 9, wherein the statistics calculation logic further includes a statistics logic to generate a statistical function that fits the calculated data life spans.

11. An SSD according to claim 9, wherein the statistics calculation logic is operative to generate a histogram from the calculated data life spans.

12. An SSD according to claim 9, wherein the plurality of write times and the plurality of invalidate times includes a most recent number of write times and invalidate times.

13. An SSD according to claim 8, wherein the performance logic includes:
an estimated remaining life span logic to calculate an estimated remaining life span for a valid data using the calculated statistics, the valid data in an erase block subject to garbage collection; and a storage selector to select a destination to program the valid data, the destination being one of a second block and a second-order stream, the destination having a TTL minimally greater than the estimated remaining life span for the valid data.

14. A logic for a Solid State Drive (SSD), comprising:

a timing logic to determine a plurality of write times for a plurality of write requests and a plurality of invalidate times for a plurality of invalidate requests, and to pair individual write times for individual write requests with individual invalidate times for corresponding individual invalidate requests;

a data life span logic to calculate data life spans from the corresponding write times from the plurality of write times and invalidate times from the plurality of invalidate times;

statistics calculation logic to calculate statistics for a first stream from the calculated data life spans; and performance logic to select a destination to store a new data responsive to the calculated statistics, the destination being one of a block on the SSD and a second-order stream, thereby increasing a likelihood that all data written to the destination will be invalidated around the same time.

15. A logic according to claim 14, wherein the statistics calculation logic further includes a statistics logic to generate a statistical function that fits the calculated data life spans.

16. A logic according to claim 14, wherein the statistics calculation logic is operative to generate a histogram from the calculated data life spans.

17. A logic according to claim 14, wherein the plurality of write times and the plurality of invalidate times includes a most recent number of write times and invalidate times.

18. A logic according to claim 14, wherein the performance logic is operative to select the block to store the new data and data from a second stream, the second stream including a second stream TTL for a second confidence level, the second stream TTL close to a block TTL.

* * * * *